(12) United States Patent
Ukai et al.

(10) Patent No.: US 12,536,787 B2
(45) Date of Patent: Jan. 27, 2026

(54) IMAGE PROCESSING APPARATUS, METHOD OF GENERATING LEARNING MODEL, AND INFERENCE METHOD

(71) Applicants: Glory Ltd., Himeji (JP); Chubu University Educational Foundation, Kasugai (JP)

(72) Inventors: Yuki Ukai, Himeji (JP); Hironobu Fujiyoshi, Kasugai (JP); Takayoshi Yamashita, Kasugai (JP); Tsubasa Hirakawa, Kasugai (JP)

(73) Assignees: GLORY LTD., Himeji (JP); CHUBU UNIVERSITY EDUCATIONAL FOUNDATION, Kasugai (JP)

( * ) Notice: Subject to any disclaimer, the term of this patent is extended or adjusted under 35 U.S.C. 154(b) by 295 days.

(21) Appl. No.: 18/370,410

(22) Filed: Sep. 20, 2023

(65) Prior Publication Data

US 2024/0104914 A1   Mar. 28, 2024

(30) Foreign Application Priority Data

Sep. 21, 2022   (JP) ................................ 2022-150740

(51) Int. Cl.
*G06V 10/00*   (2022.01)
*G06V 10/74*   (2022.01)
(Continued)

(52) U.S. Cl.
CPC ............ *G06V 10/82* (2022.01); *G06V 10/761* (2022.01); *G06V 10/765* (2022.01); *G06V 10/776* (2022.01)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS 10,176,202 B1 *   1/2019   Newman ................. G06F 18/22
10,956,817 B2 *   3/2021   Oliveira Pinheiro .. G06N 3/045
(Continued)

FOREIGN PATENT DOCUMENTS

JP   2018-200531 A   12/2018

OTHER PUBLICATIONS

Extended European Search Report issued Feb. 9, 2024 in European Patent Application No. 23196731.6.
(Continued)

*Primary Examiner* — Amir Alavi
(74) *Attorney, Agent, or Firm* — XSENSUS LLP

(57) ABSTRACT

A learning model generates a plurality of prototype vectors and generates an integrated similarity vector that indicates similarity between an input image and each prototype for a plurality of prototypes in accordance with similarity between one prototype vector and each pixel vector in a feature map acquired from an CNN. An image processing apparatus obtains prototype belongingness (distributed prototype belongingness) for each image by distributing prototype belongingness of a belonged prototype of each class to each of two or more images that belong to one class. Then, the learning model is subjected to machine learning in accordance with the distributed prototype belongingness of each prototype vector for each image so that each prototype vector is brought closer to any pixel vector in the feature map corresponding to each image.

13 Claims, 34 Drawing Sheets

(51) Int. Cl.
    *G06V 10/764*      (2022.01)
    *G06V 10/776*      (2022.01)
    *G06V 10/82*      (2022.01)

(58) Field of Classification Search
    CPC ...... G06N 3/088; G06N 3/092; G06N 3/0454; G06N 3/0475; G06N 3/0464; G06V 10/82; G06V 10/761; G06V 10/762; G06V 10/765; G06V 10/454; G06V 10/776
    See application file for complete search history.

(56) References Cited

U.S. PATENT DOCUMENTS

| | | | | |
|---|---|---|---|---|
| 11,023,772 | B2* | 6/2021 | Pinheiro | G06V 30/19173 |
| 11,210,547 | B2* | 12/2021 | Arani | G06V 10/82 |
| 11,568,248 | B2* | 1/2023 | Hariri | G06N 3/08 |
| 11,948,089 | B2* | 4/2024 | Berkovich | G06V 10/95 |
| 12,169,774 | B2* | 12/2024 | Lazovich | G06T 9/002 |
| 12,175,723 | B2* | 12/2024 | Gupta | G06V 10/82 |
| 12,288,382 | B2* | 4/2025 | Guo | G06N 3/09 |
| 12,288,387 | B2* | 4/2025 | Vijayakumar | G06F 18/214 |
| 12,380,676 | B2* | 8/2025 | Sikka | G06V 10/764 |
| 2024/0249478 | A1* | 7/2024 | Sztuk | G06T 19/006 |

OTHER PUBLICATIONS

Jiachen Yang et al: "Do Deep Neural Networks Always Perform Better When Eating More Data?", arxiv.org, Cornell University Library, 201 Olin Library Cornell University Ithaca, NY 14853, May 30, 2022 (May 30, 2022).

Chen et al., "This Looks Like That: Deep Learning for Interpretable Image Recognition", 33rd Conference on Neural Information Processing Systems (NeurIPS 2019), pp. 1-12.

* cited by examiner

FIG.12
STEP S41:
OBTAIN BELONGED PROTOTYPE PTk BELONGING TO EACH CLASS AND BELONGINGNESS Bk OF BELONGED PROTOTYPE
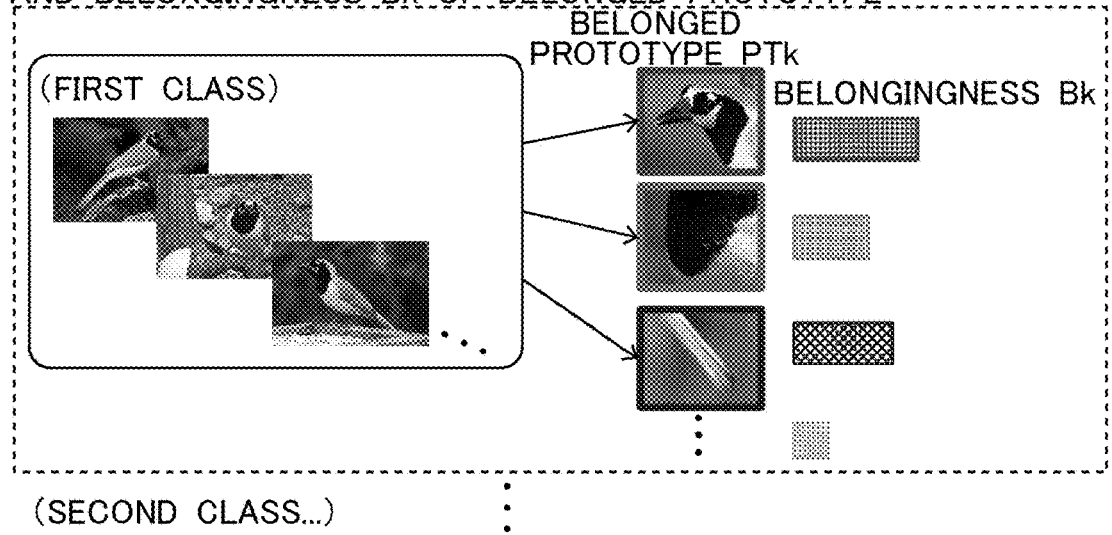
STEP S42:
DETERMINE DISTRIBUTED PROTOTYPE BELONGINGNESS Bik (Tik) FOR EACH IMAGE OF EACH CLASS
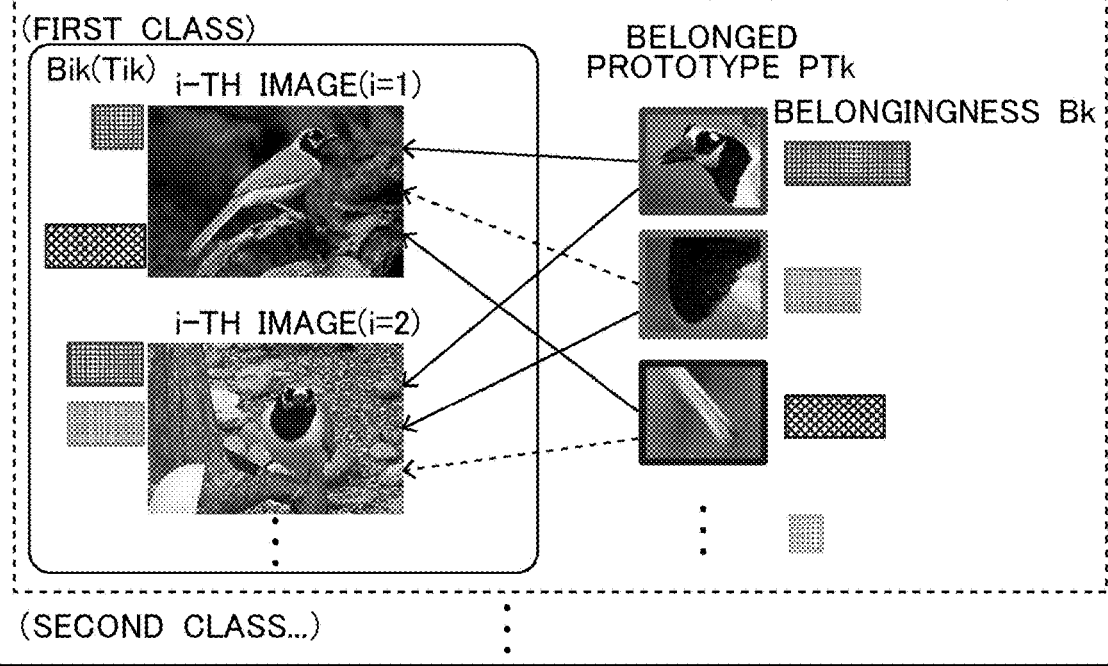
STEP S43, S44:
OPTIMIZE EVALUATION FUNCTION INCLUDING EVALUATION TERM Lclst (LEARNING FOR BRINGING EACH PROTOTYPE VECTOR p CLOSER TO ANY PIXEL VECTOR q)

FIG.14

<TOTALIZATION FOR EACH CLASS>

| IMAGE IMG1 | IMAGE IMG2 |
|---|---|
| PT1 40/95 | PT1 30/95 |
| PT2 0/95 | PT2 30/95 |
| PT3 30/95 | PT3 0/95 |
| PT4 25/95 | PT4 35/95 |

AVERAGING

OBTAIN AVERAGED BELONGINGNESS OF
EACH BELONGED PROTOTYPE TO EACH CLASS

PT1 35/95    =((40+30+35+30+40)/5)/95
PT2 15/95
PT3 15/95
PT4 30/95

FIG.30
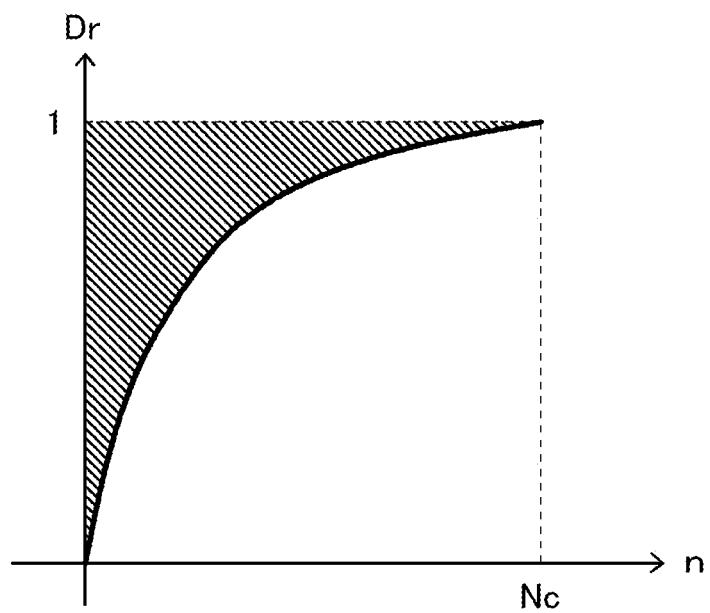
IMPROVE CLARITY
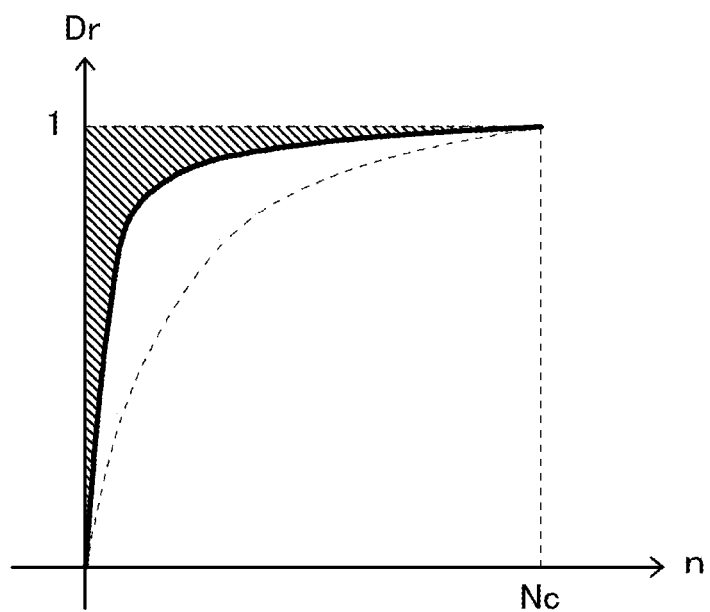

FIG.33
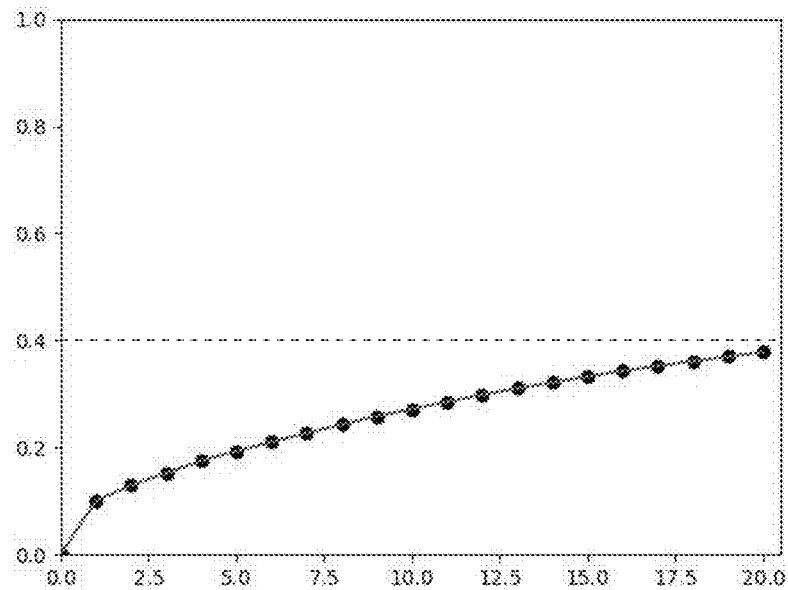
(BEFORE IMPROVEMENT)
⬇ IMPROVEMENT IN CLARITY
(AFTER IMPROVEMENT)
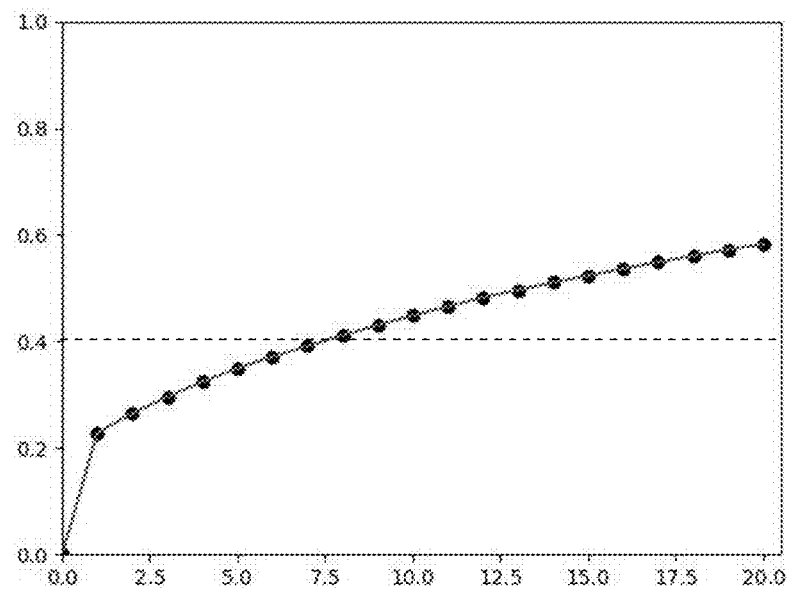

IMAGE PROCESSING APPARATUS, METHOD OF GENERATING LEARNING MODEL, AND INFERENCE METHOD

CROSS-REFERENCE TO RELATED APPLICATION

The present application claims priority to Japanese Patent Application No. 2022-150740, filed on Sep. 21, 2022, the entire disclosure of which is incorporated herein by reference in its entirety.

TECHNICAL FIELD

The present disclosure relates to an image processing apparatus (in particular, an image processing apparatus for improving explainability in machine learning) and a technique related thereto.

BACKGROUND ART

Inference processing technology using machine learning such as deep learning is evolving rapidly in recent years.

However, due to reasons such as high degrees of complexity of learning models in machine learning, there is a problem in that it is not always clear (not easy to explain) what kind of decision-making basis is employed to obtain inference results from the learnings models.

In particular, there is demand to improve explainability of decision-making basis in cases such as where inference results have significant influence.

As technology capable of improving explainability of decision-making basis and in particular improving "transparency" (explainability of inference results using concepts understandable by humans), for example, there is machine learning technology that applies ProtoPNet to issue concerning class classification. This technology uses "prototypes" (learning parameters that represent some sort of image features) provided in learning models. More specifically, machine learning proceeds to bring the "prototypes" closer to image features (pixel vectors) at each planar position in a feature map. The feature map is output from a convolutional neural network in a learning model when an input image for learning is input to the learning model. The image features at each planar position in the feature map represent image features of a partial region (image patch) in the input image.

By making an inference using a learning model obtained by such machine learning, it is possible to show decision-making basis indicating that an inference target image is similar to a partial region (image patch) at a specific position in a specific image. That is, transparency is improved.

SUMMARY

An image processing apparatus according to the present disclosure includes a controller that executes machine learning on a learning model that is configured to include a convolutional neural network. The learning model is a model that generates a feature map acquired from a predetermined layer in the convolutional neural network in response to input of an input image, the feature map indicating a feature of each partial region of the input image for a plurality of channels, generates a plurality of prototype vectors, each being a parameter sequence that is trained as a prototype that indicates a candidate for a specific image feature concept configured by the plurality of channels, and generates an integrated similarity vector that indicates similarity between the input image and each of a plurality of prototypes, in accordance with similarity between each pixel vector and one prototype vector, the pixel vector being a vector that represents an image feature spanning the plurality of channels at each planar position of each pixel in the feature map. The controller is configured to, at a stage of training the learning model in accordance with a plurality of images for learning, obtain a belonged prototype and prototype belongingness for each of a plurality of classes that are labelled to the plurality of images for learning, the belonged prototype being a prototype that belongs to one class, the prototype belongingness indicating a degree of belongingness of the belonged prototype to the one class, obtain distributed prototype belongingness that is prototype belongingness for each image, by distributing prototype belongingness of the belonged prototype of each class to two or more images of the class in accordance with a predetermined reference, and subject the learning model to machine learning so that, when learning processing is executed based on a plurality of integrated similarity vectors corresponding to the plurality of images, each prototype vector is brought closer to any pixel vector in a feature map that corresponds to each image in accordance with the distributed prototype belongingness for the image.

A method of generating a learning model according to the present disclosure generates the following learning model through machine learning. The learning model is a model that generates a feature map acquired from a predetermined layer in a convolutional neural network in the learning model in response to input of an input image, the feature map indicating a feature of each partial region of the input image for a plurality of channels, generates a plurality of prototype vectors, each being a parameter sequence that is trained as a prototype that indicates a candidate for a specific image feature concept configured by the plurality of channels, and generates an integrated similarity vector that indicates similarity between the input image and each of a plurality of prototypes, in accordance with similarity between each pixel vector and one prototype vector, the pixel vector being a vector that represents an image feature spanning the plurality of channels at each planar position of each pixel in the feature map. The method of producing a learning model includes a) obtaining a belonged prototype and prototype belongingness in accordance with a plurality of images for learning for each of a plurality of classes that are labelled to the plurality of images for learning, the belonged prototype being a prototype that belongs to one class, the prototype belongingness indicating a degree of belongingness of the belonged prototype to the one class, b) obtaining distributed prototype belongingness that is prototype belongingness for each image, by distributing prototype belongingness of the belonged prototype of each class to two or more images of the class in accordance with a predetermined reference, and c) when learning processing is executed based on a plurality of integrated similarity vectors corresponding to the plurality of images, subjecting the learning model to machine learning so that each prototype vector is brought closer to any pixel vector in a feature map that corresponds to each image in accordance with the distributed prototype belongingness for the image.

An inference method according to the present disclosure executes inference processing on a new input image by using a learning model produced by the method of producing a learning model described above.

BRIEF DESCRIPTION OF DRAWINGS

FIG. 12 shows the learning processing in relation to an evaluation term Last.

FIG. 14 shows one example of averaging processing performed in units of classes of prototype belongingness.

FIG. 30 shows how to improve clarity.

FIG. 33 shows an example of improving clarity relating to an image pair in FIG. 29.

DESCRIPTION OF EMBODIMENTS

The aforementioned technique described in "BACKGROUND ART" is a technique for applying ProtoPNet to class classification problems. That is, this technique can be used only to resolve class classification problems as to determining to which one of a plurality of (known) classes each inference target image belongs.

In particular, this technique (the aforementioned technique using ProtoPNet) is based on the premise that the target is the class classification problem and that each prototype is associated (uniquely) with only one specific class. Then, machine learning proceeds to optimize loss functions (evaluation functions) based on the above premise.

Accordingly, this technique cannot be used as-is in applications other than class classification. For example, this technique cannot be used as-is in processing such as image retrieval processing in which an image that belongs to a class other than any known class (an image that belongs to an unclassified class) is regarded as an inference target image, and a similar image to the inference target image is retrieved from among a plurality of images.

In contrast, the present disclosure provides a technique capable of improving explainability of decision-making basis even in image retrieval processing for retrieving a similar image to an inference target image from among a plurality of images, the inference target image being possibly an image that belongs to a class other than any known class (an image that belongs to an unclassified class).

With reference to the drawings, some embodiments will be explained. These are, of course, merely examples and are not intended to be limiting.

1. First Embodiment 1-1. Overview of System

Figure 1:
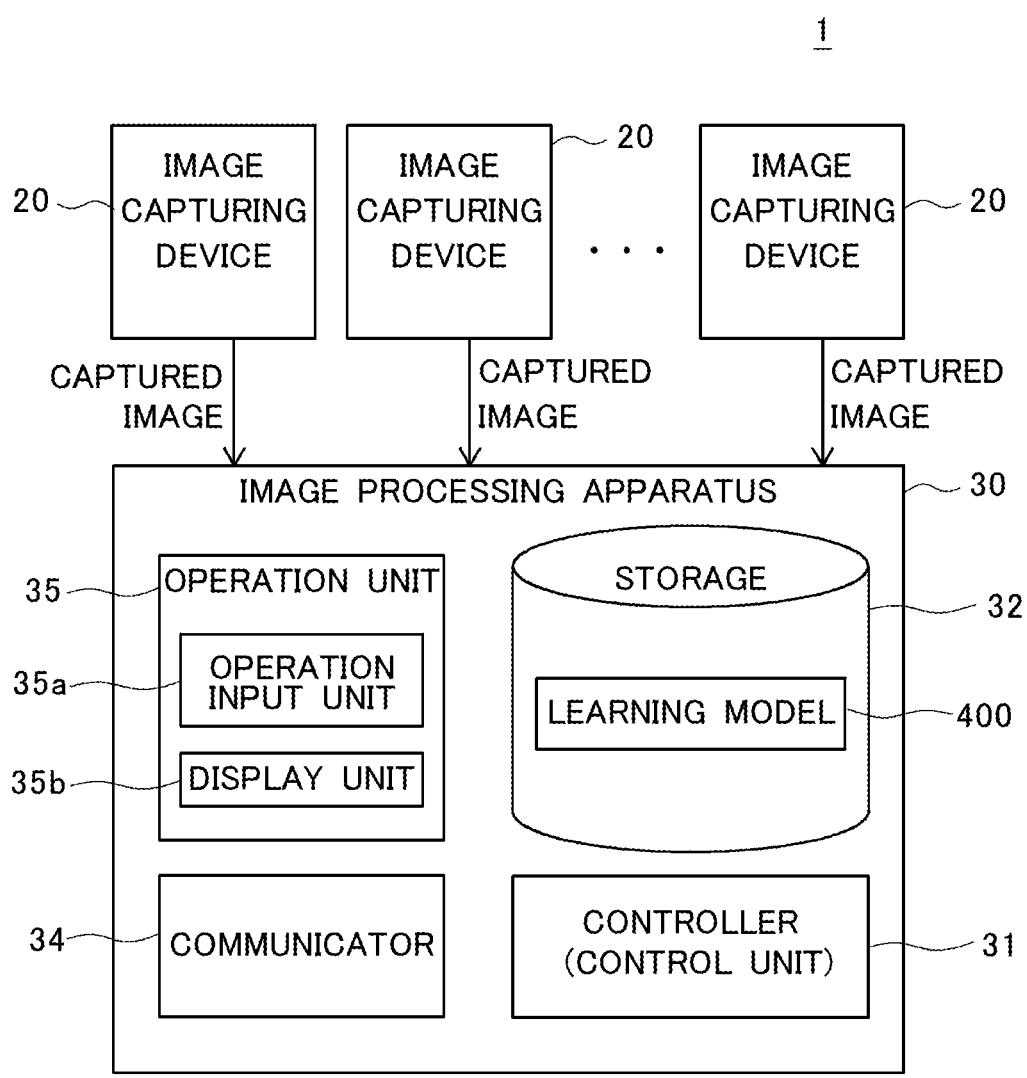
FIG. 1 is a schematic diagram showing an image processing system.

FIG. 1 is a schematic diagram showing an image processing system 1. As shown in FIG. 1, the image processing system 1 includes a plurality of (a large number of) image capturing devices 20 that capture images, and an image processing apparatus 30 that processes the captured images. The image processing apparatus 30 is an apparatus that executes various types of processing for identifying and classifying targets (here, target persons) appearing in the captured images.

The captured images obtained by the image capturing devices 20 are input to the image processing apparatus 30 via a communication network (e.g., LAN and/or the Internet). Image processing or the like executed by the image processing apparatus 30 involves processing such as image retrieval processing for retrieving a similar image to a given inference target image (e.g., a given captured image) from among a plurality of images (known images such as captured images for leaning).

Figure 5:
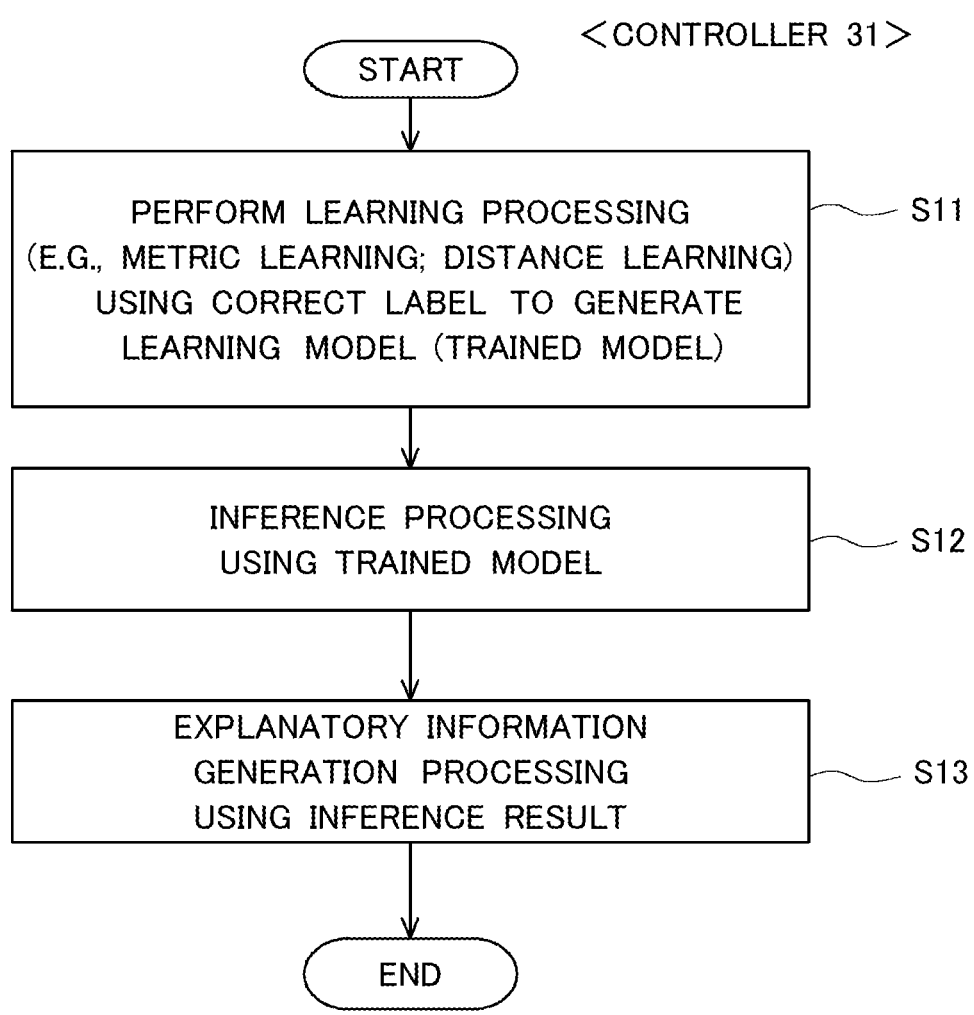
FIG. 5 is a flowchart showing processing performed by an image processing apparatus e.g., controller).

To be more specific, as shown in the flowchart in FIG. 5, the image processing apparatus 30 firstly trains a learning model 400 described later (machine learning) on the basis of a plurality of learning images (training data) obtained by capturing images of a plurality of target objects (e.g., a plurality of types of target objects such as birds). Through this machine learning, the trained learning model 400 (also indicated by 420) is generated (step S11). FIG. 5 is a flowchart showing the processing performed by the image processing apparatus 30 (e.g., a controller 31).

Thereafter, the image processing apparatus 30 executes inference processing using the trained learning model 420 (step S12). To be more specific, by using the trained learning model 420, the image processing apparatus 30 executes processing such as image retrieval processing for retrieving (extracting) an image that is most similar to a given inference target image (an image including a target that is most similar to a target included in a given inference target image) from among a plurality of learning images. Such processing is also referred to as processing for identifying targets (e.g., animals or humans) in a given image.

The image processing apparatus 30 further executes explanatory information generation processing on the result of inference (step S13).

Although captured images are mainly given as an example of the inference target image and the learning images, the present disclosure is not limited to this example. For example, the learning images and the inference target image may be images other than the captured images (e.g., computer graphics (CG) images or hand-drawn images). The captured images may be those captured by the image capturing devices 20 of the image processing system 1, or may be those captured by image capturing devices other than the image capturing devices 20 of the image processing system 1.

1-2. Image Processing Apparatus 30

Referring back to FIG. 1, the image processing apparatus 30 includes the controller 31 (also referred to as the control unit), a storage 32, a communicator 34, and an operation unit 35 as shown in FIG. 1.

The controller 31 is a control device that is built in the image processing apparatus 30 and controls operations of the image processing apparatus 30.

The controller 31 is configured as a computer system that may include, for example, one or a plurality of hardware processors (e.g., a central processing unit (CPU) and a graphics processing unit (GPU)). The controller 31 implements various types of processing by causing, for example, the CPU to execute predetermined software programs (hereinafter, also simply referred to as "programs") stored in the storage 32 (a ROM and/or a nonvolatile storage such as a hard disk). The programs (more specifically, a group of program modules) may be recorded on a recording medium (e.g., a portable recording medium), read out from the recording medium, and installed into the image processing apparatus 30. For example, the programs may be stored on CDs, DVDs, in FLASH memory, RAM, ROM, PROM, EPROM, EEPROM, hard disk or any other non-transitory computer readable medium of an information processing device. The programs may also be stored in network based storage, cloud-based storage or other mobile accessible storage and executable by controller 31. In other words, the programs may be downloaded via the communication network or the like and installed into the image processing apparatus 30.

Specifically, the controller 31 executes learning processing for subjecting the learning model 400 to machine learning and inference processing (e.g., image retrieval processing) using the trained learning model 400 (420). The controller 31 also executes processing such as explanatory processing to indicate the basis for the inference processing.

The storage 32 is configured as a storage device such as a hard disk drive (HDD) and/or a solid-state drive (SSD). The storage 32 stores data such as the learning model 400 (including learning parameters and programs relating to the learning model and accordingly the trained model 420).

The communicator 34 is capable of network communication via a network. The network communication use various types of protocols such as Transmission Control Protocol/Internet Protocol (TCP/IP). By using network communication, the image processing apparatus 30 is capable of transmitting and receiving various types of data (e.g., captured image data and correct data) to and from desired destinations (e.g., the image capturing devices 20 or an information storage device).

For example, the communication unit 34 includes a network controller, such as an Ethernet PRO network interface card, for interfacing with the network. As can be appreciated, the network can be a public network, such as the Internet, or a private network such as a local area network (LAN) or wide area network (WAN), or any combination thereof and can also include Public Switched Telephone Network (PSTN) or Integrated Services Digital Network (ISDN) sub-networks or ATM network. The network can also be wired, such as an Ethernet network, universal serial bus (USB) cable, or can be wireless such as a cellular network including EDGE, 4G and 5G wireless cellular systems. The wireless network can also be Wi-Fi, wireless LAN, Bluetooth, or any other wireless form of communication that is known. Additionally, the network controller may be compliant with other direct communication standards, such as Bluetooth, a near field communication (NFC), infrared ray or other.

The operation unit 35 includes an operation input unit 35a that accepts input of operations made to the image processing apparatus 30, and a display unit 35b that displays and outputs various types of information. The operation input unit 35a may, for example, be a mouse and a keyboard, and the display unit 35b may, for example, be a display (e.g., a liquid crystal display). Additionally, a touch panel may be provided that functions as part of the operation input unit 35a and that also functions as part of the display unit 35b.

The image processing apparatus 30 has a function of generating the learning model 400 through machine learning on supervised data (e.g., image data on a plurality of leaning images) and, therefore, is also referred to as a learning model generation apparatus. The image processing apparatus 30 is also an apparatus that makes an inference about identification and/or classification of targets by using the trained learning model 400 and, therefore, is also referred to as the inference apparatus.

Although, in the present example, a variety of processing (functions) is implemented by the single image processing apparatus 30, the present disclosure is not limited to this example. For example, a variety of processing may be shared and implemented by a plurality of apparatuses. For example, the learning processing using the learning model 400 and the inference processing using the trained model 400 (420) may be executed by different apparatuses.

The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality.

Processors are processing circuitry or circuitry as they include transistors and other circuitry therein. The processor may be a programmed processor which executes a program stored in a memory.

In the disclosure, the processing circuitry, units, or means are hardware that carry out or are programmed to perform the recited functionality. The hardware may be any hardware disclosed herein or otherwise known which is programmed or configured to carry out the recited functionality.

When the hardware is a processor which may be considered a type of circuitry, the circuitry, means, or units are a combination of hardware and software, the software being used to configure the hardware and/or processor.

1-3. Learning Model 400

As described above, the image processing apparatus 30 includes the learning model 400. Here, a neural network model consisting of a plurality of layers or, more specifically, a convolutional neural network (CNN) model is used as the learning model 400. Then, the learning model 400 is trained by metric learning (deep metric learning). Specifically, adjustments are made on, for example, parameters (learning parameters) of various image filters (image filters for convolutional layers) for extracting features of a plurality of layers (in particular, a plurality of intermediate layers) in a convolutional neural network.

As described above, the learning model 400 trained by machine learning is also referred to as a trained model. The trained learning model 400 (trained model 420) is generated by adjusting the learning parameters of the learning model 400 (learning machine) by a predetermined machine learning method.

According to the present application, generating the trained model 400 (420) means manufacturing (producing) the trained model 400, and the "trained model generation method" means a "trained model production method."

Figure 2:
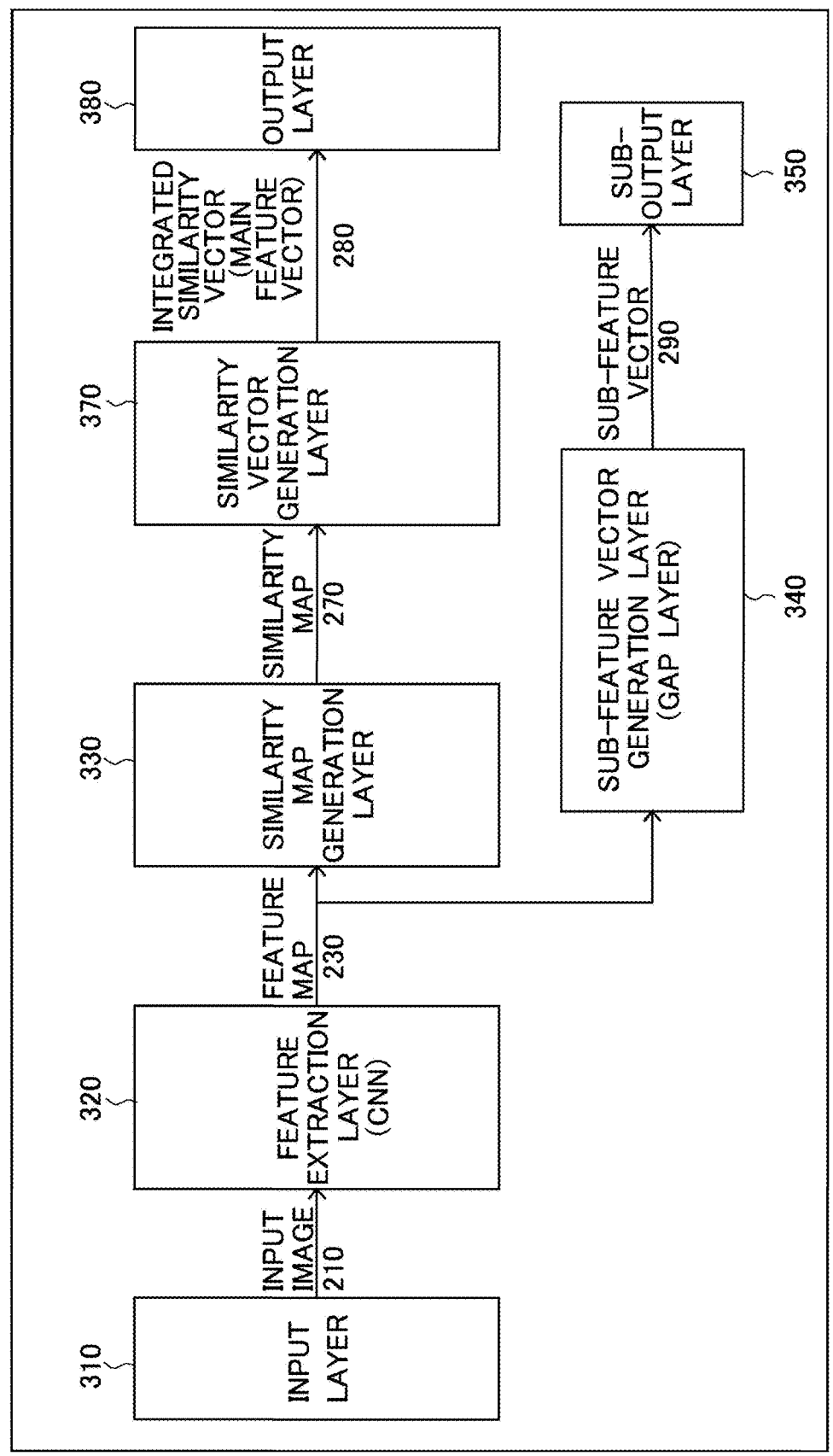
FIG. 2 shows a hierarchical structure of a earning model.
Figure 3:
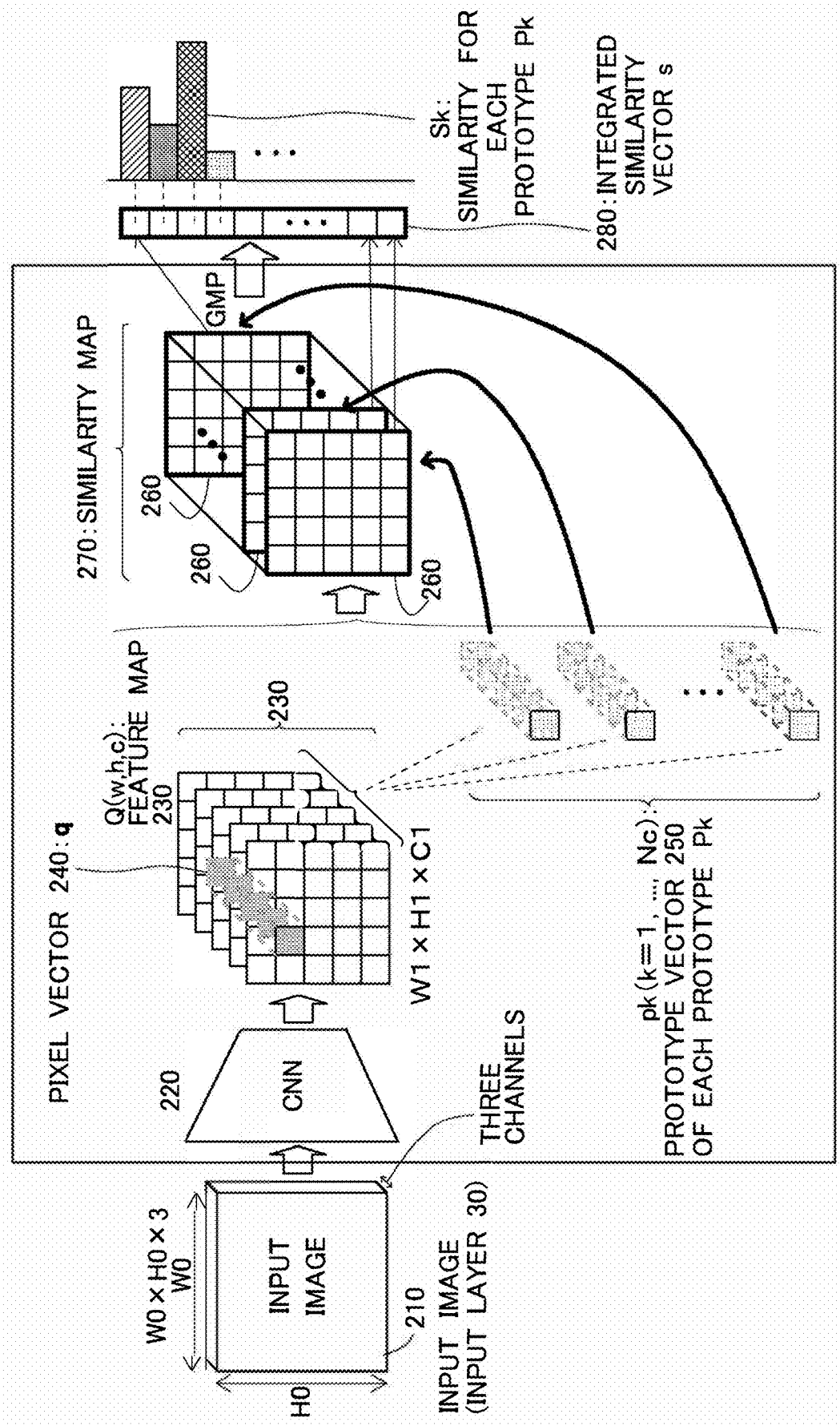
FIG. 3 shows a data structure and other structures of the learning model.

FIGS. 2 and 3 show a configuration of the learning model 400. FIG. 2 shows a hierarchical structure of the learning model 400, and FIG. 3 shows a data structure and other structures of the learning model 400.

As shown in FIG. 2, the learning model 400 has a hierarchical structure in which a plurality of layers (hierarchy) are hierarchically connected to one another. Specifically, the learning model 400 includes an input layer 310, a feature extraction layer 320, a similarity map generation layer 330, an integrated similarity vector generation layer 370, and an output layer 380.

Input Layer 310

The input layer 310 is a layer that accepts input of an input image 210. The input image 210 is a captured image of a target object (e.g., an image of a bird). For example, a (three-channel) color image having a pixel array (rectangular pixel array) of W0 pixels wide (across) by H0 pixels high (down) is input as the input image 210. In other words, the input image 210 is generated as W0×H0×C0 voxel data, where C0=3.

Feature Extraction Layer 320

The learning model 400 includes the feature extraction layer 320 following (next to) the input layer 310. The feature extraction layer 320 is configured to include a convolutional neural network (CNN) 220 (FIG. 3). The feature map 230 is generated by performing processing of the feature extraction layer 320 on the input image 210.

The feature extraction layer 320 includes a plurality of convolutional layers and a plurality of pooling layers (e.g., average pooling and/or maximum pooling). This convolutional neural network includes a plurality of intermediate layers. For example, part (feature extracted portions) of various convolutional neural network configurations (e.g., VGG or ResNet) may be used as the feature extraction layer 320.

Figure 4:
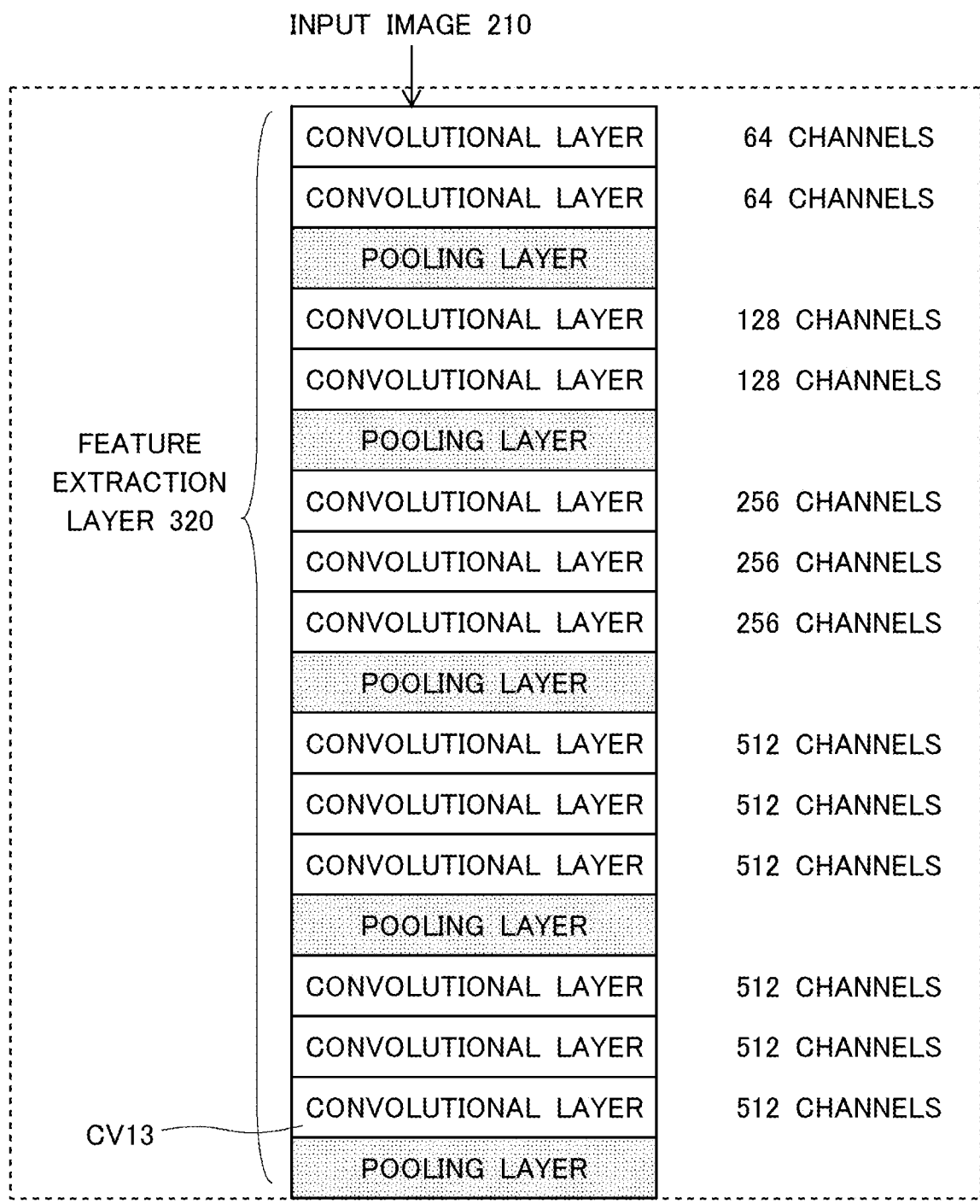
FIG. 4 shows one example of a configuration of a feature extraction layer.

For example, in the case of a VGG 16, the feature extraction layer 320 may consist of feature extraction layers (13 convolutional layers and five pooling layers) provided up to the last pooling layer next to the last convolutional layer CV13 (up to the pooling layer immediately before the fully connected layers (three layers)) (see FIG. 4). In other words, 18 layers starting from the next of the input layer 310 are provided as the feature extraction layer 320 in the convolutional neural network. In FIG. 4, some of the configuration (i.e., feature extraction portions up to the last pooling layer) of the VGG 16 (including the 13 convolutional layers, the five pooling layers, and the fully connected three layers) are shown by way of example as the feature extraction layer 320. In FIG. 4, illustration of an activation function or the like is appropriately omitted.

Alternatively, the whole (or part) of the feature extraction layer provided in a different convolutional neural network such as a residual network (ResNet) may be provided as the feature extraction layer 320 in the convolutional neural network. ResNet is a convolutional neural network that involves the addition of residuals between layers. The feature extraction layer in ResNet is configured by, for example, a plurality of residual blocks consisting of, for example, a combination of convolutional layers, activation functions, and skip connections (shortcut connections). In a general convolutional neural network, fully connected layers or the like are provided after the feature extraction layer and serve as layers for executing classification processing based on features extracted in the feature extraction layer (this layer is also referred to as a classification layer). The whole (or part) of the feature extraction layer provided immediately before such fully connected layers may be provided as the feature extraction layer 320 in the convolutional neural network.

The feature map 230 is output from a predetermined layer (here, the last pooling layer) in the convolutional neural network of the learning model 400. The feature map 230 is generated as a feature map having a plurality of channels. The feature map 230 is generated as three-dimensional array data (W1×H1×C1 voxel data) that includes C1 channels, each configured by two-dimensional array data on a pixel array (rectangular pixel array) of W1 pixels wide by H1 pixels high. The size (W1×H1) of each channel in the feature map 230 may, for example, be 14×14. The number of channels C1 included in the feature map 230 may, for example, be 512. The present disclosure is, however, not limited thereto, and the size of each channel and the number of channels may be any other values. For example, the number of channels C1 may be other values such as 256 or 1024.

Here, the feature extraction layer 320 is configured by, for example, repeatedly arranging one or a plurality of convolutional layers and one pooling layer. In each convolutional layer, features in the image are extracted by a filter that executes convolution processing. In each pooling layer, pooling processing (e.g., average pooling processing or maximum pooling processing) is also performed in which values such as an average pixel value or a maximum pixel value are extracted for each very small range of pixels (e.g., a 2 by 2 pixel range) to reduce the size of pixels (e.g., reduced to a half in each direction (lengthwise and crosswise)) (i.e., the amount of information is condensed).

Then, processing in the feature extraction layer 320 (convolution processing and pooling processing) is performed on the input image 210 so as to generate the feature map 230. In this way, the feature map 230 is generated by the intermediate layers provided after the input layer 310 and including a plurality of convolutional layers and a plurality of pooling layers in the convolutional neural network. Accordingly, various image features in the input image 210 are extracted for each channel in the feature map 230. The image features in the input image 210 are also extracted while their rough positions are maintained in the two-dimensional image for each channel in the feature map 230.

In this way, the feature extraction layer 320 is a layer for generating the feature map 230 obtained from predetermined layers in the convolutional neural network (CNN) 200 in response to input of the input image 210. The feature map 230 corresponds to voxel data that indicates features of each partial region in the input image 210 for a plurality of (C1) channels CH.

Similarity Map Generation Layer 330

The similarity-map generation layer 330 is a processing layer for generating a similarity map 270 in accordance with the feature map 230 and a plurality of prototype vectors 250 (see FIG. 3). Each prototype vector 250 is also expressed as a prototype vector p (or pk).

Each prototype vector p (k-th prototype vector pk) (see FIG. 3) is a parameter sequence that is trained as a prototype PT (k-th prototype PTk) that indicates a candidate for a specific image feature concept configured by a plurality of channels CH. Each prototype vector p is a vector consisting of a plurality of parameters to be trained and is a vector having the same number of dimensions as the number of channels (the number of dimensions in the depth direction) in the feature map 230. In broad outline, each prototype vector p is a vector that is trained to indicate a specific image feature of a specific image, and is trained so as to become closer to any pixel vector q (described next) in the feature map 230 of any image.

The learning model 400 generates a plurality of (Nc; e.g., 512) such prototype vectors p. In other words, a plurality of (Nc) prototype vectors pk are generated, where k is the value from 1 to Nc.

On the other hand, each pixel vector q (qwh) in the feature map 230 is a vector that represents an image feature across the plurality of channels CH at each planar position (w, h) of each pixel in the feature map 230. In FIG. 3, the pixel vector q at a given position (w, h) in the feature map 230 is hatched (more specifically, a columnar space that corresponds to the pixel vector q and extends in the depth direction). The number of dimensions of the pixel vector q (the number of dimensions in the depth direction) is the same as the number of channels (CH1) in the feature map 230. Each pixel vector q in the feature map 230 indicates a specific image feature of a specific region in the original image of the feature map 230. In other words, each pixel vector q is a vector that indicates a feature of a partial region in a specific image (an image feature representing vector for a partial region).

The similarity-map generation layer 330 generates a planar similarity map 260 (planar map or 2D map) that indicates similarity Sim (qwh, pk) between each pixel vector qwh and one prototype vector pk for each planar position. The planar similarity map 260 corresponding to the k-th prototype vector pk is also referred to as the k-th planar similarity map. The similarity-map generation layer 330 further generates a similarity map (3D map) 270 configured of planar similarity maps 260 for a plurality of prototypes PTk (a plurality of prototype vectors pk). Here, the similarity Sim (q, pk) is a function for calculating similarity between the prototype vector pk and each of a plurality of pixel vectors q (more specifically, qwh) in the feature map 230. This function may, for example, be cosine similarity. However, the present disclosure is not limited to this example, and any other function (e.g., any of various distance functions) may be used as the function for calculating the similarity Sim.

As shown in FIG. 3, similarity between a given prototype vector (k-th prototype vector pk) and each pixel vector 240 (qwh) is arranged at each position (w, h) in a single planar similarity map 260 (planar map or 2D map). Then, such a planar similarity map 260 is generated for each of a plurality of (Nc) prototype vectors pk, where k is the value from 1 to Nc, so as to generate the similarity map 270 (3D map). In other words, the similarity map 270 is a 3D map in which a plurality of planar maps 260 are stacked in the depth direction. Note that the similarity map 270 can also be expressed as a type of "feature map" (in a broad sense), although it is different from the feature map 230.

Integrated Similarity Vector Generation Layer 370

The integrated similarity vector generation layer 370 is a processing layer for generating an integrated similarity vector 280 on the basis of the similarity map 270.

The integrated similarity vector 280 is a vector having Nc dimensions. The integrated similarity vector 280 is also indicated as the integrated similarity vector s. The k-th component Sk of the integrated similarity vector s is calculated by performing GMP processing on the planar similarity map 260 corresponding to the k-th prototype vector. That is, the k-th component Sk is a maximum value among a plurality of values in the planar similarity map 260 corresponding to the k-th prototype vector. This k-th component Sk of the integrated similarity vector 280 represents similarity between the k-th prototype vector and the feature map 230 (more specifically, a given pixel vector q in the feature map 230) and is expressed by Expression (1). To be more specific, the k-th component Sk is a maximum value of similarity between the k-th prototype vector pk and an arbitrary pixel vector q in the feature map 230.

Mathematical Expression 1

$$S_k = \max_q Sim(q, p_k) \qquad (1)$$

Note that global max pooling (GMP) processing is one kind of maximum pooling processing.

Maximum (max) pooling processing is processing for extracting, as a feature value (output value), a maximum value (maximum pixel value) from among a plurality of pixels corresponding to the kernel (filter) size as a feature value (output value). In the maximum pooling processing, in general a maximum value is often extracted from among a plurality of pixels (e.g., four pixels) that correspond to a filter size (e.g., 2 by 2 size) smaller that the channel size.

The global max pooling (GMP) processing is maximum pooling processing targeted for the "whole channel" (here, the whole of one planar similarity map 260). The GMP processing (whole maximum pooling processing) is maximum pooling processing for extracting a maximum value from among a plurality of pixels (all pixels in the channel; e.g., 196 pixels) that correspond to the same filter size (e.g., W1×H1=14×14) as the channel size (the size of one planar similarity map 260).

By performing the GMP processing (global max pooling processing) on each of a plurality of planar similarity maps 260, a maximum pixel value is extracted for each channel (for each prototype) of the feature map to be processed (here, the similarity map 270). If the GMP processing is performed on the similarity map 270 having Nc (e.g., 512) channels (prototypes), Nc maximum values (e.g., 512 maximum values) are output for each channel (for each prototype). In other words, the integrated similarity vector 280 is generated as a vector having Nc dimensions (e.g., 512 dimensions). This integrated similarity vector 280 is a vector that summarizes the similarity Sk between the input image and each prototype (integrates a plurality of prototypes PT). The integrated similarity vector 280 is a vector indicating similarity between the input image and each prototype (in other words, image features) and is also expressed as a type of "feature (value) vector."

In this way, the integrated similarity vector 280 is generated in accordance with the similarity between each pixel vector and one prototype vector, the pixel vector being a vector that represents an image feature across a plurality of channels at each planar position of each pixel in the feature map 230. The integrated similarity vector 280 is a vector that indicates the similarity between the input image 210 and each prototype for a plurality of prototypes.

Figure 25:
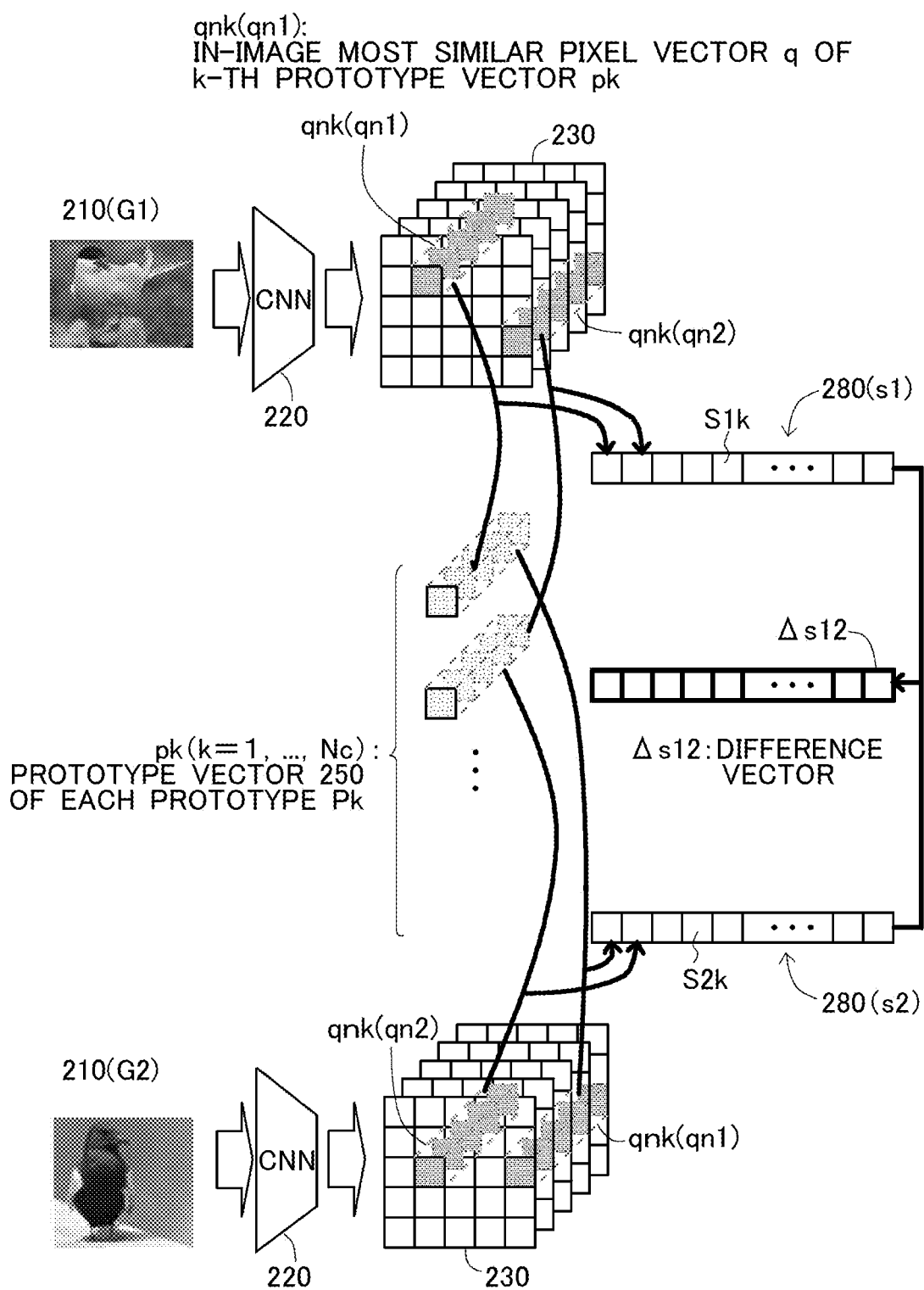
FIG. 25 partly shows how to generate decision-making basis that indicates that two images are dissimilar to each other.

Each component Sk of the integrated similarity vector 280 of a given input image 210 can also be expressed as an index value that represents similarity (or distance) between the k-th prototype vector and an in-image most similar pixel vector q (also indicated by qnk) for the input image 210 (see also FIG. 25). The in-image most similar pixel vector qnk is a pixel vector q that is most similar to the k-th prototype vector pk among a plurality of pixel vectors q in the feature map 230 output from the CNN 220 (feature extraction layer 320) in response to input of the input image 210. Each component Sk indicates the degree (extent) of existence of the image feature expressed as the k-th prototype vector pk in the input image 210. In other words, the similarity Sk is also expressed as the degree of existence of the prototype PTk (the concept therefor) in the input image. This integrated similarity vector 280 may be generated directly, without generating the similarity map 270, in accordance with a plurality of prototype vectors p and each pixel vector q in the feature map 230.

Output Layer 380

The output layer 380 is a processing layer for outputting the integrated similarity vector 280 as-is. In other words, the output layer 380 outputs a mapping (integrated similarity vector 280) generated by the learning model 400 in response to input of the input image 210.

1-4. Learning Processing on Learning Model 400

In step S11 (FIG. 5), learning processing using the learning model 400 (machine learning processing) is executed. The learning processing (processing at the stage of training the learning model 400) is executed based on a plurality of learning images.

First, the image processing apparatus 30 generates a plurality of learning images by performing, for example, size adjustment processing (resizing processing) on each of a plurality of captured images acquired from the image capturing devices 20 or other devices to prepare these images as a group of input images that are input to the learning model 400. It is assumed that the class that each learning image belongs to (e.g., "the type of each bird") is assigned in advance as a label (correct data) to the learning data (i.e., each learning image is labelled, i.e., annotated). For example, in the case where a plurality of images of subjects include a plurality of types of birds, the type of each bird (e.g., "pelican" or "green jay"), which is a subject in each image, is assigned in advance to the image as the class of the image. Such images (data) labelled in advance are used as supervised data (supervised data with correct labels).

In the present embodiment, the image processing apparatus 30 basically executes metric learning (also referred to as distance learning) as machine learning processing. To be more specific, deep metric learning on a deep neural network (in particular, a convolutional neural network) is used. The metric learning uses the learning model 400 that outputs feature vectors in a feature space (feature value space) in response to input of the input image. This learning model 400 is also expressed as a model that indicates conversion (mapping) from the input image (input) to the feature vectors (output).

Figure 7:
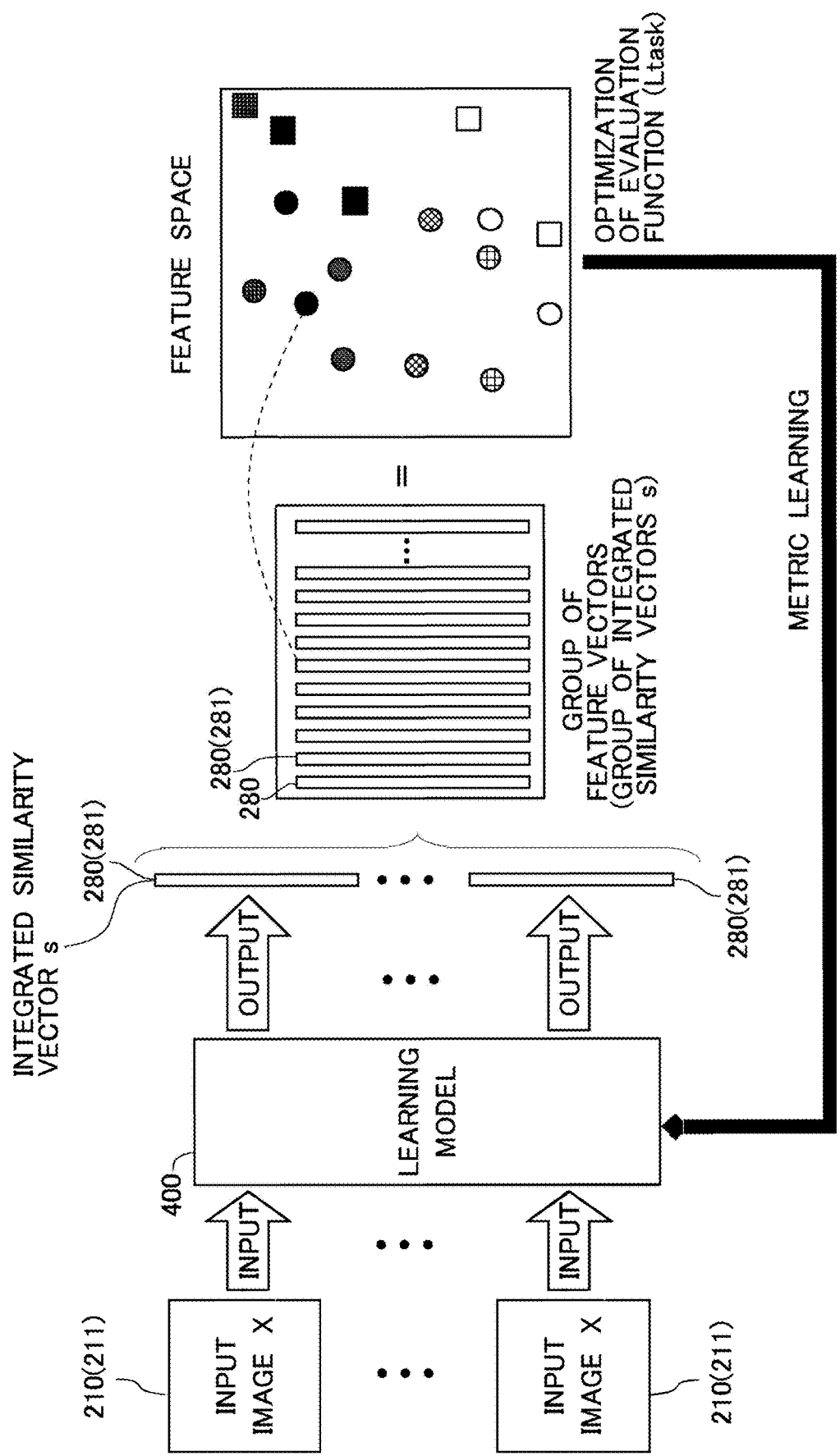
FIG. 7 shows a feature space and so on before progression of the learning processing.
Figure 8:
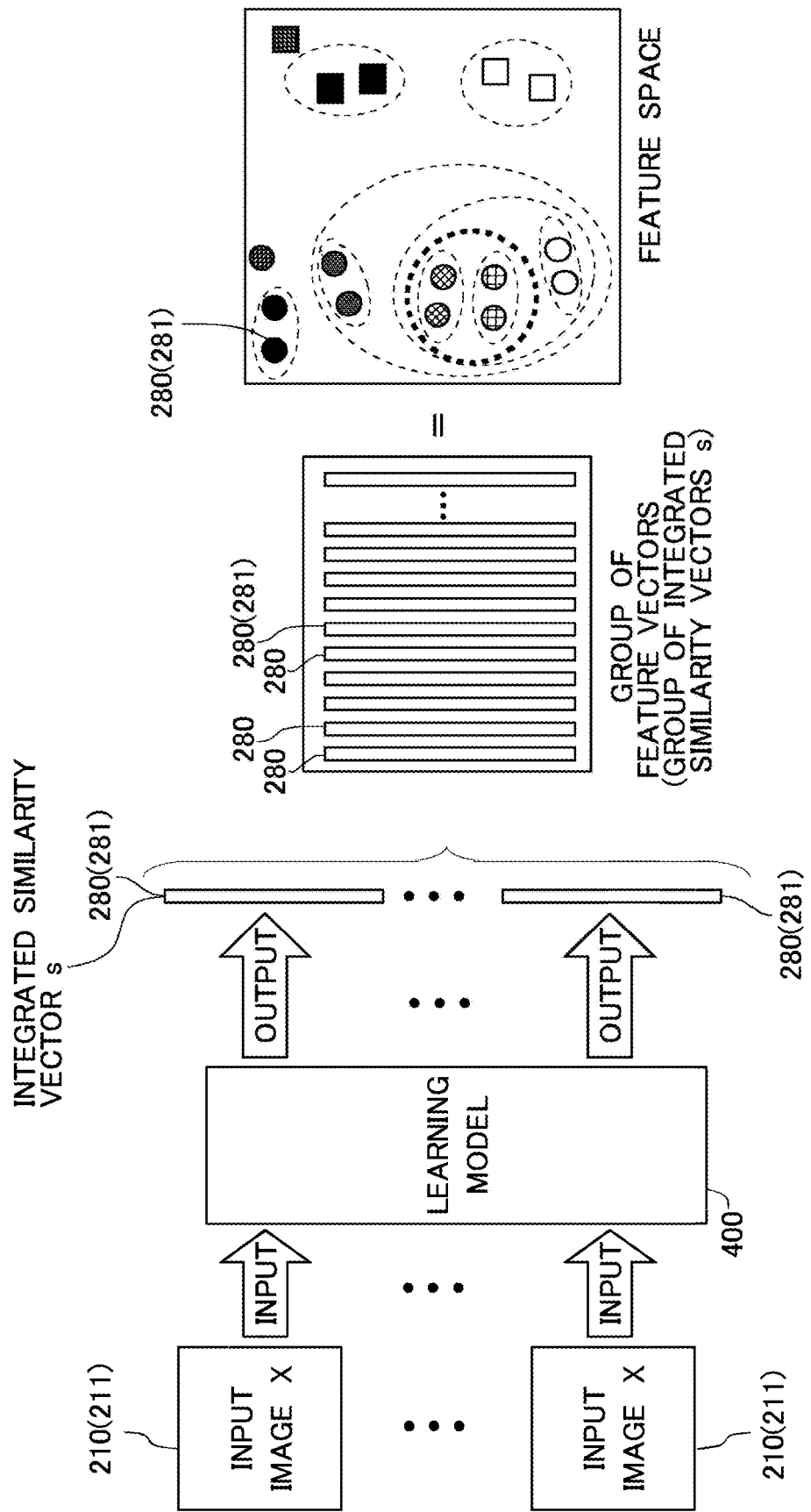
FIG. 8 shows the feature space and so on after the progression of the learning processing.

A plurality of learning images (a group of input images) are sequentially input to the learning model 400, and a plurality of outputs, i.e., a plurality of feature vectors (a group of feature vectors) in a feature space are sequentially output from the learning model 400. Ideally, in the feature space, a plurality of feature vectors that correspond to a plurality of input images that includes subjects of the same class (e.g., birds of the same type) are located at close positions to one another, and a plurality of feature vectors that correspond to a plurality of input images relating to different classes (birds of different types) are located at distant positions from one another. However, the distribution of a group of feature vectors based on outputs from the learning model 400 before learning (see FIG. 7) is deviated from an ideal distribution condition (see FIG. 8). In FIGS. 7 and 8, each point-like figure (e.g., a small square or a small circle) located in rectangles indicating feature spaces on the far-right portion represents each feature vector located in the feature space. Feature vectors of the same class (a plurality of feature vectors that correspond to a plurality of images that belong to the same class) are indicated by the same figures (e.g., white circle figures). Conversely, feature vectors of different classes (a plurality of feature vectors that correspond to a plurality of images that belong to different classes) are indicated by different figures (e.g., differently hatched figures).

Next, in the metric learning, the learning model 400 is trained so as to optimize (minimize) an evaluation function such as Triplet Loss. Accordingly, the learning model 400 (mapping relationship) is trained such that similarity of the input image in the input space corresponds to a distance in the feature space (distance between feature vectors). In other words, the positions of distribution of feature vectors in the feature space gradually change with the progress of learning. If considerably excellent machine learning is executed, the distribution of feature vectors in the feature space gradually becomes closer to the aforementioned ideal distribution condition (see FIG. 8).

Figure 6:
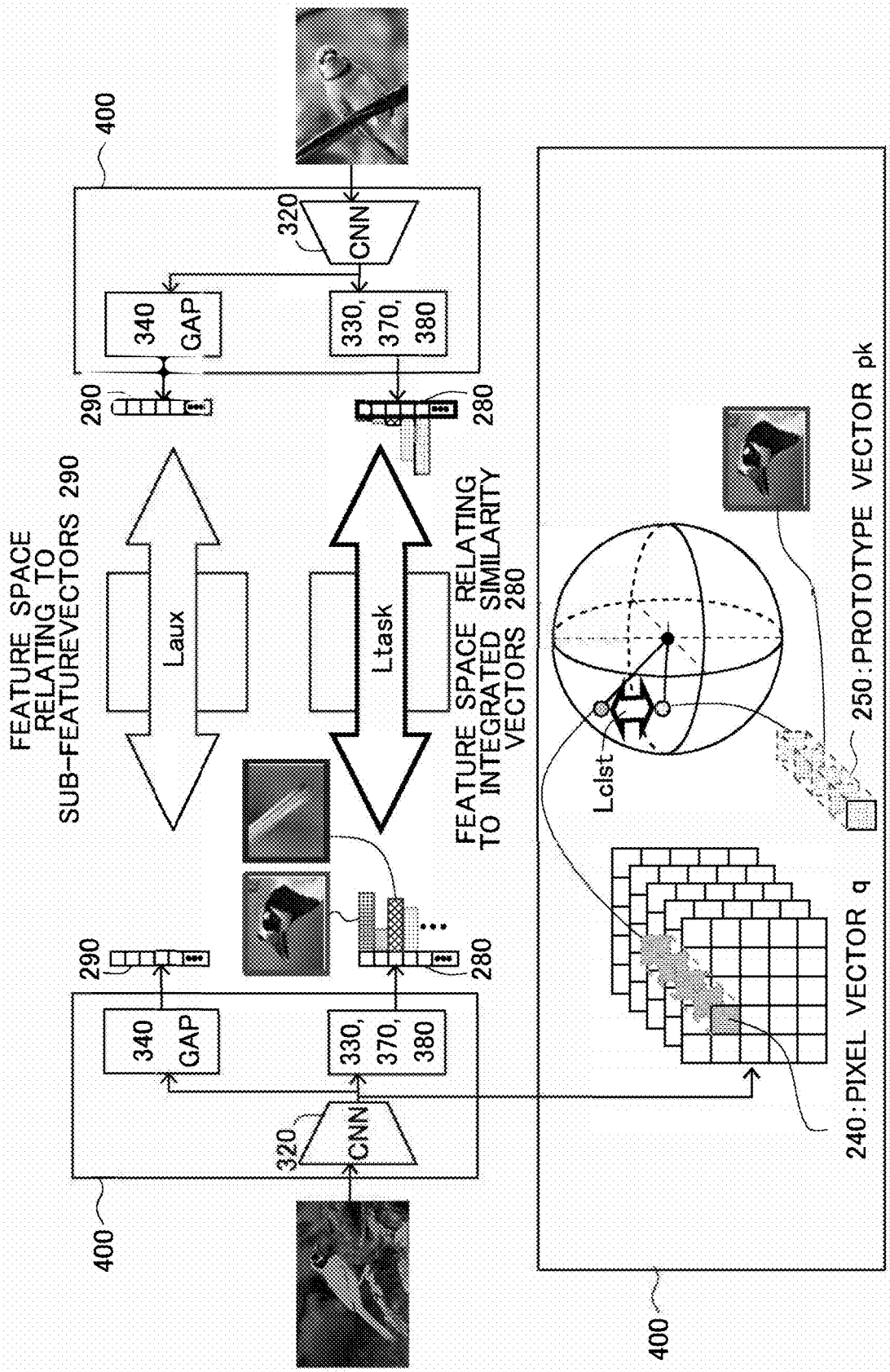
FIG. 6 shows a general outline of learning processing.

FIG. 6 shows a general outline of the learning processing according to the present embodiment. As shown in FIG. 6, two types of metric learning (distance learning) is executed in the present embodiment (see the upper section in FIG. 6). One type is metric learning that handles the integrated similarity vectors 280 as feature vectors. The other type is metric learning that handles sub-feature vectors 290 as feature vectors. In the present embodiment, the metric learning relating to the integrated similarity vectors 280 is executed as primary metric learning, and the metric learning relating to the sub-feature vectors 290 is executed as secondary (auxiliary) metric learning. In the present embodiment, other learning processing is also executed so as to bring each prototype vector pk (250) closer to any image feature (any pixel vector q (240)) of a specific partial region in a specific image—(see the lower section in FIG. 6).

To implement the learning processing as shown in FIG. 6, in the present embodiment, the learning model 400 is subjected to machine learning so as to optimize (minimize) the (whole) evaluation function (loss function) L having three types of evaluation terms (evaluation functions) Ltask, Lclst, and Laux (described later). For example, the evaluation function L may be expressed as a linear sum (linear combination) of the three types of evaluation terms Ltask, Lclst, and Laux as shown in Expression (2). Values λc and λa indicate hyper-parameters for striking a balance among the evaluation terms.

Mathematical Expression 2

$$L = L_{task} + \lambda_C * L_{clst} + \lambda_a * L_{aux} \quad (2)$$

Hereinafter, each of the evaluation terms Ltask, Lclst, and Laux is described one by one.

Evaluation Term Ltask

The evaluation term Ltask is an evaluation term for distance learning (metric learning) based on a plurality of integrated similarity vectors 280 corresponding to a plurality of images. For example, the evaluation term Ltask may be expressed by Expression (3) below. Note that symbols expressed within brackets with a plus sign as a subscript at the lower right side refer to outputting a larger value of either zero or the value v within the brackets. That is, these symbols represent max (v, 0).

Mathematical Expression 3

$$L_{task} = \frac{1}{N} \sum_{a \in B} \{[d_{ap} + m - \beta]_+ + [m - d_{an} + \beta]_+\} \quad (3)$$

Here, a distance dap (dap) is the distance between a feature vector (here, integrated similarity vector 280) that corresponds to a given image (anchor image) and a feature vector (integrated similarity vector 280) that corresponds to a different image (positive image) that belongs to the same class as the given image. A distance dan (d_an) is the distance between the feature vector (integrated similarity vector 280) corresponding to the given image (anchor image) and a feature vector (here, integrated similarity vector 280) that corresponds to an image (negative image) that belongs to a different class from the given image. A combination of the anchor image and the positive image is also referred to as a positive pair, and a combination of the anchor image and the negative image is also referred to as a negative pair. The distance dap is the distance between the integrated similarity vectors 280 of the positive pair, and the distance dan is the distance between the integrated similarity vectors 280 of the negative pair.

Expression (3) represents the evaluation function for reducing the distance dap between a pixel concerned (anchor) and an element classified as being the same as the pixel concerned (positive) to a certain degree or less and increasing the distance dan between the pixel concerned and an element classified as being different from the pixel concerned (negative) to a certain degree or more. The value m indicates a hyper-parameter that indicates a margin. It is intended to increase the distance between the feature vectors in the negative pair to the value (β+m) or more and to reduce the distance between the feature vectors in the positive pair to fall within the range of values (β−m). The value β indicates a learning parameter for each class (for each anchor) that is an adjusting parameter for adjusting the degree of adjustment of positions in the feature space between classes (between anchors).

Expression (3) calculates a sum total Σ by adding all the values in braces for a plurality of learning images and calculates an averaged value as Ltask by dividing the sum total Σ by the total number N of the images (the number of anchors).

By causing the learning processing to proceed in this way to minimize the evaluation function Ltask, distance learning based on the integrated similarity vectors 280 is implemented. Specifically, a plurality of integrated similarity vectors 280 that correspond to a plurality of input images that include subjects of the same class (e.g., birds of the same type) are arranged at close positions to one another in the feature space. On the other hand, a plurality of integrated similarity vectors 280 that correspond to a plurality of input images relating to different classes (birds of different types) are arranged at distant positions from one another.

Evaluation Term Laux

The evaluation term Laux is an evaluation term for distance learning based on the a plurality of sub-feature vectors 290 corresponding to a plurality of images.

For example, the evaluation term Laux may be expressed by Expression (4) below. Expression (4) represents the evaluation function (evaluation term) for achieving metric learning relating to the sub-feature vectors 290 as described above.

Mathematical Expression 4

$$L_{aux} = \frac{1}{N} \sum_{a \in B} \{[d'_{ap} + m - \beta']_+ + [m - d'_{an} + \beta']_+\} \quad (4)$$

In Expression (4), each value has the same meaning as the corresponding one in Expression (3). It is, however, noted that the values differ in that the distance relating to the sub-feature vectors 290 is taken into consideration, instead of the distance relating to the integrated similarity vectors 280.

Here, a distance d'ap is the distance between feature vectors (here, sub-feature vectors 290) of a positive pair relating to a given image (anchor image). A distance d'an is the distance between feature vectors (here, sub-feature vectors 290) of a negative pair relating to the given image (anchor image). The value m' indicates a hyper-parameter that indicates a margin. It is intended to reduce the distance between the feature vectors of the same class to fall within the range of values (β'−m') and to increase the distance between the feature vectors of different classes to a value (β'+m') or more. The value β' indicates a learning parameter for each class (for each anchor) that is an adjustment parameter for adjusting the degree of adjustment of positions between classes (between anchors) in the feature space.

This evaluation term Laux is used as an auxiliary evaluation term. Although the evaluation term Laux is taken into consideration according to the present embodiment, it is not always necessary to consider the evaluation term Laux (the evaluation term Laux may be omitted). However, it is possible, by considering the evaluation term Laux, to more appropriately construct the CNN (feature extraction layer 320) and, as a result, to improve the accuracy of inference.

Note that the evaluation function (evaluation term) for achieving metric learning relating to the sub-feature vectors 290 is not limited to the evaluation function expressed by Expression (4) and may be any other evaluation value (e.g., any of various triplet losses such as a loss function for making the distance between the negative pair larger than the distance between the positive pair). The same can be said of the evaluation function (Expression (3)) for achieving metric learning relating to the integrated similarity vectors 280.

Evaluation Term Lclst and Learning Processing

An evaluation term Lclst is the evaluation term for bringing each prototype vector p closer to the image feature (any pixel vector q) of a partial region of any image. To be more specific, the evaluation term Lclst is the evaluation term for bringing the prototype vector pk of the belonged prototype PTk for each image i closer to any pixel vector q in the feature map 230 corresponding to the image i (see the lower section in FIG. 6). As will be described later, each prototype vector pk is brought closer to any pixel vector q in the feature map 230 corresponding to each image i in accordance with distributed prototype belongingness Bi(k) of each belonged prototype PTk in the image i. Thus, each prototype vector pk may be brought closer to two or more pixel vectors q existing in different images.

In the learning processing according to the present embodiment, distance learning (metric learning) relating to the integrated similarity vectors 280 is basically executed. Specifically, by taking the evaluation term Ltask into consideration, the learning model 400 is trained such that the distribution of the integrated similarity vectors 280 in the feature space becomes closer to the ideal distribution condition.

In the learning processing according to the present embodiment, by further taking the evaluation term Lclst, the learning model 400 is also trained such that each prototype vector pk is brought closer to the image feature (any pixel vector q) of any partial region of any image.

Hereinafter, such learning processing (learning processing based on the evaluation term Lclst) is mainly described.

Figure 9:
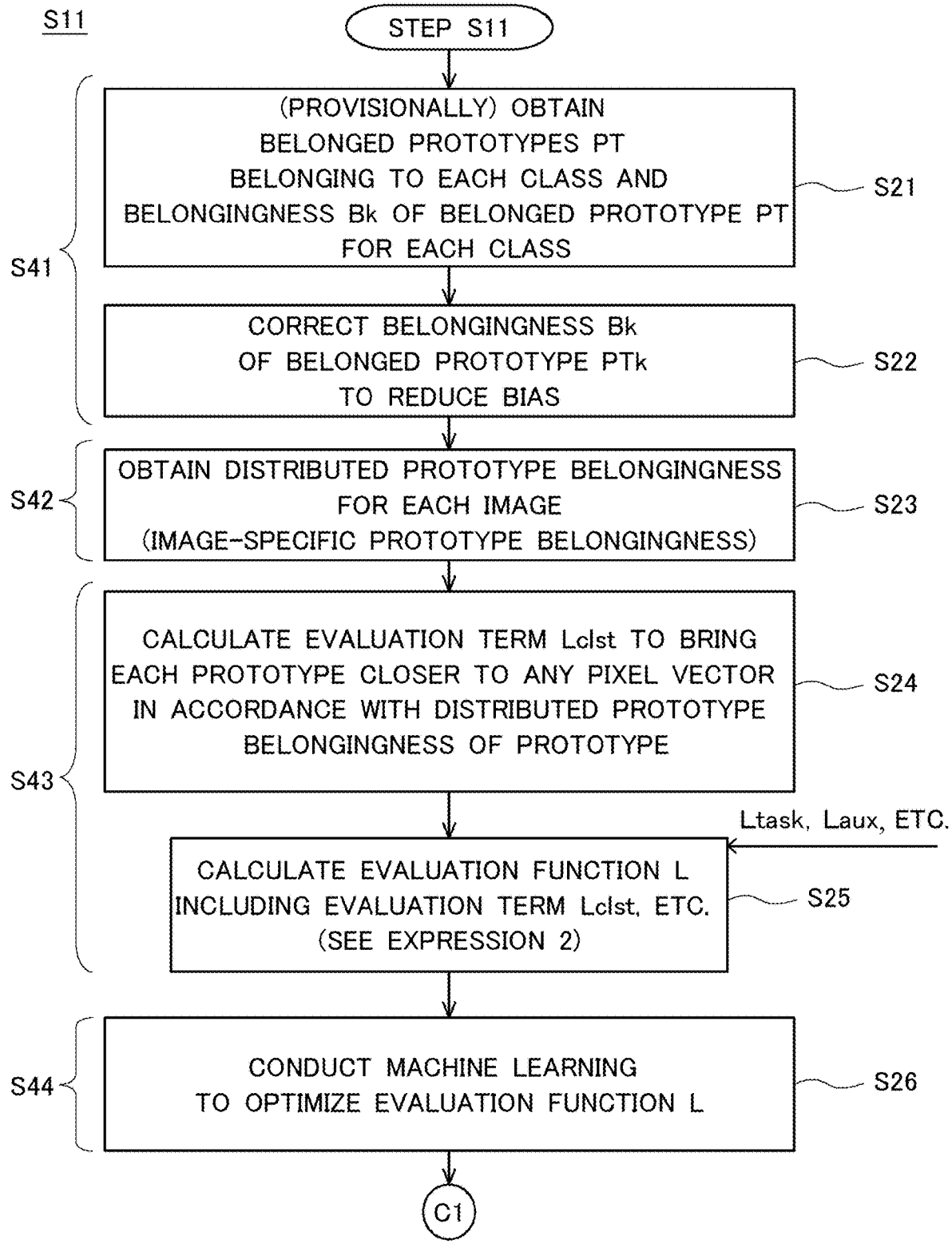
FIG. 9 is flowchart showing details on the learning processing.
Figure 10:
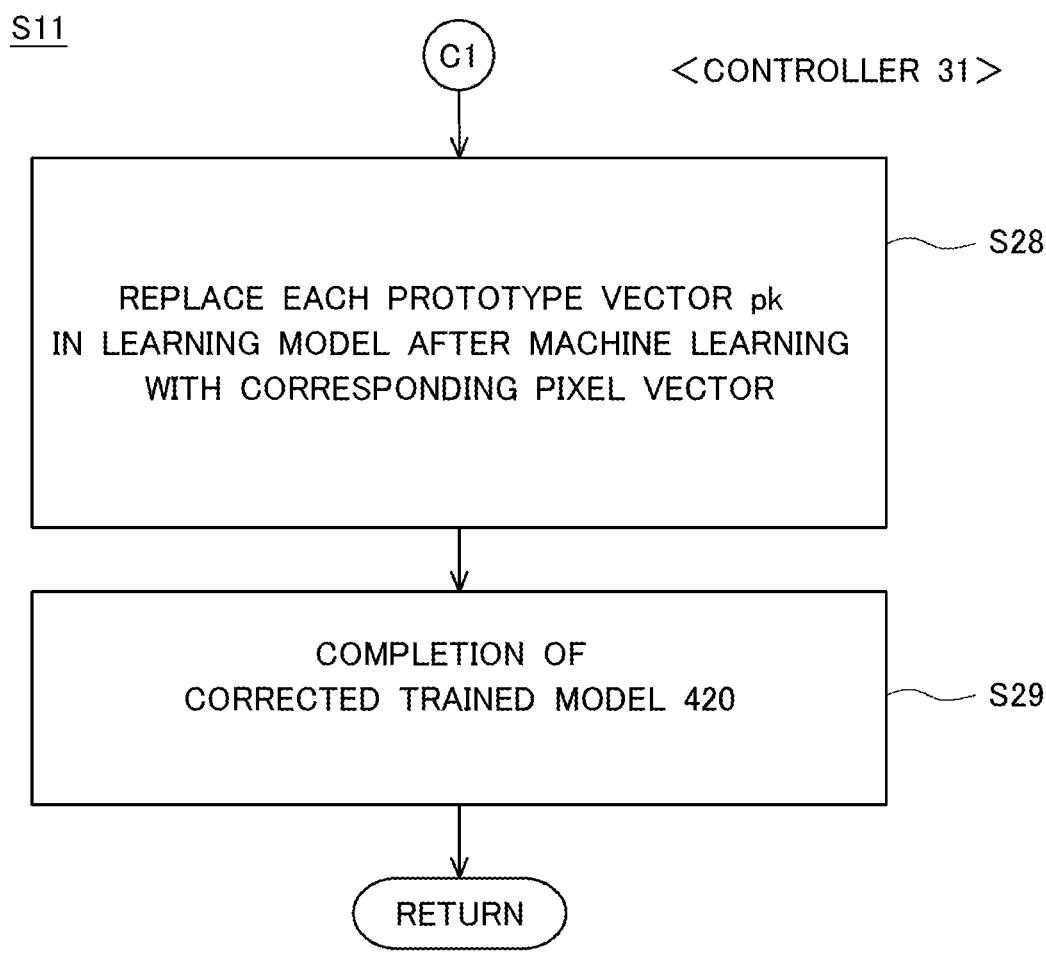
FIG. 10 is a flowchart showing details on the learning processing.
Figure 11:
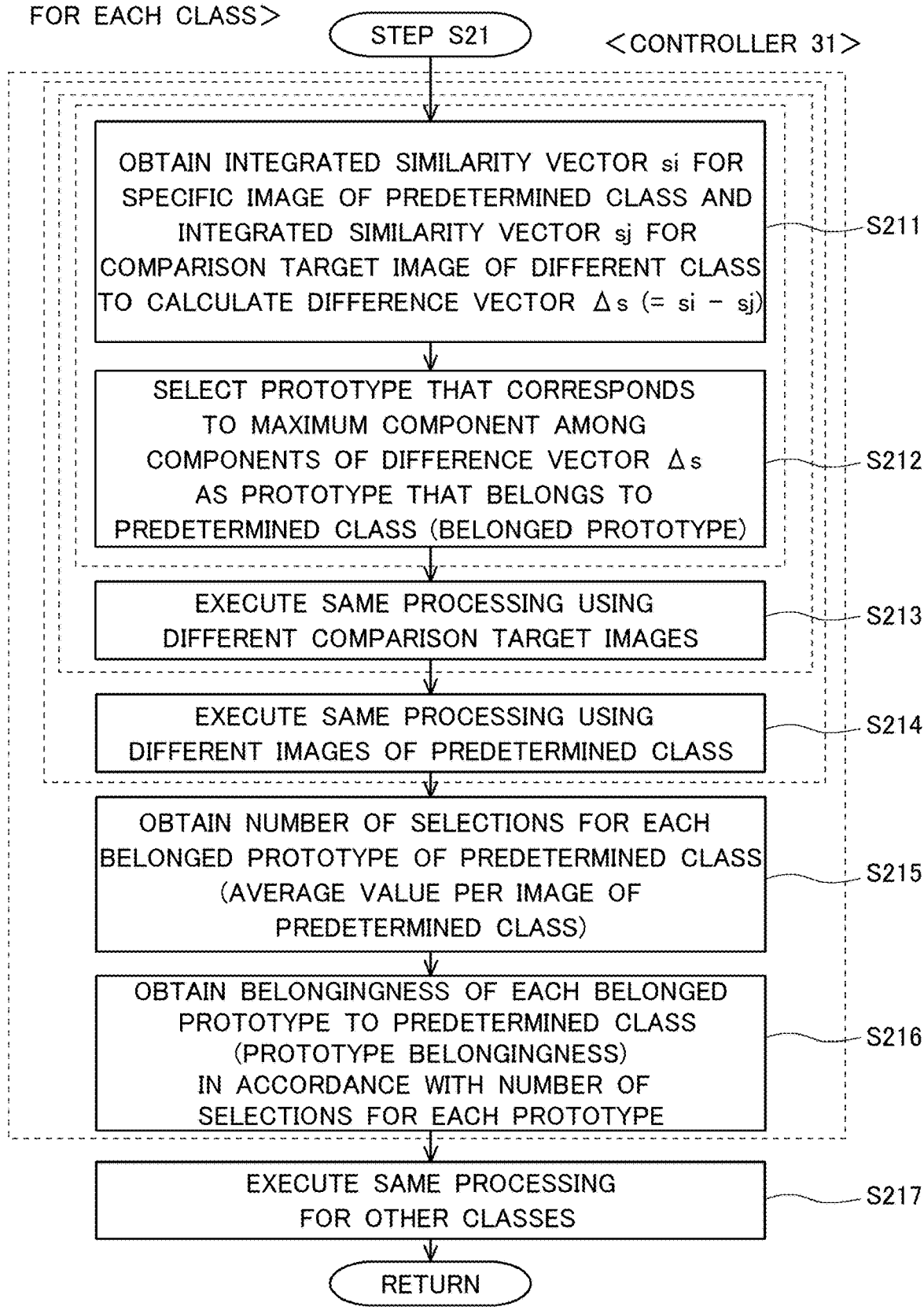
FIG. 11 is a flowchart showing details on part of the processing in FIG. 9.

FIGS. 9 and 10 are flowcharts showing details on the learning processing (step S11 in FIG. 5) according to the present embodiment. The flowchart in FIG. 9 mainly shows learning processing in relation to the evaluation term Lclst and shows other learning processing in relation to the evaluation terms Ltask and Laux in simplified form. FIG. 11 is a flowchart showing details on part of the processing in FIG. 9 (step S21). FIG. 12 shows the learning processing in relation to the evaluation term Lclst The learning processing in relation to the evaluation term Lclst is roughly divided into three (or four) processes (step S41, S42, and (S43, S44)) as shown in FIGS. 9 and 12.

In step S41, the controller 31 obtains belonged prototypes PT (PTk) of each class and belongingness Bk of each belonged prototype PT (PTk) to the class for each of a plurality of classes labelled to a plurality of learning images. Specifically, the belonged prototypes PTk that are prototypes belonging to one class (class concerned) and the prototype belongingness Bk that indicates the degree of belongingness of each belonged prototype PTk to the one class are obtained for each of a plurality of classes (classes concerned). The prototype belongingness Bk can also be expressed as the degree (extent) that each prototype PTk expresses the image feature of the one class. Step S41 includes steps S21 and S22 (FIG. 9).

In step S42, the controller 31 obtains distributed prototype belongingness Bik that is prototype belongingness for each image. The distributed prototype belongingness Bik is the belongingness obtained by distributing prototype belongingness Bk of each belonged prototype PTk in each class into two or more images of the same class (e.g., birds of the same type) in accordance with a predetermined reference. The distributed prototype belongingness Bik is also noted as distributed prototype belongingness Tik. The distributed prototype belongingness Bik (Tik) is also referred to as image-specific prototype belongingness. Step S42 includes step S23.

In steps S43 and S44, the controller 31 executes learning processing so that each prototype vector p becomes closer to any pixel vector in the feature map corresponding to each image in accordance with the distributed prototype belongingness Bik for the image. In other words, learning processing is executed so as to bring each prototype vector p further closer to the closest pixel vector q among a plurality of pixel vectors q in the feature map 230 of each image.

The controller 31 also executes learning processing in steps S43 and S44 when executing the learning processing (e.g., metric learning) based on a plurality of integrated similarity vectors 280 corresponding to a plurality of images. In other words, when the learning processing is executed based on the integrated similarity vectors 280 (including distance learning), the learning model 400 is subjected to machine learning so as to bring each prototype vector p closer to any pixel vector in the feature map corresponding to each image. Through this machine learning, each parameter in the learning model 400 (prototype vector p and each parameter relating to, for example, the convolutional neural network 220) is trained. Steps S43 and S44 include steps S24, S25, and S26.

To be more specific, the evaluation functions L (including, for example, the evaluation terms Ltask and Lclst) are obtained in step S43 (steps S24 and S25), and the learning processing based on the evaluation functions L is executed in step S44 (step S26).

Hereinafter, details on the processing will be described in sequence starting from step S41. First, the processing in step S21 (see also FIG. 11) in step S41 is executed. In step S21, the belonged prototypes PTk that belong to each class and the belongingness Bk of each belonged prototype are obtained (provisionally) for each of a plurality of classes.

Figure 13:
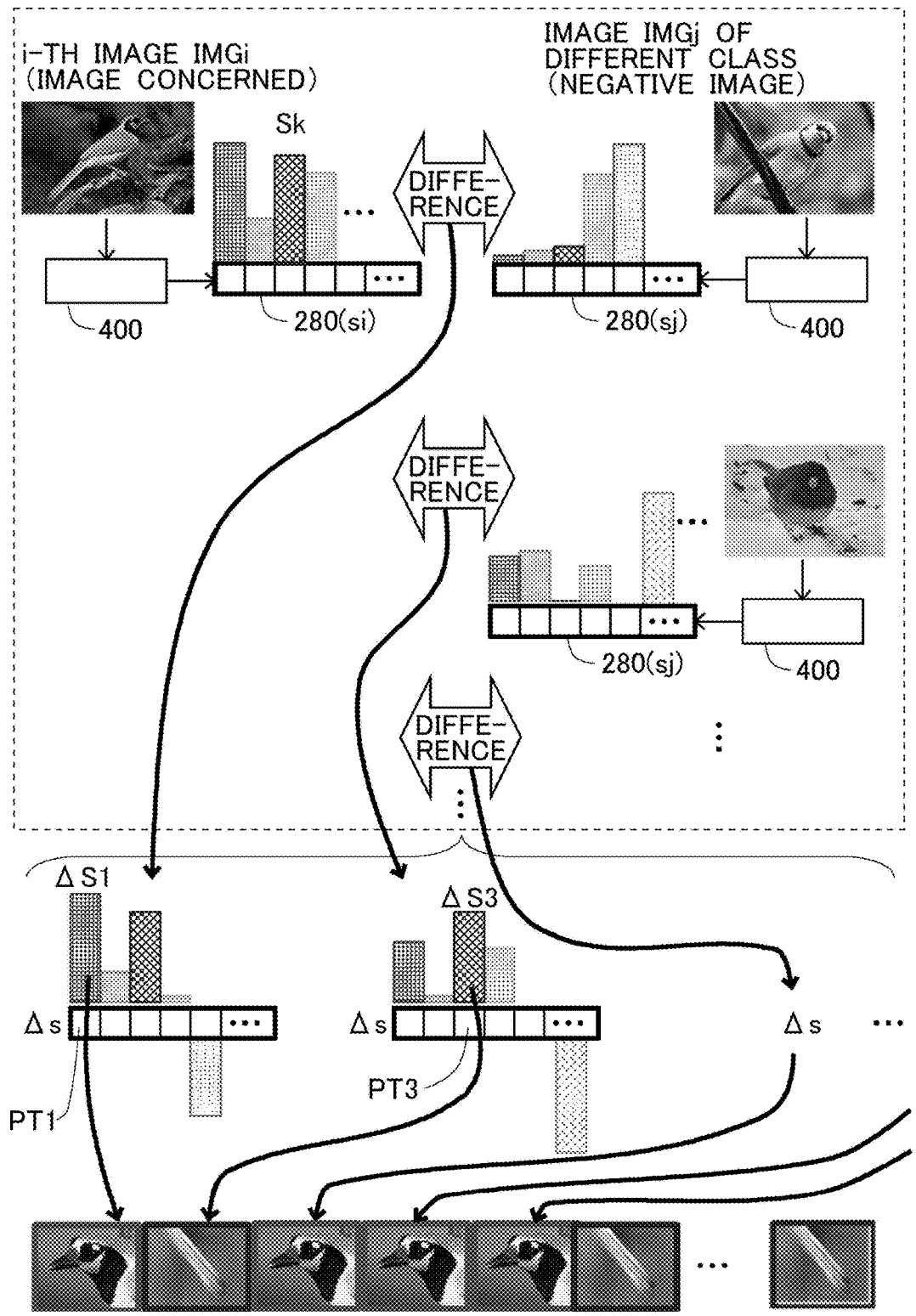
FIG. 13 shows prototype selection processing.

Specifically, in steps S211 to S215 (FIG. 11), the controller 31 executes prototype selection processing for selecting belonged prototypes of one class (class concerned). FIG. 13 shows the prototype selection processing. The prototype selection processing is described with also reference to FIG. 13.

In the prototype selection processing, firstly, comparison is made between a predetermined image IMGi that belongs to one class (class concerned) among a plurality of learning images and each of a plurality of comparison target images IMGj that belong to classes (negative classes) other than the one class. Then, on the basis of the result of comparison, the belonged prototypes of the one class (and the belonged prototypes PT based on the predetermined image) are selected on the basis of the results of comparison (steps S211 to S213).

In FIG. 13, the i-th image IMGi on the left side is focused on as a predetermined image (image concerned) that belongs to one class (class concerned) among a plurality of learning images. As targets to be compared with the predetermined image, there are a plurality of comparison target images IMGj (see the right side in FIG. 13) that belong to classes (negative classes) other than the one class. For example, the i-th image IMGi (image concerned) may be one sample (predetermined image) in a given class (e.g., birds of the type called "green jay"). In the case where the number of samples (learning images) in a mini batch as a unit of learning is 100 and five samples per class are prepared for 20 classes, the number of samples that belong to classes (negative classes) other than the given class is 95. In this case, comparison is made between the one i-th image IMGi (the image concerned in the left column in FIG. 13) and each of the 95 images IMGj belonging to the negative classes (see the right column in FIG. 13).

To be specific, the controller 31 firstly executes unit selection processing (steps S211 and S212 in FIG. 11) on one comparison target image (e.g., the uppermost image on the right column in FIG. 13) among a plurality of comparison target images.

In step S211, a difference vector Δs (=si−sj) is obtained. A vector si is the integrated similarity vector si (280) obtained by inputting the image concerned (the i-th image) IMGi to the learning model 400. A vector sj is the integrated similarity vector sj (280) obtained by inputting one comparison target image (the j-th image) IMGj among a plurality of comparison target images IMGj to the learning model 400. The difference vector Δs is obtained by subtracting the vector sj from the vector si.

Then, in step S212, a prototype that corresponds to a largest component (largest positive component) among a plurality of (Nc) components ΔSk of the difference vector Δs is selected as the belonged prototype that belongs to the class of a predetermined image (class concerned). For example, as to the difference vector Δs on the lower left side in FIG. 13, a prototype PT1 that corresponds to a largest component ΔS1 among the components ΔSk is selected as the belonged prototype PT.

As for the integrated similarity vector si, the value of a component that corresponds to the prototype PT representing the feature of the image concerned (i-th image) IMGi of the class concerned appears larger than the values of the other components. As to the integrated similarity vector sj, on the other hand, the value of a component that corresponds to the prototype PT representing the feature of a comparison target image (j-th image) IMGj of a class (negative class) other than the class concerned appears larger than the values of the other components. Therefore, the prototype PT that remarkably represents the feature of the class concerned corresponds to a prototype PT that appears as a large component in the image concerned IMGi and that, on the contrary, does not appear so much (appears as a small component) in the comparison target image IMGj. Accordingly, the prototype PT that corresponds to a component having a relatively large value (e.g., largest value) among a plurality of components ΔSk of the difference vector Δs corresponds to the prototype PT that remarkably represents the feature of the class concerned. In consideration of this characteristic, in step S212, the prototype PT that corresponds to the largest component among the components ΔSk of the difference vector Δs is selected as the belonged prototype PT of the class concerned.

In this way, the unit selection processing (S211 and S212) is processing (processing for selection in units of the image concerned) for selecting belonged prototypes that belong to one class through comparison processing between one image (image concerned) of the one class and one comparison target image (image of a different class).

This unit selection processing is also executed for the remaining (e.g., 94) comparison target images among the plurality of (e.g., 95) comparison target images (S213). That is, the unit selection processing is executed for a plurality of comparison target images while changing one comparison target image to another. As to the second difference vector Δs in the vicinity of the center on the lower side in FIG. 13, a prototype PT3 that corresponds to a largest component ΔS3 among the components ΔSk is selected as the belonged prototype PT. As to the remaining (=95−2=93) difference vectors Δs, a prototype PT that corresponds to a largest component is selected as the belonged prototype PT.

In the lowermost section in FIG. 13, the prototypes PT selected by a plurality of (e.g., 95) executions of the unit selection processing are listed. For example, through the executions of the unit selection processing, prototypes PT1, PT3, and PT4 are selected as the belonged prototypes PT based on a predetermined image (first image IMG1) (as the belonged prototypes PT of the class concerned) based on a predetermined image (first image IMG1). The number of times the prototypes PT1, PT3, and PT4 are selected (the number of selections) are respectively "40", "30", and "25" (see the lowermost section in FIG. 13 and the upper left side in FIG. 14). In the lowermost section in FIG. 13 or the like, the prototypes PT (imaged representation thereof such as a "blue head or blue tail of a bird") are shown in an ideal condition (image features corresponding to a specific partial region in a specific sample image) after the completion of the learning. The contents of each prototype PT change gradually during learning.

In this way, through the comparison processing between a predetermined image that belongs to one class and each of a plurality of comparison target images that belong to a different class, at least one belonged prototype PT that belongs to the one class (belonged prototype PT based on the predetermined image) is selected based on the predetermined image that belongs to the one class. Moreover, number-of-selections calculation processing is also executed to count the number of selections of each belonged prototype.

Then, in step S214, the controller 31 also executes the processing in steps S211 to S213 by using, as an image concerned, each of different reference images in the class concerned. Specifically, for each of (N−1) images (e.g., four images) that belong to one class (class concerned) and that are different from the predetermined image, the controller 31 executes processing such as the prototype selection processing based on comparison with each of the plurality of (i.e., 95) comparison target images.

For example, the unit selection processing relating to the second image (new image concerned) belonging to the class concerned is repeatedly performed on the 95 negative images so as to select prototypes PT1, PT2, and PT4 as the belonged prototypes PT based on the second image. The numbers of selections of the prototypes PT1, PT2, and PT4 (the number of times each prototype is selected) are respectively "30", "30", and "35" (see the upper section on the right side in FIG. 14).

Similarly, the unit selection processing relating to the third image belonging to a given class is repeatedly performed on the 95 negative images so as to select, for example, prototypes PT1, PT2, PT3, and PT4 as the belonged prototypes PT based on the third image. The numbers of selections of the prototypes PT1, PT2, PT3, and PT4 (the number of times each prototype is selected) are respectively "35", "30", "25", and "5."

Then, in step S215, the controller 31 adds up the numbers of selections of the belonged prototypes PT for N (here, five) images that belong to the class concerned. Specifically, the controller 31 determines, as the number of selections of each belonged prototype PT that belongs to the class concerned, an average value obtained by dividing a total value of the numbers of selections of the belonged prototypes selected in the prototype selection processing by the number N of images (here, five images) that belong to the class concerned.

For example, a case is assumed in which, as to five reference images of one class, the numbers of selections of the prototype PT1 to the one class are respectively "40", "30", "35", "30", and "40." In this case, an average value of "35" obtained by dividing the total value (i.e., "175") of these five values by the number of reference images (i.e., "5") is determined as the number of selections of the belonged prototype PT1 belonging to the one class (i.e., an averaged number of selections) (see PT1 in the lower section in FIG. 14).

Then, in step S216, the controller 31 obtains the prototype belongingness Bk (Ya) of each belonged prototype PTk relating to the one class in accordance with the amount of the number of selections of each belonged prototype (the number of times each prototype is selected) in the prototype selection processing.

Specifically, the controller 31 (provisionally) calculates prototype belongingness $Bk^{(Yc)}$ of each belonged prototype in one class (class concerned) by dividing the number of selections of the belonged prototype PT in the one class (Yc) by the number of a plurality of (i.e., 95) comparison target images. For example, a case is assumed in which the numbers of selections (average number of selections) of the belonged prototypes PT1, PT2, PT3, and PT4 that belong to the one class (class concerned) CS1 are respectively "35", "15", "15", and "30" (in the lower section in FIG. 14). In this case, belongingness B1, B2, B3, and B4 of the belonged prototypes PT1, PT2, PT3, and PT4 that belong to the class CS1 are calculated as "35/95," "15/95," "15/95," and "30/95," respectively In this way, the belonged prototypes PTk belonging to one class and the prototype belongingness Bk that indicates the degree of belongingness of each belonged prototype PTk to the one class are calculated (provisionally).

In step S217, the processing in steps S211 to S216 is repeatedly executed while changing the class concerned in sequence to another. In other words, the controller 31 also executes prototype selection processing for selecting belonged prototypes that belong to a different class from the aforementioned one class. In this way, the controller 31 determines the belonged prototypes that belong to each of a plurality of classes and the belongingness of each belonged prototype.

Figure 16:
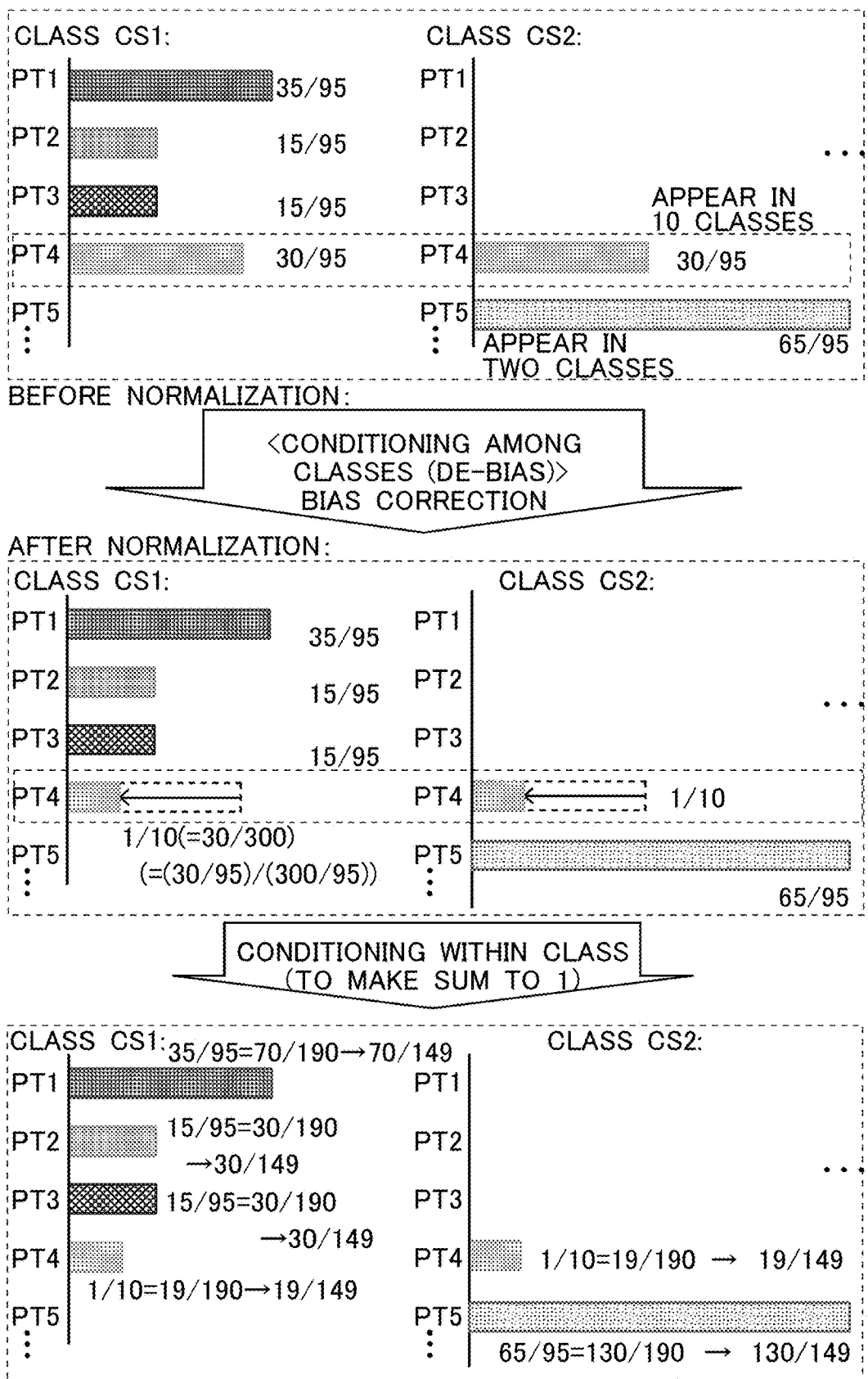
FIG. 16 shows one example of the de-bias processing.

For example, prototypes PT4 and PT5 are determined as the belonged prototypes PT for a different class CS2, and belongingness B4 of the belonged prototype PT4 and belongingness B5 of the belonged prototype PT5 are calculated as "30/95" and "65/95," respectively (see the upper section on the right side in FIG. 16). For each of the other classes such as CS3, the belonged prototypes PT and the belongingness of each belonged prototype are calculated.

Next, step S22 (FIG. 9) included in step S41 is described.

Here, the belonged prototypes PT obtained for each class in step S21 described above may include a belonged prototype PT that is selected across a plurality of classes (Y1, Y2, and so on). In other words, the selection of belonged prototypes PT may be biased toward a specific prototype PT among a plurality of prototypes PT.

For example, the prototype PT4 may be selected as the belonged prototype PT relating to 10 classes CS1 to CS10 (see the upper section in FIG. 16). Such a prototype PT (PT4) may possibly be a common feature to a large number of images, like a background image feature. In other words, such a prototype PT4 or the like does not always remarkably represents the image feature of a specific class.

Figure 15:
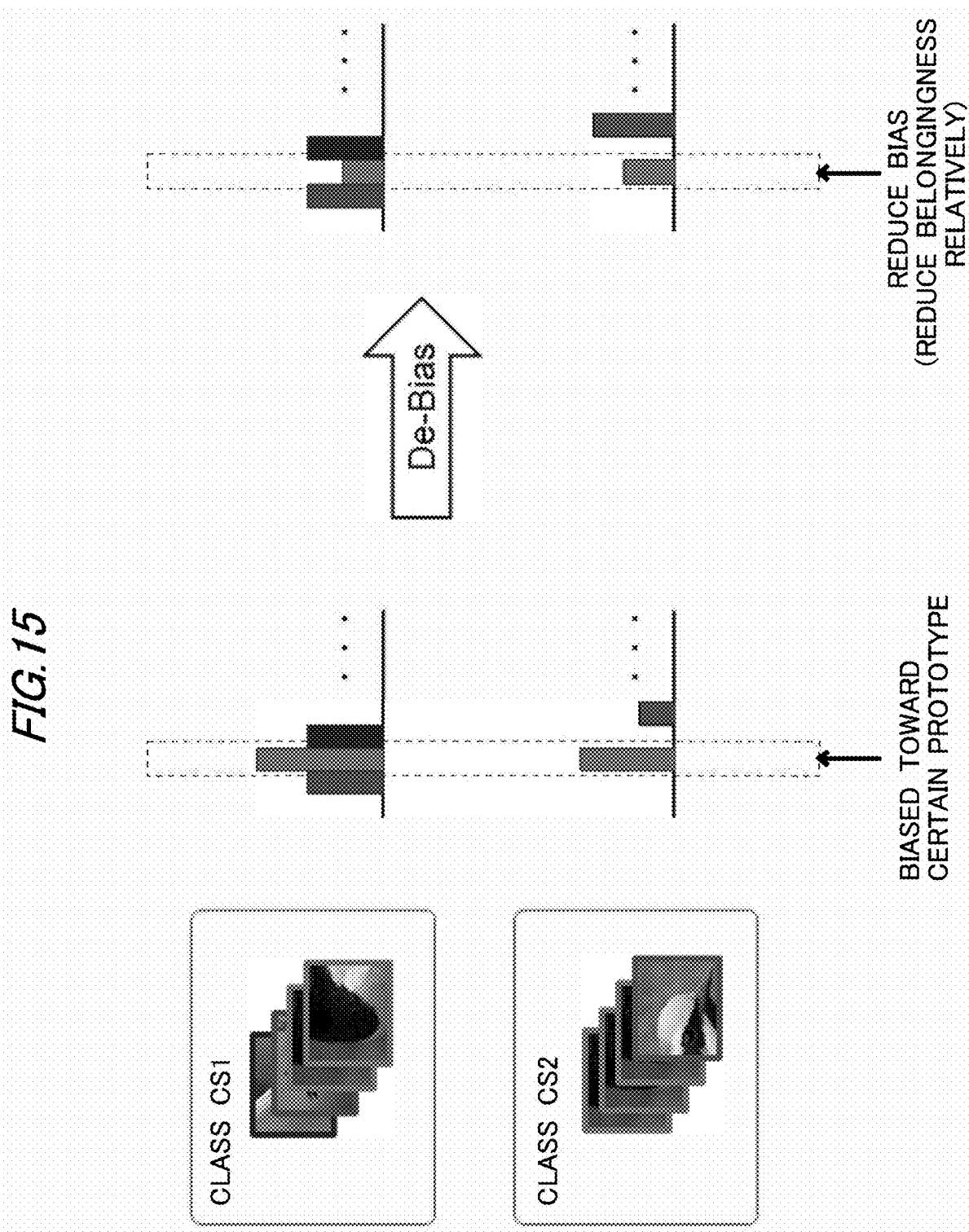
FIG. 15 shows de-bias processing (bias reducing processing).

In view of this, in the present embodiment, the controller 31 reduces the belongingness of each prototype PT that is selected as the belonged prototype vector for a plurality of classes, in order to lessen the influence of such prototypes PT (step S22). In other words, in the case where the selection of belonged prototypes PT is biased toward a specific prototype PT, processing for reducing the bias toward the prototype PT (de-bias processing) is executed (see FIG. 15). Specifically, in the case where one prototype PTk belongs to two or more classes, the controller 31 reduces (normalizes) the belongingness (prototype belongingness $Bk^{(Yc)}$) of the one prototype to each of the two or more classes (each class Yc). For example, the belongingness of each belonged prototype PT that belongs to a plurality of classes is changed to a smaller value than the belongingness of each belonged prototype PT that belongs to a single class.

Specifically, the prototype belongingness $Bk^{(Yc)}$ of each belonged prototype PTk for each class Yc is corrected in accordance with, for example, Expression (5).

Mathematical Expression 5

$$B_k^{(Yc)} \leftarrow \frac{B_k^{(Yc)}}{\max(\sum_{Yc} B_k^{(Yc)}, \varepsilon)} \quad (5)$$

Expression (5) indicates replacing the value on the left side of the expression (new belongingness $Bk^{(Yc)}$ with the value on the right side. The value of the fraction on the right side of Expression (5) is obtained by dividing the numerator (original belongingness $Bk^{(Yc)}$ of each belonged prototype PTk to a given class Yc) by the denominator. The denominator is a larger value of either a predetermined value $\varepsilon$ and a value (total value) obtained by totaling the original belongingness $Bk^{(Yc)}$ of each belonged prototype PTk for all classes.

For example, it is assumed as shown in FIG. 16 that the prototype PT4 is selected as the belonged prototype PT for a large number of (e.g., 10) classes, and the above-described total value for the 10 classes (the total value of the belongingness B4) is "300/95." In this case, when a predetermined value E is assumed to be one, the belongingness B4 of the belonged prototype PT4 for a given class CS1 before correction, i.e., "30/95," is reduced (normalized) to "1/10" (=(30/95)/300/95) by Expression (5). For the other classes such as CS2 as well, the belongingness B4 of the belonged prototype PT4 for each class is calculated similarly by dividing the belongingness for the class before correction by a larger value (e.g., "1") of either the above-described total value and the predetermined value E. In the case where the belongingness before correction is divided by one, the belongingness after correction becomes the same value as the belongingness before correction.

Thereafter, the sum of the belongingness Bk of each of a plurality of belonged prototypes PT (of different types) for each class is adjusted to become one. For example, as shown in the middle section in FIG. 16, a case is assumed in which the belongingness B1 of the belonged prototype PT1, the belongingness B2 of the belonged prototype PT2, the belongingness B3 of the belonged prototype PT3, and the belongingness B4 of the belonged prototype PT4 for the class CS1 before adjustment (and after the above-described bias correction) are "35/95," "15/95," "15/95," and "1/10," respectively. In this case, the belongingness B1, B2, B3, and B4 are respectively corrected to "70/149," "30/149," "30/149," and "19/149" (see the lower section in FIG. 16). For the other classes (e.g., CS2), the sum of the belongingness of each belonged prototype PT is adjusted to become one.

In this way, in step S22, the processing for adjusting the prototype belongingness between classes is mainly performed. In step S22, the belongingness of each prototype PT that belongs in common to a plurality of classes is reduced more than the belongingness of each prototype PT that belongs to only a single class.

Although the case where ε=1 is mainly described by way of example, the present disclosure is not limited to this example, and the value E may be smaller than one (e.g., 0.1). In that case, for example, the belongingness of each prototype PT that belongs to a single class (or a small number of classes) is once changed to one (or a half, for example), and the belongingness of each prototype PT that belongs to a plurality of classes is changed to a relatively small value. Thereafter, the total value of the belongingness of each belonged prototype PT that belongs to the same class is normalized to become one.

Figure 17:
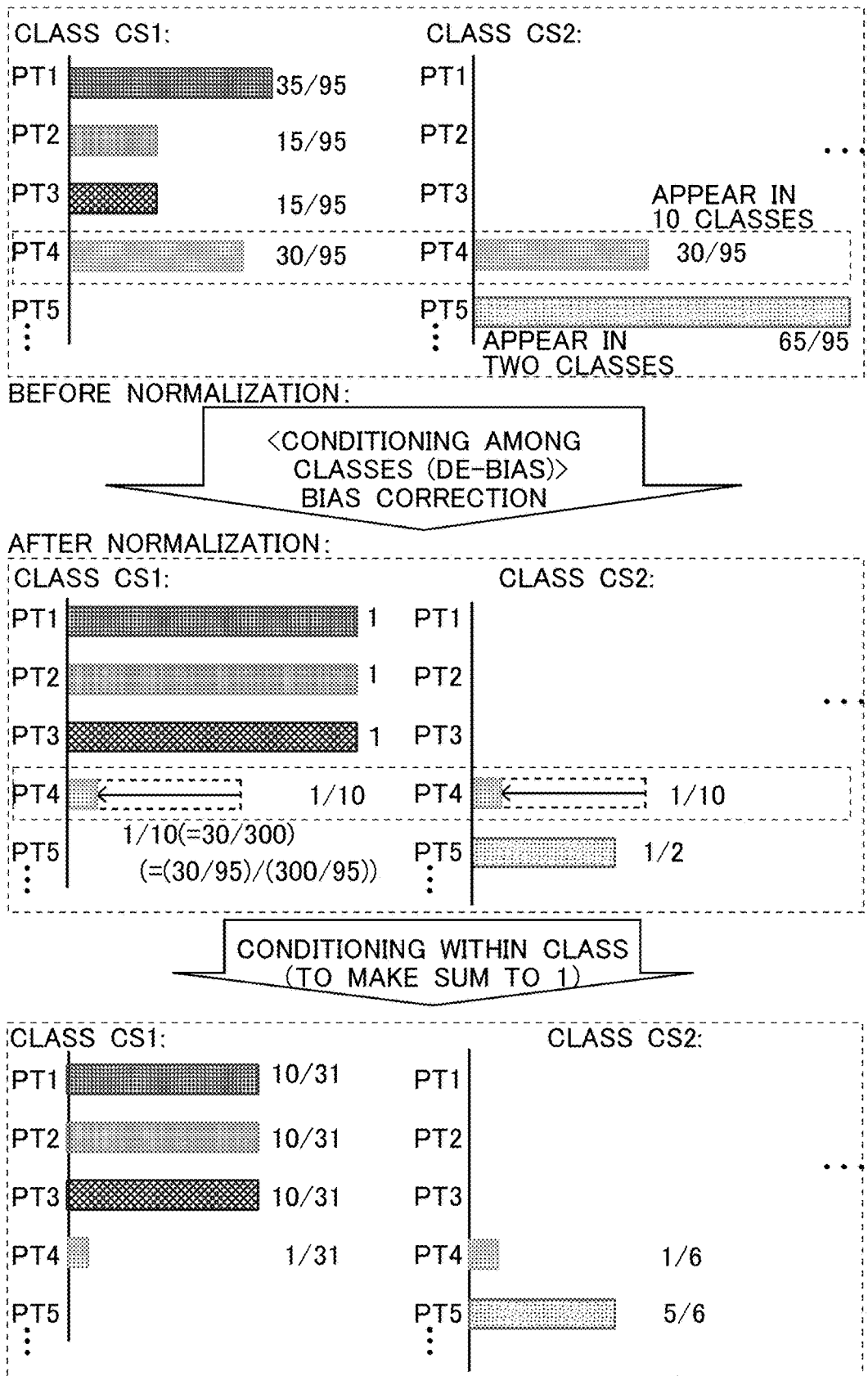
FIG. 17 shows another example of the de-bias processing.

In this case, each belongingness Bk may, for example, be changed as shown in FIG. 17.

The uppermost section in FIG. 17 shows the same condition as the uppermost section in FIG. 16.

In the middle section in FIG. 17, the belongingness B4 of the belonged prototype PT4 before correction, i.e., "30/95," is reduced (normalized) similarly to "1/10" (=(30/95)/300/95). On the other hand, due to the fact that the value ε in Expression (5) is a small value, the belongingness B1 of the belonged prototype PT1 is change to one (=(35/95)/(35/95)). The belongingness B2 of the belonged prototype PT2 and the belongingness B3 of the belonged prototype PT3 are also corrected to one. Through this correction, the belongingness ("1") of each of the prototypes PT1, PT2, and PT3 that belong to a single class is (more reliably) changed to a (relatively) larger value than the belongingness of the prototype PT4 that belongs to two or more classes. Thereafter, the sum of the belongingness Bk of each belonged prototype PT (of different types) for each class is adjusted to become one. For example, as shown in the lower section in FIG. 17, the belongingness B1, the belongingness B2, and the belongingness B3 for the class CS1 are all changed to "10/31," and the belongingness B4 for the class CS1 is changed to "1/31."

The processing as described above is executed in step S22.

Figure 18:
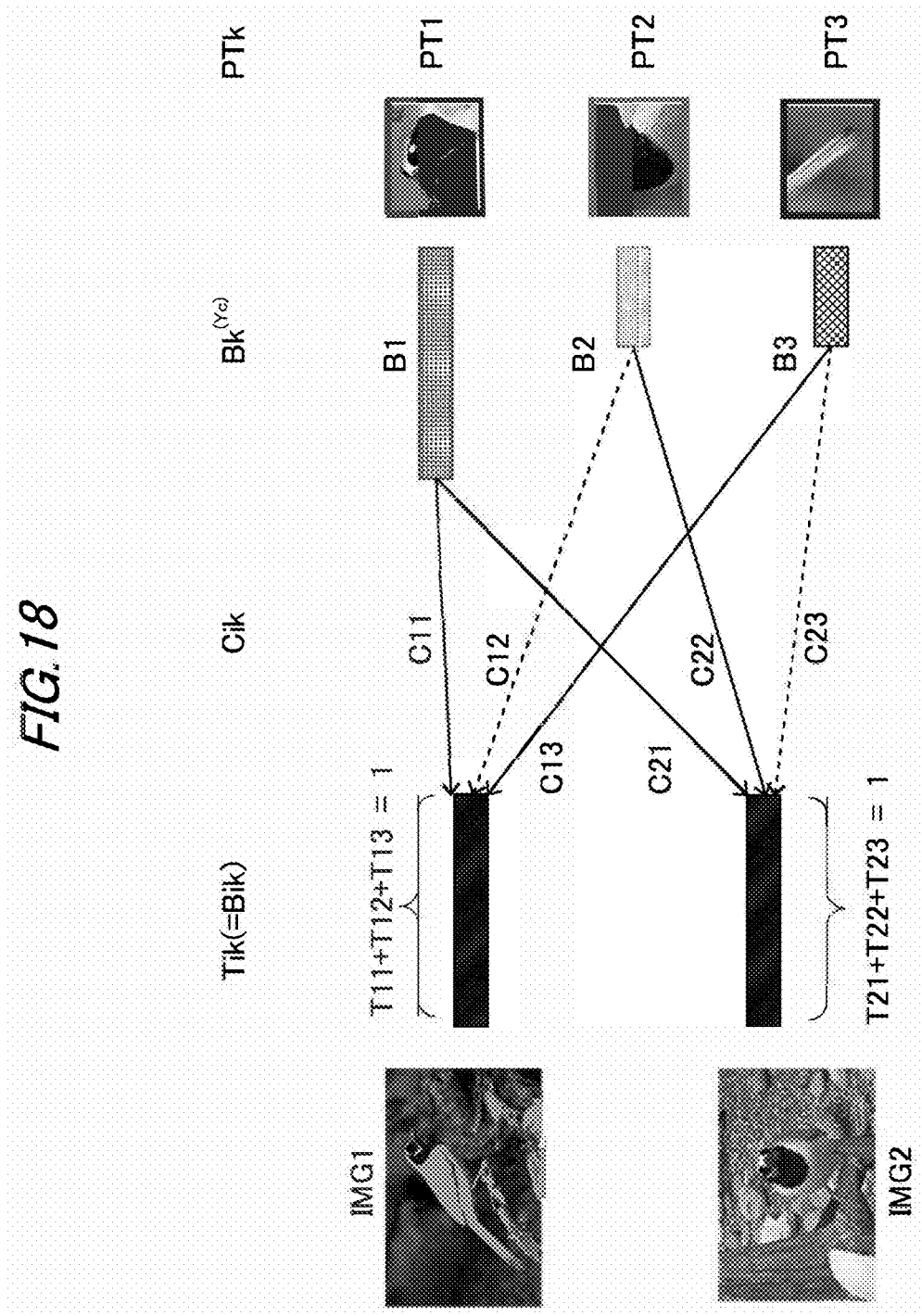
FIG. 18 shows distribution processing.
Figure 19:
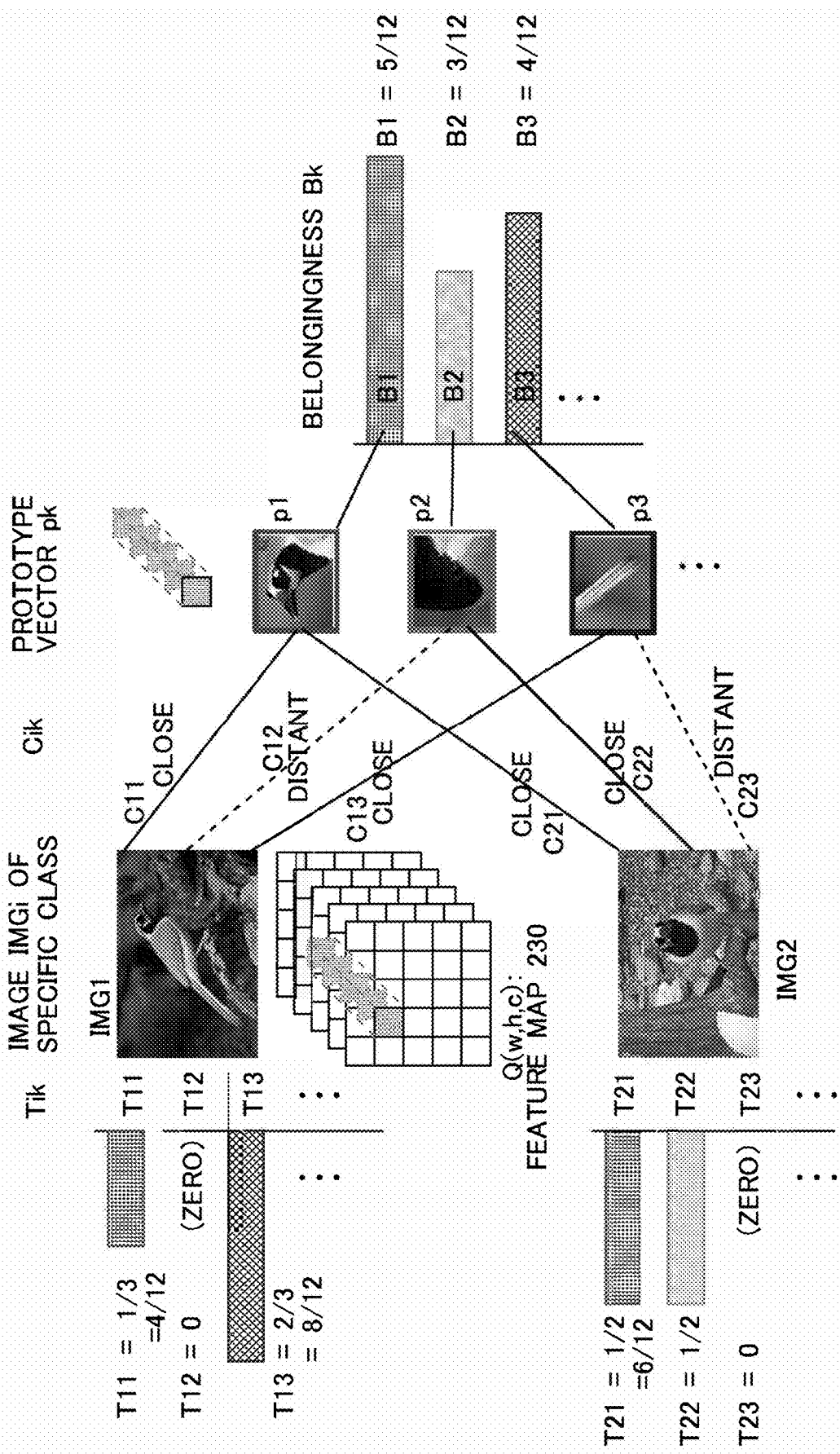
FIG. 19 shows one example of the distribution processing.

In the next step S42 (step S23 in FIG. 9), the controller 31 obtains distributed prototype belongingness Bik (Tik) that is the prototype belongingness for each image (see FIGS. 18 and 19). As described above, the distributed prototype belongingness Bik is the belongingness obtained by distributing the prototype belongingness Bk of each belonged prototype PTk for each class to each of two or more images that belong to the same class (e.g., birds of the same type), in accordance with a predetermined reference.

Specifically, the controller 31 distributes the prototype belongingness Bk of one belonged prototype that belongs to one class into N images that belong to the one class and determines the distributed prototype belongingness Bik (Tik) for each of the N images (IMGi). At this time, the original prototype belongingness Bk is distributed to each image IMGi in such a manner that the distributed prototype belongingness Bik for each image increases with a decrease in distance between the prototype vector p of the belonged prototype PT and the most similar pixel vector q in the image IMGi (with an increase in similarity).

For example, in the case where a first distance D1 (described next) is larger than a second distance D2 (described next), the controller 31 determines the distributed prototype belongingness (e.g., T1k) for one image (e.g., IMG1) to be a value smaller than the distributed prototype belongingness (e.g., T2k) for a different image (e.g., IMG2). The first distance D1 as used herein is the distance (e.g., C1k) between the prototype vector pk and the pixel vector that is most similar to the prototype vector pk of the one belonged prototype PTk (the most similar vector) among a plurality of pixel vectors q in the feature map corresponding to "one image" (e.g., IMG1) among the N images. The second distance D2 is the distance (e.g., C2k) between the prototype vector pk and the pixel vector that is most similar to the prototype vector pk of the one belonged prototype among a plurality of pixel vectors in the feature map corresponding to a "different image" (e.g., IMG2) among the N images. Each of the distances D1 and D2 is the distance between the prototype vector pk and the most similar pixel vector q (see Expression (6) described later). In the case where k=2 and C12>C22, the distributed prototype belongingness T12 is determined to be a value smaller than the distributed prototype belongingness T22.

To be more specific, this distribution processing can be regarded as discrete optimal transport problems. Figuratively expressed, the distribution processing is a problem (discrete optimal transport problem) of assigning requirements required by a plurality of distribution destinations to a plurality of distribution stores so as to minimize gross transport costs (a total value of transports cost that respond to the distribution distance between each distribution store and each distribution destination and the amount of distribution from each distribution store to each distribution destination). In the present embodiment, each image i may be regarded as each distribution store, each prototype PTk may be regarded as each distribution destination, and the belongingness Bk of each prototype PTk may be regarded as a requirement required for each distribution destination. To minimize evaluation values corresponding to the transport costs, the belongingness Bk of each prototype PT is distributed (assigned) to a plurality of images. The evaluation values as used herein refer to evaluation values (see Expression (7)) that respond to the distance Cik (see Expression (6)) and the magnitude of the distributed prototype belongingness Tik (allotment). The distance Cik is the distance between each prototype vector pk and the most similar pixel vector q (in the feature map 230 corresponding to each image i), and the distributed prototype belongingness Tik is the belongingness distributed to each image i for each prototype PTk. Such discrete optimal transport problems can be resolved by a solution method such as the Sinkhorn-Knopp algorithm.

Mathematical Expression 6

$$C_{ik} = \min_j |q_j^{(i)} - p_k|$$ (6)

In Expression (6), Cik is the minimum value of the distance between the k-th prototype vector pk and each of a plurality of pixel vectors q in the feature map 230 of the i-th image (the j-th pixel vector qj$^{(i)}$ in the i-th image). In other words, Cik is the distance between the k-th prototype vector pk and the pixel vector q that is most similar to k-th prototype vector pk in the feature map 230 of the i-th image (the most similar pixel vector). In short, Cik is the minimum distance between the prototype vector pk and any pixel vector q (qj$^{(i)}$) in the i-th image. Note that Cik in Expression (6) is equivalent to Sk in Expression (1).

Mathematical Expression 7

$$\sum_{i,k} T_{ik} C_{ik}$$ (7)

Expression (7) is the expression that indicates the evaluation value in the distribution processing described above. Tik (Bik) represents the distributed prototype belongingness distributed (assigned) to the i-th image IMGi out of the belongingness Bk of the k-th prototype PTk that belongs to a class concerned. The value obtained by Expression (7) corresponds to the "gross transport costs" in the discrete optimal transport problems described above.

Mathematical Expression 8

$$L_{clst}^{(Y_c)} = \min_T \sum_{i,k} T_{ik} C_{ik} \qquad (8)$$
$$s.t. \sum_i T_{ik} = B_k^{(Y_c)} * Ns, \sum_k T_{ik} = 1$$

The right side (of the upper equation) of Expression (8) represents the evaluation value that is a minimized one of a plurality of evaluation values (see Expression (7)) obtained by varying T (Tij) in the distribution processing relating to a given class Yc.

Expression (8) also shows two conditions relating to Tik. One of the conditions is that the value obtained by adding all the distributed prototype belongingness Tik of the k-th prototype PTk to the i-th image for a plurality of (Ns) images that belong to the class (for each prototype PTk) is equal to Ns times of the belongingness $Bk^{(Y_c)}$ of the k-th prototype PTk to the class Yc. The other condition is that the value obtained by adding all the distributed prototype belongingness Tik of the k-th prototype PTk to the i-th image for a plurality of prototypes PTk (for each image) is equal to one. Note that Ns is the number of images (the number of distributed images) that belongs to one class.

That is, a value Lclst in Expression (8) is the value obtained by minimizing (optimizing) the evaluation value expressed by Expression (7) according to the two conditions shown in Expression (8). Step S23 and other steps may use, for example, the solution of the above-described distribution problem (discrete optimal transport problem). Specifically, the optimum solution expressed by Expression (8) (including an approximate optimum solution) and Cik and Tik that configure the optimum solution (e.g., distribution results) are used.

FIG. 19 shows one distribution result.

It is assumed herein that one class includes three belonged prototypes PT1, PT2, and PT3 and that the prototype belongingness Bk of each prototype PTk to this class, i.e., the prototype belongingness B1, the prototype belongingness B2, and the prototype belongingness B3 are "5/12," "3/12," and "4/12," respectively. The distance C12 (minimum distance between the prototype vector p2 and a pixel vector q in the image IMG1) is very large, and the distance C22 (minimum distance between the prototype vector p2 and a pixel vector q in the image IMG2) is very small. Moreover, the distance C13 is very small, and the distance C23 is very large.

In this way, in the case where the distance C12 is larger than the distance C22, the controller 31 determines the distributed prototype belongingness T12 (B12) for the image IMG1 to be a value smaller than the distributed prototype belongingness T22 (B22) for the image IMG2. For example, the distributed prototype belongingness T12 may be zero (0) and the distributed prototype belongingness T22 is a half (½). In short, relatively low belongingness is distributed to an image that exhibits relatively low similarity to the prototype vector pk among two or more images that belong to the same class.

In the case where the distance C13 is smaller than the distance C23, the controller 31 determines the distributed prototype belongingness T13 for the image IMG1 to be a value greater than the distributed prototype belongingness T23 for the image IMG2. For example, the distributed prototype belongingness T12 may be two-thirds (⅔), and the distributed prototype belongingness T22 may be zero (0). In short, relatively high belongingness is distributed to an image that exhibits relatively high similarity to the prototype vector pk among two or more images that belong to the same class.

The distributed prototype belongingness T11 for the image IMG1 and the distributed prototype belongingness T21 for the image IMG2 are also determined based on factors such as the magnitude correlation between the distances C11 and C12.

Each Tik is determined so as to satiety the two conditions shown in Expression (8). As a result, for example, the distributed prototype belongingness T11, the distributed prototype belongingness T12, and the distributed prototype belongingness T13 are determined to be "⅓," "zero," and "⅔," respectively, and the distributed prototype belongingness T21, the distributed prototype belongingness T22, and the distributed prototype belongingness T23 are determined to be "½," "½," and "zero," respectively (see the left edge side in FIG. 19).

In this way, the distribution processing relating to one class is performed.

The controller 31 applies the distribution processing to the other classes and obtains evaluation values for a plurality of classes (evaluation values optimized by Expression (8)) by repeatedly performing similar distribution processing.

Then, the controller 31 calculates the evaluation term Lclst included in the evaluation function L by further adding a plurality of evaluation values $Lclst^{(Y_c)}$ (optimized evaluation values) obtained for a plurality of classes (see Expression (9)) (step S24).

Mathematical Expression 9

$$L_{clst} = \sum_{Y_c} L_{clst}^{(Y_c)} \qquad (9)$$

Expression (9) is the expression that indicates the evaluation function (evaluation term) Lclst. In Expression (9), the evaluation term Lclst is the value obtained by adding all the evaluation terms $Lclst^{(Y_c)}$, which are defined for each class by Expression (8), for a plurality of classes.

In step S25 (FIG. 9), the controller 31 also calculates other evaluation terms Ltask and Laux, in addition to the evaluation term Lclst obtained by Expression (9), and calculates the evaluation function L by adding all the calculated values in accordance with Expression (2).

In step S26, the controller 31 executes learning processing (machine learning) so as to minimize (optimize) the evaluation function L. To be more specific, the learning processing is executed by repeatedly executing steps S21 to S25.

At this time, the controller 31 executes learning processing to also minimize, in particular, the evaluation term Lclst (and $Lclst^{(Y_c)}$). That is, learning processing is executed so as to bring each prototype vector pk closer to any pixel vector q in the feature map corresponding to each image i in accordance with the distributed prototype belongingness Tik (Bik) for the image i. In other words, learning processing is executed so as to bring each prototype vector pk further closer to the closest pixel vector q among a plurality of pixel vectors q in the feature map 230 of each image. Accordingly, the learning model 400 (e.g., each prototype vector p and the CNN 220 or the like (in particular, the prototype vector p)) is trained so as to bring each prototype vector pk closer to any image feature of a plurality of learning images.

Though this processing, the learning model 400 is trained (machine learning) and generated into the trained model 420.

In the learning processing as described above, the learning model 400 is trained so as to optimize (minimize) the evaluation function L including the evaluation terms Ltask, Lclst, and Laux. To be more specific, the learning model 400 is trained so as to optimize (minimize) each of the evaluation terms Ltask, Lclst, and Laux.

The distance learning relating to the integrated similarity vectors 280 proceeds by the action of minimizing the evaluation term Ltask. Accordingly, a plurality of feature vectors that correspond to a plurality of input images that include subjects of the same class (e.g., birds of the same type) are arranged at close positions to one another in the feature space relating to the integrated similarity vectors 280. On the other hand, a plurality of feature vectors that correspond to a plurality of input images relating to different classes (birds of different types) are arranged at distant positions from one another.

The distance learning relating to the sub-feature vectors 290 proceeds by the action of minimizing the evaluation term Laux. By this distance learning, a plurality of feature vectors that correspond to a plurality of input images that belong to the same class are arranged at close positions to one another in the feature space relating to the sub-feature vectors 290, and a plurality of feature vectors that correspond to a plurality of input images that belong to different classes are arranged at distant positions from one another.

The sub-feature vectors 290 are vectors that integrate outputs (feature map 230) from the CNN 220 for each channel. That is, the sub-feature vectors 290 are output vectors received from locations close to the locations of output from the CNN 220 in the learning model 400 (as compared to the integrated similarity vectors 280). In the present embodiment, distance learning using the sub-feature vectors 290 having such properties is executed. Accordingly, it is possible to construct the CNN 220 having proper feature extraction capability more appropriately than in the case where the evaluation term Laux, out of the evaluation terms Ltask and Laux, is not taken into consideration (in the case where only the evaluation term Ltask is taken into consideration).

Moreover, each prototype vector pk is trained by the action of minimizing the evaluation term Lclst so as to become closer to, for example, the most similar pixel vector q. Accordingly, each prototype vector pk is trained so as to reflect the image feature of a specific partial region of a specific image. In other words, each prototype vector pk is trained so as to represent the concept of each prototype PTk (the concept of the image feature) after learning.

In particular, each prototype vector pk is trained so as to become closer to the image-specific most similar pixel vector q in each image in accordance with the distributed prototype belongingness Tik for the image. In particular, each prototype PT can belong to two or more classes. Thus, each prototype vector p may be trained so as to reflect similar features between different images of different classes. Besides, since there is no need to prepare a predetermined number of dedicated prototype vectors for each class, it is possible to efficiently construct the prototype vectors p.

Each prototype vector p is also trained so as to become closer to a different image of the same class in accordance with the prototype belongingness for each image (belongingness that differs for each image). To be more specific, each prototype vector p is trained so as to reflect the image feature in accordance with the belongingness that differs for each image of the same class (image-specific prototype belongingness). Accordingly, it is possible to efficiently construct the prototype vectors p.

As compared with conventional techniques using ProtoPNet for class classification, there is no need to prepare each prototype vector p as a prototype vector p dedicated for each class. In other words, there is no need to fix the relationship between the prototype vectors p and classes. Thus, it is possible as described above to realize learning processing (e.g., distance learning) that brings each prototype vector p closer to a given image feature without fixing the relationship between the prototype vectors p and classes. In turn, operations based on the prototype vectors p, such as extraction of image features and explanation of inference basis, become possible in processing such as similar image retrieval processing relating to unclassified images. Accordingly, it is possible to improve explainability of inference basis (in particular to improve transparency: the property of being able to explain inference results with concepts understandable by humans).

Prototype Vector Replacement Processing

When the machine learning on the learning model 400 is completed as described above, the processing proceeds to step S28 (FIG. 10). In step S28, the controller 31 replaces each prototype vector pk in the learning model 400 (trained model 420) with the most similar pixel vector q (also expressed as qmk) (see FIG. 20). To be more specific, all (Nc) prototype vectors pk in the trained model 420 after completion of the learning, where k is the value from 1 to Nc, are each replaced with its corresponding most similar pixel vector qmk. The most similar pixel vector qmk is the pixel vector that is most similar to each prototype vector pk among a plurality of pixel vectors q in a plurality of feature maps relating to a plurality of learning images. Note that the most similar pixel vector qmk is the pixel vector that corresponds to a specific region of a specific image (the vector indicating the image feature of the specific region).

Specifically, the controller 31 firstly acquires the feature map 230 obtained by inputting one image (the i-th image) to the trained model 420. Then, the controller 31 obtains the pixel value q that is most similar to a prototype vector pk concerned (e.g., p1) from among a plurality of pixel vectors q in the feature map 230. The most similar pixel vector q in the feature map 230 of the i-th image is also referred to as an image-specific most similar pixel vector q. Note that similarity between the two vectors q and pk may be calculated using, for example, cosine similarity (see Expression (1) or (6)).

The controller 31 repeats similar operations for a plurality of images. Accordingly, a plurality of feature maps 230 that correspond to a plurality of (e.g., 100) learning images are extracted, and the image-specific most similar pixel vector q for each prototype vector pk concerned (e.g., p1) is obtained for each of the feature maps 230.

Then, the controller 31 identifies, as the most similar pixel vector q (qmk), the image-specific most similar pixel vector q that is most similar to the prototype vector pk concerned— among a plurality of (e.g., 100) image-specific most similar pixel vectors q relating to a plurality of images. The controller 31 also identifies an image that includes the most similar pixel vector qmk (e.g., the first image) as the most similar image (an image that most has the feature of the prototype vector pk).

In this way, the controller 31 obtains the most similar pixel vector qmk for the prototype vector pk concerned.

Figure 20:
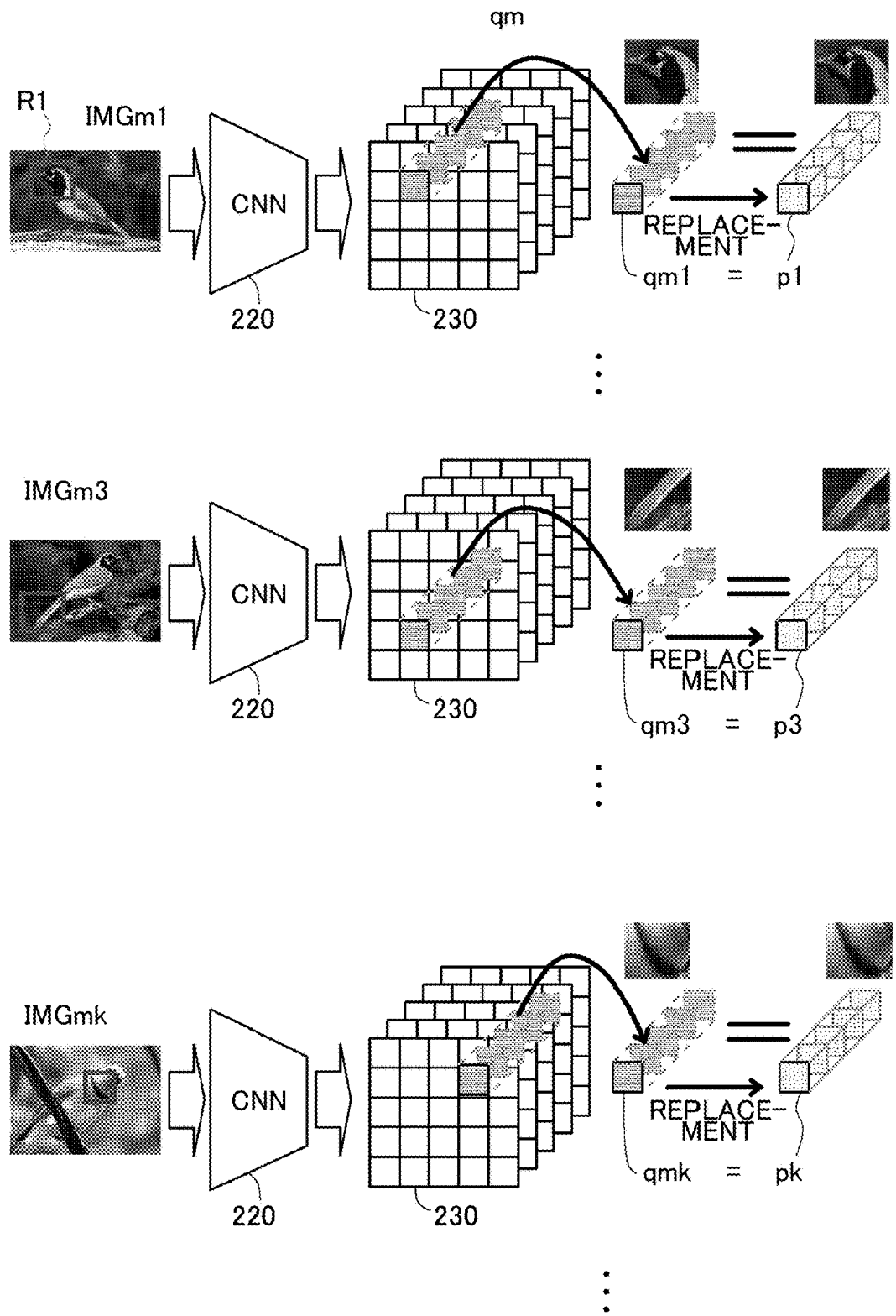
FIG. 20 shows prototype vector replacement processing.

The controller 31 then replaces the prototype vector pk concerned in the trained model 420 with the most similar pixel vector qmk for the prototype vector pk concerned (see FIG. 20).

For each of the other prototype vectors pk, the most similar pixel vector qmk is obtained in a similar manner, and each prototype vector pk is replaced with its most similar pixel vector qmk.

Through this replacement processing, the trained model 420 is corrected, and the corrected trained model 420 (step S29 in FIG. 10) is completed.

In this way, the processing in step S11 (FIG. 5) (processing at the stage of training the learning model 400) is executed.

1-5. Inference Processing Using Learning Model 400

Next, inference processing is performed using the learning model 400 (trained model 420) generated in step S11 (step S12 in FIG. 5).

For example, processing such as finding out an image similar to a new image (inference target image) 215 from among a plurality of images 213 is executed as the inference processing. To be more specific, processing such as finding out an image whose degree of similarity to an image used as a source for retrieval (also referred to as a query image) is a predetermined degree or more (in other words, an image whose distance from the feature vector (integrated similarity vector 280) in the feature space is a predetermined distance or less) from among a plurality of images 213 (here, a plurality of learning images) is executed as the inference processing. Alternatively, processing such as finding out an image that is similar to a query image in the order of similarity may be executed as the inference processing.

The inference target image (query image) may be an image that belongs to any class (unclassified class) other than classes (already classified or known classes) that are used to label learning data (e.g., image data on a plurality of learning images). That is, the inference target image may be either an image that belongs to an already classified class or an image that belongs to an unclassified class. The inference processing according to present embodiment (inference processing using the learning model 400 described above) is particularly significant in that it enables satisfactory retrieval of an image that is similar to an inference target image that belongs to an unclassified class (not only enables satisfactory retrieval of an image that is similar to an inference target image that belongs to an already classified class).

Figure 21:
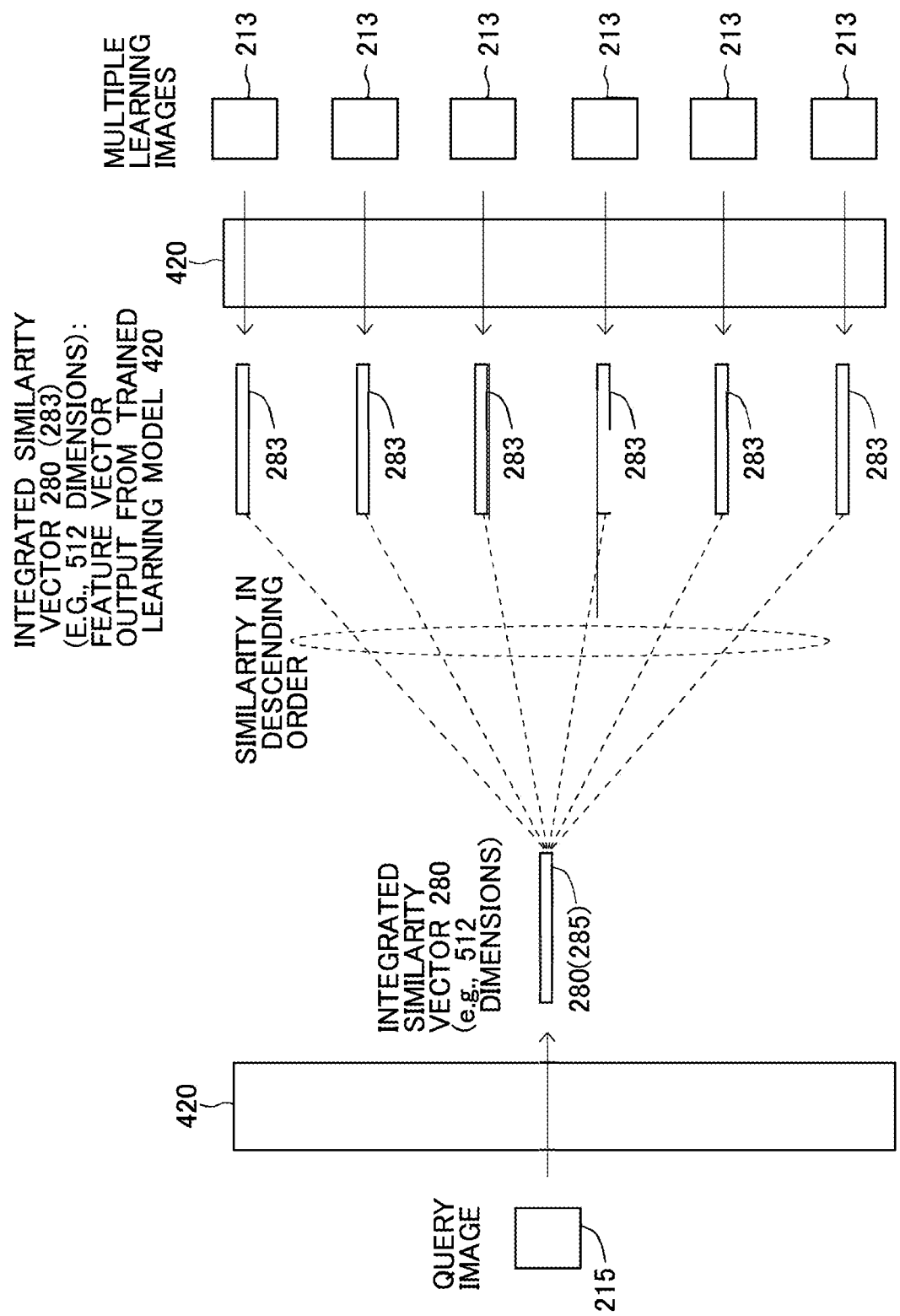
FIG. 21 is a diagram for explaining inference processing.
Figure 22:
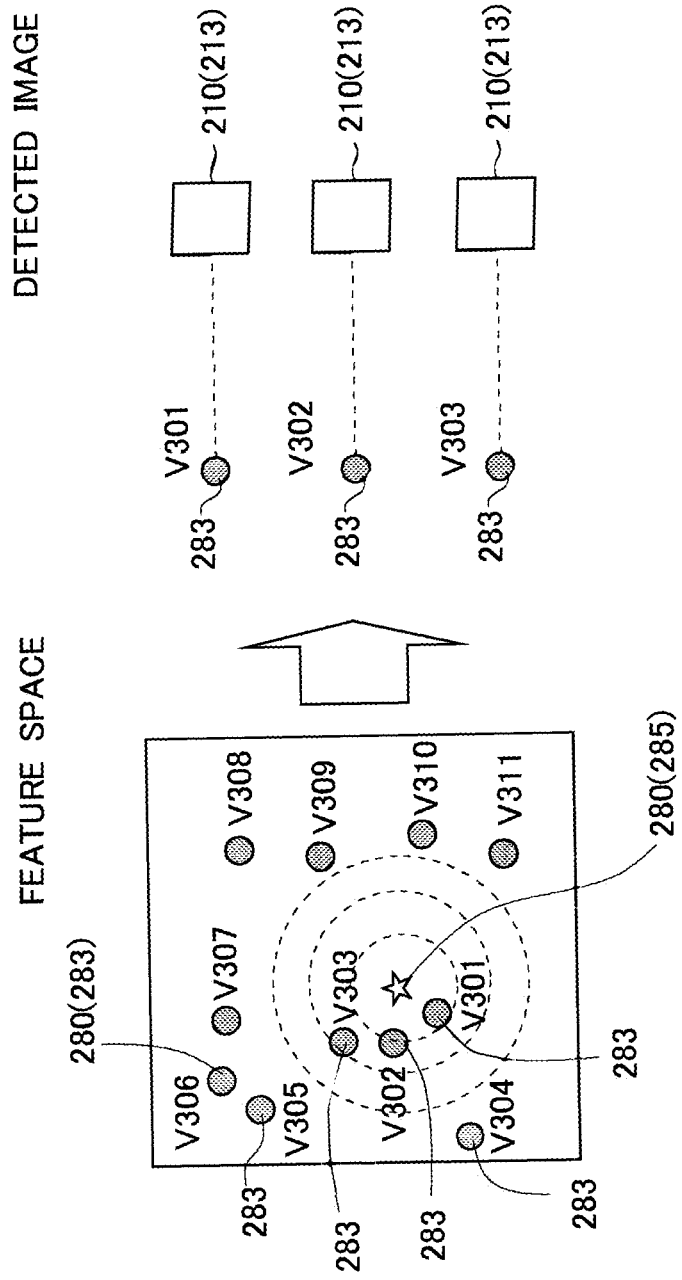
FIG. 22 shows one example of the result of inference processing.

This inference processing will be described hereinafter with reference to FIGS. 21 and 22. FIG. 21 is a diagram for explaining the inference processing using the integrated similarity vectors 280 (283) as feature vectors in the feature space. FIG. 22 shows one example of the result of inference processing.

Firstly, the image processing apparatus 30 inputs a plurality of learning images (gallery images 213) to the trained model 420 and acquires outputs from the trained model 420. Specifically, as shown in FIG. 21 (in particular, on the right side in FIG. 21), the integrated similarity vector 280 (283) is acquired as an output (feature vector) in response to each input image 210 (213). These integrated similarity vectors 283 are a plurality of integrated similarity vectors 280 that are output from the trained model 420 in response to the input of the learning images to the trained model 420. Each integrated similarity vector 280 (283) may be generated as, for example, a 512-dimensional vector. This integrated similarity vector 283 (feature vector) is obtained as a vector representing the feature of each input image 213 for each of the input images 213.

Similarly, the image processing apparatus 30 inputs an input image used as a source for retrieval (query image) 215 to the learning model 420 and acquires an integrated similarity vector 280 (285) that is output as a feature vector from the learning model 420 (see the left side in FIG. 21). The integrated similarity vector 285 is an integrated similarity vector 280 that is output from the trained model 420 in response to the input of the query image 215 to the trained model 420. The query image 215 may, for example, be an image (e.g., an image newly given for search) different from the input images 213 (gallery images). The query image 215 is, however, not limited thereto, and may be any of the input images 213 (gallery images).

Then, the image processing apparatus 30 retrieves an image that is similar to the query image 215 from among the learning images in accordance with the integrated similarity vector 285 and the plurality of integrated similarity vectors 283.

Specifically, the image processing apparatus 30 calculates the degree of similarity (e.g., Euclidean distance or an inner product between vectors such as cosine similarity) between the feature vector 285 of the query image 215 and each of the feature vectors 283 relating to the input images 213. Moreover, the feature vectors 283 are sorted in the order of higher degree of similarity (in descending order of the degree of similarity). To be more specific, the feature vectors 283 are sorted in ascending order of the Euclidean distance (or in descending order of the cosine similarity).

Next, the image processing apparatus 30 identifies one or two or more feature vectors 283 whose distance from the feature vector 285 is a predetermined distance or less in the feature image (i.e., the degree of similarity is a predetermined degree or more) as feature vector(s) 285 of images that are (in particular) similar to the query image 215. In other words, the image processing apparatus 30 recognizes subjects in one or two or more input images 213 that correspond to the identified one or two or more feature vectors 285, as subjects that are similar to the subjects in the query image 215.

The image processing apparatus 30 also identifies a feature vector 283 whose distance from the feature vector 285 is smallest in the feature space, as a feature vector 285 of the image that is most similar to the query image 215. In other words, the image processing apparatus 30 recognizes subjects in one input image 213 that corresponds to the identified one feature vector 285, as subjects that are most similar to the subjects in the query image 215.

FIG. 22 shows a plurality of feature vectors 283 (indicated by hatched circles in FIG. 22) that correspond respectively to a plurality of input images 213 are distributed in the feature space. In FIG. 22, three feature vectors 283 (V301, V302, V303) exist within a predetermined range of distances from the feature vector 285 (see the white star) of the query image 215.

In this case, for example, the three images 213 that correspond to the three feature vectors 283 (V301, V302, V303) are extracted as similar images. The feature vectors 283 including these three feature vectors 283 are sorted in descending order of similarity to the feature vector 285 (in ascending order of distance). Here, the three images 213 that correspond to the three higher-order feature vectors 283 are recognized as images showing subjects that are in particular similar to the subjects in the query image 215.

Moreover, one image 213 that corresponds to the feature vector 283 (V301) that is most close to the feature vector 285 is extracted as a similar image that is most similar to the query image 215.

It is, however, noted that the present disclosure is not limited to this example, and only the input images 213 may be sorted in ascending order of distance (relating to the feature vector 285) from the query image 215 (i.e., in descending order of similarity). Even in this case, the image processing apparatus 30 executes processing for finding out subjects that are substantially similar to the subjects in the query image in the order of similarity (processing for retrieving the similar image). This processing can also be expressed as inference processing for recognizing subjects in the query image.

While in the present embodiment, an image that is similar to the inference target image is retrieved from among a plurality of learning images, the present disclosure is not limited to this example. For example, an image that is similar to an inference target image may be retrieved from among images that include images other than the learning images.

1-6. Explanatory Processing 1 Relating to Inference Result

Next, processing for explaining the result of inference (step S13 in FIG. 5) will be described.

For example, a case is assumed in which it is inferred that one image 213a (also referred to as 214) that corresponds to the feature vector 283 (V301) that is most close to the feature vector 285 is a similar image that is most similar to the query image 215 (see FIG. 22). In other words, a case is assumed in which it is determined that the distance between two vectors, namely the integrated similarity vector 285 that corresponds to the query image 215 and an integrated similarity vector 284 that corresponds to the image 214, is the minimum among distances D for a plurality of combinations (the similarity between the two vectors is the maximum).

In this case, the image processing apparatus 30 (controller 31) generates explanatory information for explaining the inference basis (the basis of the inference made by the image processing apparatus 30 that the image 213a is similar to the query image 215). Then, the explanatory information is displayed on the display screen.

Figure 23:
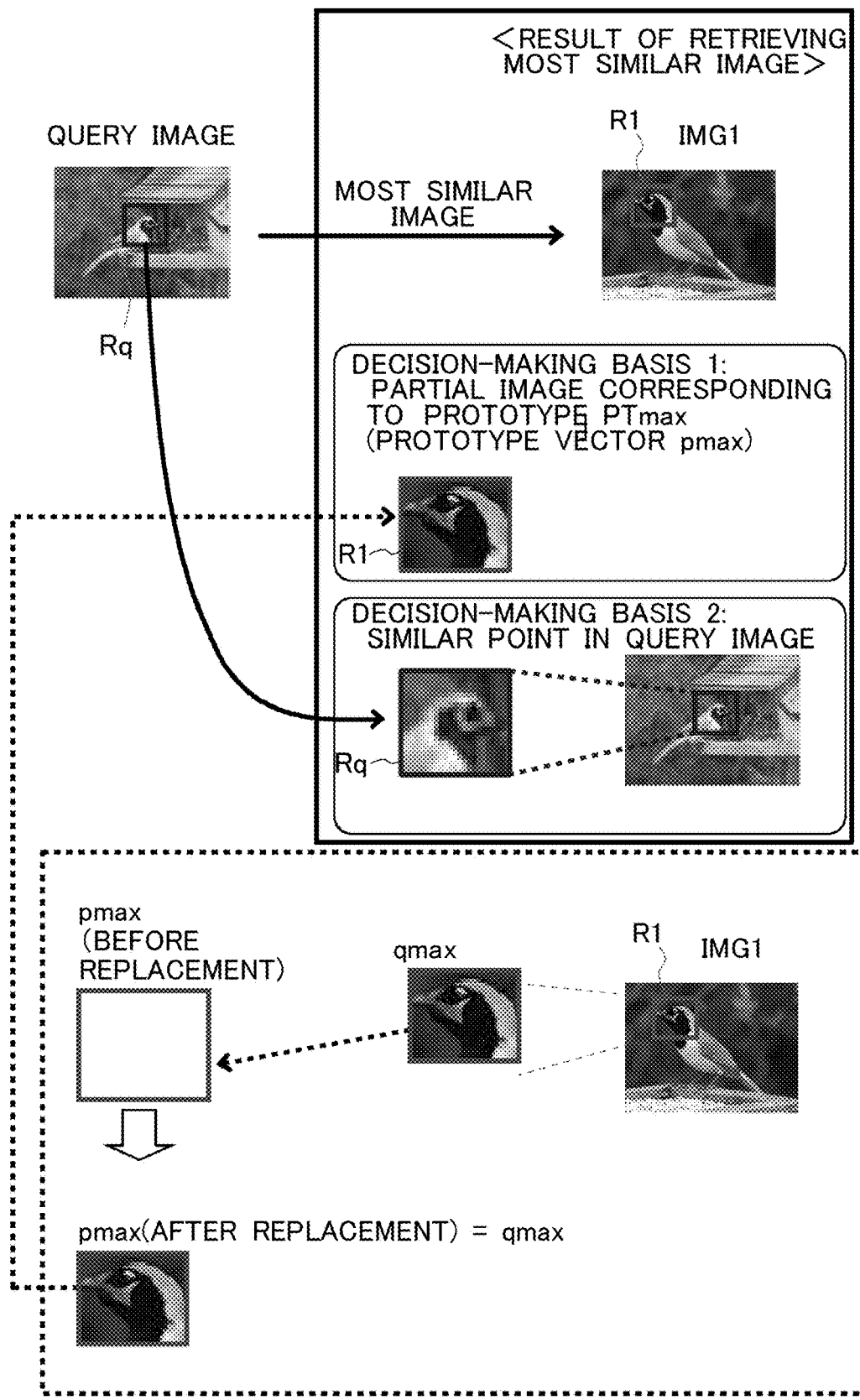
FIG. 23 shows an example of display of explanatory information.

FIG. 23 shows an example of display of the explanatory information (example of the display screen). For example, the whole of FIG. 23 may be displayed on the display unit 35b. In this example of display, an image that is retrieved as being most similar to the query image 215 (see the uppermost section on the left side) is displayed in the uppermost section on the right side. Moreover, a partial image that corresponds to a prototype PTmax (described next) is shown as "decision-making basis 1," and an image of a partial region (a partial image) that is similar to the prototype PTmax in the query image 215 (and the position of the image of the partial region in the query image 215) is shown as "decision-making basis 2."

To achieve such display, the controller 31 firstly sorts a plurality of components Sk of the feature vector (integrated similarity vector) 285 that corresponds to the query image 215 in descending order. The prototype PT (also expressed as PTmax) that corresponds to a maximum component Smax among the components Sk is the maximum basis of deciding similarity. That is, the maximum basis of deciding similarity of the image is that the query image includes an image feature that is similar to the specific image feature of the prototype PTmax.

In particular, though the aforementioned replacement processing (step S28), the prototype vectors pk of each prototype PTk are replaced with their most similar pixel vectors qmk by the aforementioned replacement processing (step S28) (see the rectangle indicated by the broken line in FIG. 23). In other words, each prototype vector pk is overwritten with its most similar pixel vector qmk. Thus, each component Sk of the integrated similarity vector 280 in the feature space represents similarity to the most similar pixel vector qmk. Accordingly, the most similar pixel vectors q (qmax) written over the prototype vectors p of the prototype PT (PTmax) become the maximum basis of deciding similarity.

Thus, the controller 31 presents the image feature that corresponds to the prototype PT (PTmax) having the maximum component Smax (i.e., the image feature corresponding to the overwritten most similar pixel vector qmax) to the user as the decision-making basis.

For example, in the case where the most similar pixel vector qmax overwritten on the prototype vector p (pmax) of the prototype PTmax corresponds to a specific partial region R1 in the image IMG1 (see the uppermost section in FIG. 20 and the lower section in FIG. 23), the controller 31 presents the image of the specific partial region R1 to the user as an image that indicates the basis of deciding similarity. Specifically, the controller 31 displays the image of the partial region that corresponds to the prototype PTmax (more specifically, the image of the partial region that corresponds to the most similar pixel vector qmax) as the "decision-making basis 1."

The controller 31 also identifies a region (specific similar region Rq) that is similar to the specific partial region R1 in the query image (inference target image) 215 and presents the image or the like of the specific similar region Rq to the user. Specifically, the controller 31 superimposes a rectangle (encircled rectangle) that surrounds the specific similar region Rq in the query image 215 on the display of the query image 215 so as to present the image feature of the specific similar region Rq and the position of the specific similar region Rq in the query image 215 together to the user as the "decision-making basis 2." The controller 31 also displays an enlarged image of the specific similar region Rq as the "decision-making basis 2." The enlarged image is displayed in the vicinity of (here, on the left side of) the display area of the query image 215 including the aforementioned encircled rectangle.

To be more specific, firstly, the controller 31 retrieves an image feature that is most similar to the most similar pixel vector qmax in the query image 215. Specifically, the pixel vector q that is most similar to the most similar pixel vector qmax (i.e., the prototype vector pmax of the prototype PTmax) is extracted from among the pixel vectors q in the feature map 230 obtained by inputting the query image 215 to the trained model 420. Then, the controller 31 displays, as the "decision-making basis 2," information such as the image of the partial region that corresponds to the extracted pixel vector q (specific similar region) and the position of the partial region in the image.

The following understanding is acquired in particular based on the "decision-making basis 1" out of the presentation of such decision-making basis (presentation from the apparatus). Specifically, the user is able to understand that the image processing apparatus 30 has decided "similarity" with reference to the image feature corresponding to the prototype PTmax (e.g., an image feature of a "blue head" in the specific partial region R1).

The following understanding is also acquired based on the "decision-making basis 2." Specifically, the user is able to grasp the partial region (specific similar region Rq) that is inferred as being similar to the specific partial region R1 in the query image 215 by the apparatus. By comparing the image feature of the specific similar region Rq and the image feature of the specific partial region R1, the user is able to confirm that the image feature of the specific partial region R1 (e.g., a "blue head") exists within the image feature of the specific similar region Rq and to understand that the inference result is correct.

This explanatory information allows similarity relating to the query image 215 (inference target image) to be very appropriately explained by using similarity to the replaced prototype vectors pmax. Here, the replaced prototype vectors pmax each represent the image feature of the most similar pixel vector qmax (i.e., the image feature of a specific partial region (e.g., R1) of a specific image (e.g., IMG1) among a plurality of learning images). Thus, the integrated similarity vector 280 that is output from the trained model 420 during the inference processing represents similarity to the image feature of the replaced most similar pixel vector qmax (not similarity to the image feature of the prototype vector pmax before replacement). Accordingly, the image processing apparatus 30 is capable of explaining to the user (human) that the apparatus 30 has decided similarity based on whether there is similarity to the image feature (e.g., a "blue head") of a specific partial region (e.g., R1) in a specific image (e.g., IMG1). In other words, it is possible to appropriately acquire high "transparency" (the property of being able to explain the inference result with concepts understandable by humans).

While FIG. 23 shows a case in which the query image 215 (inference target image) belongs to an already classified class, the present disclosure is not limited thereto, and the query image 215 may not belong to an already classified class.

Figure 24:
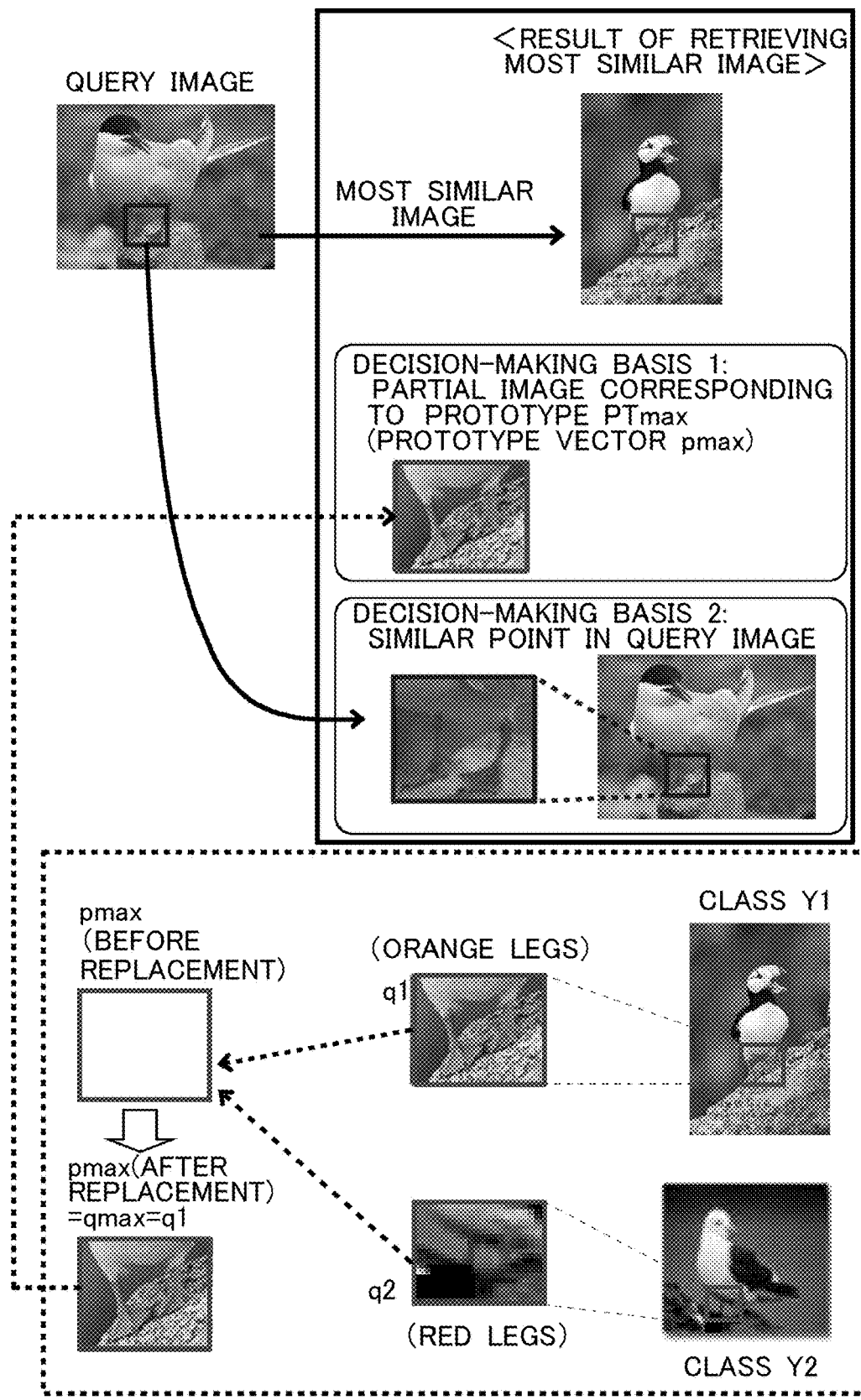
FIG. 24 shows another example of display of the explanatory information.

FIG. 24 shows an example of display different from that shown in FIG. 23. FIG. 24 shows a case in which the query image 215 does not belong to an already classified class.

FIG. 24 shows another example of display of the explanatory information (example of the display screen).

The query image 215 is an image of a bird that belongs to an unclassified class (a bird of a specific type with, for example, reddish legs). An image that is most similar to this query image 215 is retrieved from among a plurality of learning images. Here, a plurality of classes for leaning includes a first class Y1 (a given type of birds with, for example, orange legs) and a second class Y2 (another type of birds with, for example, red legs).

As the "decision-making basis 1," a partial image that corresponds to a prototype PTmax is shown. The prototype PTmax is a prototype PT that belongs to a plurality of (here, two) classes Y1 and Y2.

As the "decision-making basis 2," for example, an image of a partial region that is most similar to the prototype PTmax (an image of a partial region that indicates "reddish legs") in the query image 215 (an image of a bird with "reddish legs") is shown.

As described above, the evaluation term Lclst is also taken into consideration during distance learning relating to the integrated similarity vectors 280 based on the evaluation term Ltask described above. Accordingly, learning is performed so as to bring the prototype PT (as a result, PTmax) closer to a given pixel vector q in each image that belongs to each class in accordance with the belongingness of the prototype PT to each class. For example, the prototype vector pmax of the prototype PTmax is trained so as to become closer to the pixel vector q1 (which corresponds to "orange legs" in the image that belongs to the class Y1) and closer to the pixel vector q2 (which corresponds to "red legs" in the image that belongs to the class Y2) (see the large rectangle indicated by the broken line on the lower side in FIG. 24). As a result, not only the image of the bird with "orange legs" but also the image of the bird with "red legs" are arranged at close positions in the feature space of the integrated similarity vectors 280. It is assumed that the prototype vector pmax is replaced with the pixel vector q1, out of the pixel vectors q1 and q2, in the replacement processing in step S28.

The image processing apparatus 30 presents the explanatory information as shown in FIG. 24 to the user.

This explanatory information allows similarity relating to the query image 215 (inference target image) to be very appropriately explained by using similarity to the replaced prototype vector pmax. Here, the replaced prototype vector pmax represents the image feature of the most similar pixel vector qmax (to be short, "orange legs"). Thus, the image processing apparatus 30 is capable of explaining that the apparatus 30 has decided similarity based on whether there is similarity to the specific image feature ("orange legs"). In other words, it is possible to adequately acquire high transparency (the property of being able to explain the inference result with concepts understandable by humans).

The user who has obtained the explanatory information is able to understand from the "decision-making basis 1" that the image similar to the query image 215 has been retrieved based on the prototype PTmax. That is, the user is able to understand that the apparatus has decided similarity between images in accordance with whether there is similarity to the specific image feature ("orange legs") of the replaced prototype PTmax (here, equal to the pixel vector q1).

The present disclosure is, however, not limited thereto, and the user is also able to make the following interpretation in accordance also with information included in the "decision-making basis 2."

The "decision-making basis 2" gives, for example, the image feature of a similar point (a similar part) (specifically, "reddish legs") in the query image. The user is unable to acquire the fact that the prototype PTmax is trained to also reflect the pixel vector q2 ("red legs"), but is able to acquire the image feature ("orange legs") of the prototype PTmax and the image feature ("reddish legs") in the query image 215. On the basis of this information, the user is able to estimate (generally understand) that the prototype PTmax is, in actuality, trained to indicate the image feature representing "bright reddish legs" (an image feature that includes both "orange" and "red"). Therefore, the user is also able to interpret that the image processing apparatus 30 decides similarity on the basis of the image feature representing "bright reddish legs." In particular, as described above, relying also on the action of the evaluation value Lclst, a group of integrated similarity vectors 280 that corresponds to a group of images with similar features (features corresponding to the pixel vectors q1 and q2) are arranged at close positions to one another in the feature space. In consideration of this, the above interpretation has certain reasonableness.

1-7. Explanatory Processing 2 Relating to Inference Result

According to the above description, the image processing apparatus 30 explains the basis of the fact that the query image 215 is similar to a specific image among a plurality of images to be retrieved (a plurality of destination images for retrieval). The present disclosure is, however, not limited to this example, and the image processing apparatus 30 is also capable of explaining the basis of the fact that the query image 215 is not similar to a specific image among a plurality of images to be retrieved (a plurality of destination images for retrieval). Such a mode is described hereinafter.

The following description is given of a mode in which, in the case where the image processing apparatus 30 determines that the first image G1 and the second image G2 are not similar to each other, the image processing apparatus 30 explains the decision-making basis for dissimilarity between the two images G1 and G2 (see FIG. 25). Note that the first image may, for example, be the query image 215, and the second image may, for example, be an image that is determined (inferred) as being dissimilar to the query image 215 (e.g., any of a plurality of learning images).

In determining either similarity or dissimilarity, the controller 31 obtains a feature vector (integrated similarity vector) 280 (also expressed as s1) that corresponds to the first image G1 and a feature vector (integrated similarity vector) 280 (also expressed as s2) that corresponds to the second image G2 (see FIG. 25).

As described above, each component Sk of the integrated similarity vector 280 for a given input image 210 represents the distance between the k-th prototype vector pk and the in-image most similar pixel vector qnk for the input image 210 (see FIG. 25). Each component Sk indicates the degree to which the image feature expressed by the k-th prototype vector pk exists in the input image. The in-image most similar pixel vector qnk is a pixel vector q that is most similar to k-th prototype vector pk among a plurality of pixel vectors q in the feature map 230 output from the CNN 220 (feature extraction layer 320) in response to input of the input image 210.

For example, in the case where the distance (here, Euclidean distance) D between two vectors s1 and s2 relating to the two images G1 and G2 (see Expression (10) below) is less than a predetermined value, the image processing apparatus 30 determines that the first image G1 and the second image G2 are dissimilar to each other. In Expression (10), each numeric in braces that is a superscript on the right side of each component Sk of the integrated similarity vector s (280) is given to identify which of the first and second images is represented by the component.

Mathematical Expression 10

$$D = |s1 - s2| = \sqrt{\sum_{k=1}^{Nc}(S_k^{(1)} - S_k^{(2)})^2} \quad (10)$$

Figure 26:
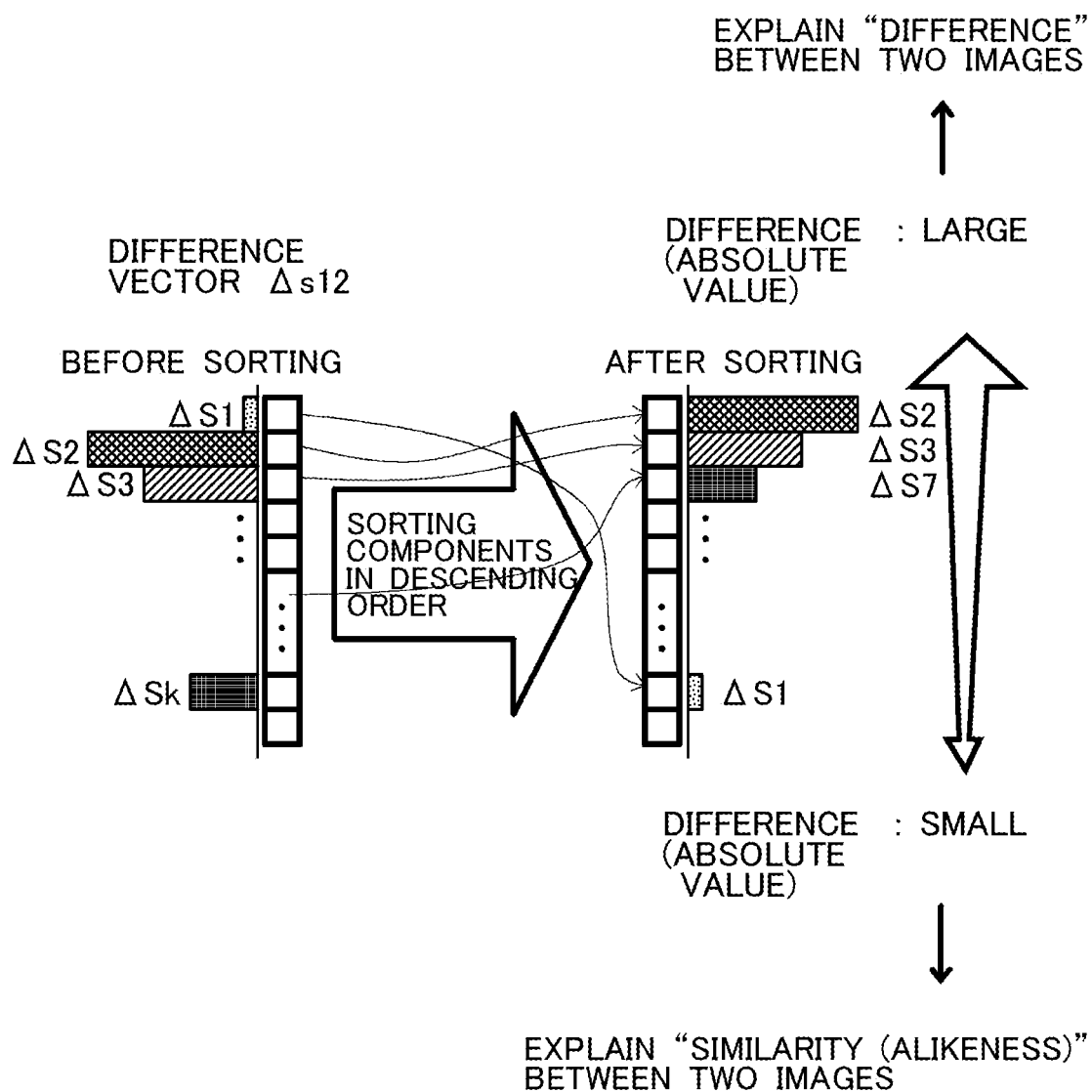
FIG. 26 shows sorting of difference vectors.

Next, the controller 31 compares the two vectors s1 and s2 for each component Sk. More specifically, the controller 31 obtains a difference vector $\Delta s$ ($=\Delta s12=s1-s2$) between the two vectors 283 (see the middle section on the right side in FIG. 25) and also sorts a plurality of (Nc) components $\Delta Sk$ (more specifically, the absolute values thereof) of the difference vector $\Delta s$ in descending order, where k is the value from 1 to Nc (see FIG. 26).

A small value of the k-th component $\Delta Sk$ (absolute value) of the difference vector $\Delta s$ means that k-th component Sk of one of the vectors (e.g., vector s1) and the k-th component Sk of the other vector (e.g., vector s2) have close values. On the other hand, a large value of the k-th component $\Delta Sk$ (absolute value) of the difference vector $\Delta s$ means, for example, that the k-th component Sk of the one vector s1 is large and the k-th component Sk of the other vector s2 is small. In other words, the prototype PTk (the concept of the image feature) that corresponds to the k-th component Sk is largely included in one of the images (e.g., first image G1), whereas the prototype PTk is not included (very much) in the other image (two images G2). That is, this means that the image feature of the prototype vector p of the k-th component Sk exists (enough) in one of the images (e.g., first image), but does not exist (little exists) in the other image (second image). Accordingly, as the k-th component $\Delta Sk$ of the difference vector $\Delta s$ becomes larger, the k-th prototype PTk serves as the prototype (concept) that is capable of more appropriately explaining the difference between the two images G1 and G2.

Here, after the plurality of (Nc) components $\Delta Sk$ (absolute values) of the difference vector $\Delta s$ are sorted in descending order, the image processing apparatus 30 determines that the prototype PTk that corresponds to the largest component $\Delta Sk$ ($\Delta S2$ in FIG. 26) serves as the prototype PT (highest-order prototype PT) that is capable of most appropriately (with the first priority) explaining the difference between the two images G1 and G2. The image processing apparatus 30 also determines that the prototype PTk that corresponds to the second largest component $\Delta Sk$ ($\Delta S3$ in FIG. 26) serves as the prototype PT (second highest-order prototype PT) that is capable of the second most appropriately (with the second priority) explaining the difference between the two images G1 and G2. Similarly, each prototype PTk is ranked in accordance with the order of the corresponding component $\Delta Sk$ (absolute value).

Figure 27:
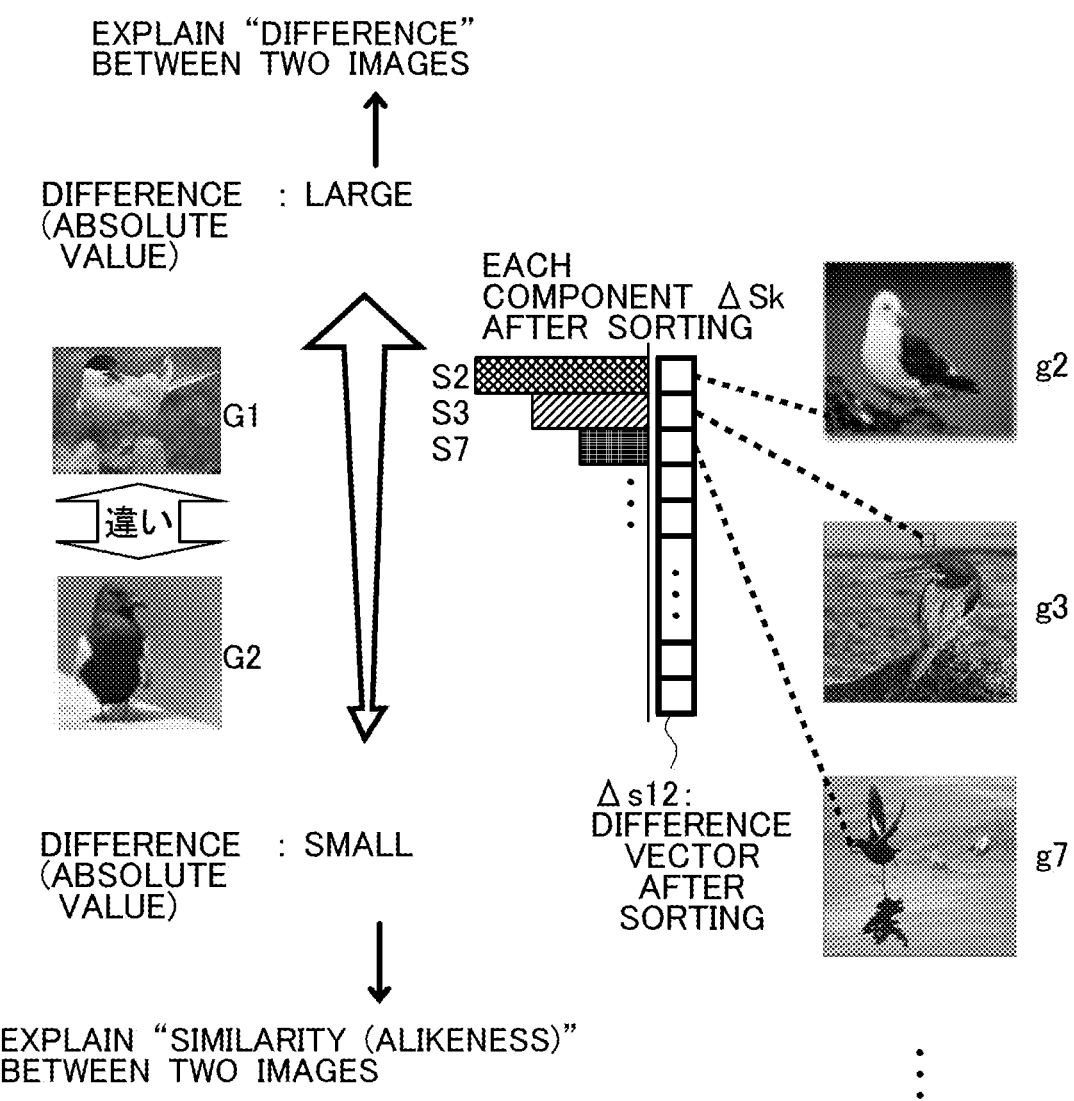
FIG. 27 shows an example of display of explanatory information on the result of inference indicating dissimilarity.

FIG. 27 shows an example of display of the explanatory information for explaining the difference (an example of the display screen). For example, the whole of FIG. 27 is displayed on the display unit 35b.

In FIG. 27, the two images G1 and G2 are displayed on the left side, and each component $\Delta Sk$ (absolute value) of the difference vector $\Delta s$ after sorting is displayed in graph form. Note that the value or other data of each component $\Delta Sk$ may also be displayed together.

Moreover, image features or the like of the prototype vectors pk that correspond to several (here, three) higher-order components among the components $\Delta Sk$ are displayed (see the right edge column in FIG. 27). Specifically, each image gk that includes the most similar pixel vector qmk that has replaced the prototype vector pk (image that most has the feature of the prototype vector pk) is shown together with a partial image that corresponds to the most similar pixel vector qmk and that is enclosed by and shown as a rectangle.

For example, for the highest-order component $\Delta S2$, an image g2 and a partial image of the image g2 (region enclosed by a rectangle) are shown. Similarly, an image g3 and a partial image of the image g3 are shown for the second highest-order component $\Delta S3$, and an image g7 and a partial image of the image g7 are shown for the third highest-order component $\Delta S7$.

Figure 28:
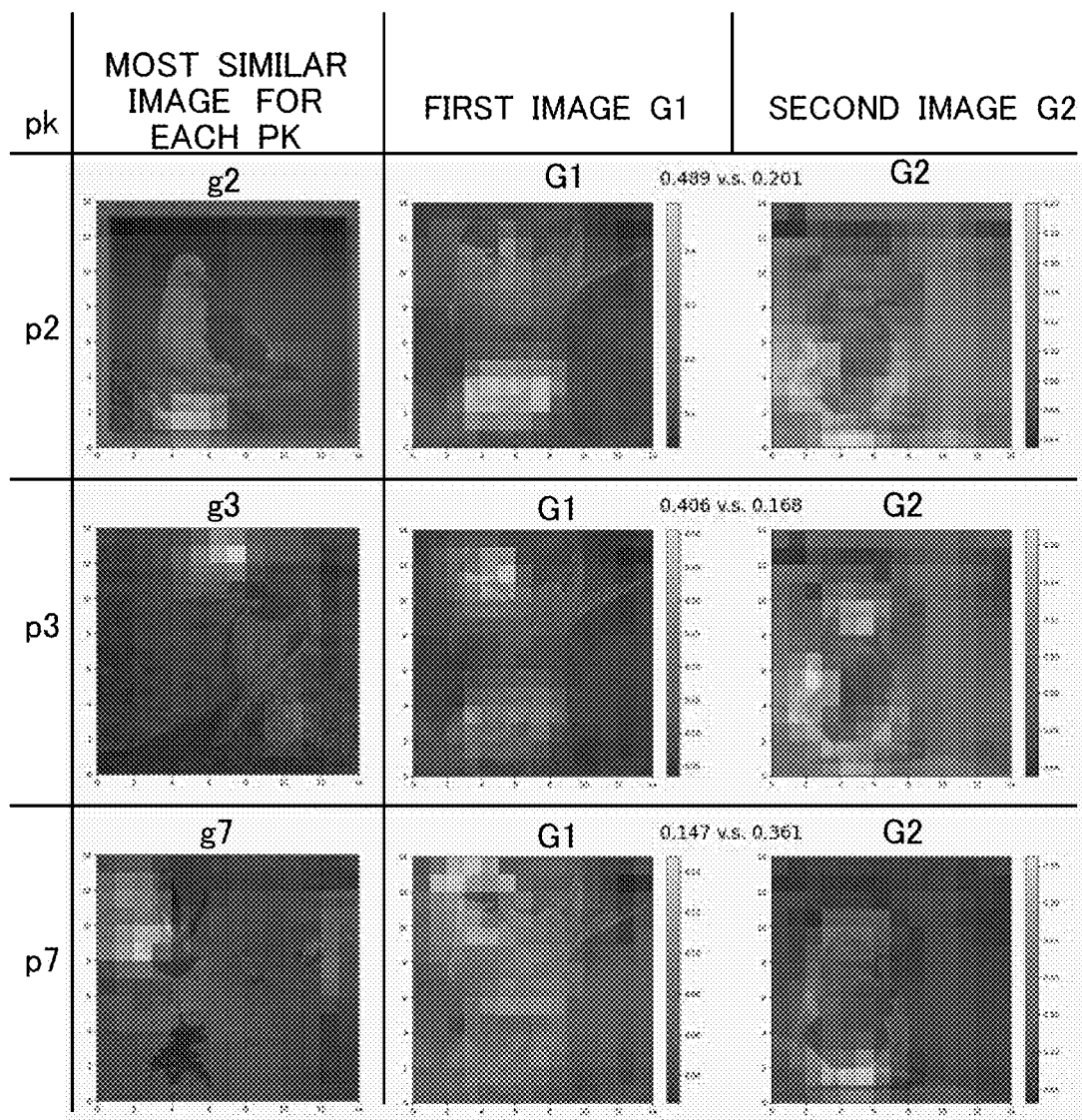
FIG. 28 shows an example of display of explanatory information on the result of inference indicating dissimilarity.

FIG. 28 shows an example of further detailed information. It is preferable that not only the display screen shown in FIG. 27, but also the display screen shown in FIG. 28 are also displayed.

A total of nine heat maps that include three rows in the up-down direction and three columns in the right-left direction in FIG. 28 show the flash position in each most similar image (see the leftmost column), the flash position in the first image G1 (see the middle column), and the flash position in the second image G2 (see the rightmost column) for the three higher-order prototype vectors p2 (see the uppermost row), p3 (see the middle row), and p7 (see the lowermost row). The heat maps that correspond to each row of prototype vectors pk (i.e., three heat maps aligned in the lateral direction) correspond to the k-th planar similarity maps 260 (FIG. 3) relating to each column of images. Note that the flash positions in each image (positions (w, h) of the pixel vectors q that have high degrees of similarity to each prototype vector pk) are shown in relatively bright color. It is, however, noted that scale varies for each heat map (more specifically, scale is converted so that the maximum similarity in each heat map becomes 100%). Therefore, caution should be exercised when brightness comparison is made among the nine heat maps (or it is preferable that no comparison is made in brightness among the nine heat maps).

The heat map in the uppermost row and the leftmost column in FIG. 28 shows that the flash position in the most similar image g2 relating to the prototype vector p2 is located in the vicinity of the bird's legs. That is, it is understood that the prototype vector p2 represents the image feature in the vicinity of the bird's legs in the most similar image g2. The heat map in the uppermost row and the middle column (in the right-left direction) shows that the flash position in the first image G1 corresponding to the prototype vector p2 is located in the vicinity of bird's legs. The heat map in the uppermost row and the rightmost column shows that the flash position in the second image G2 corresponding to the prototype vector p2 is located in the vicinity of the birds' legs. It is, however, noted that similarity at the flash position in the first image G1 is high (e.g., "0.489"), and similarity at the flash position in the second image G2 is low (e.g., "0.201"). That is, the image feature of the prototype vector p2 relatively largely appears in the first image G1 (the left edge column on the upper side in FIG. 27), but does not appear very much in the second image G2 (the left edge column on the lower side in FIG. 27).

The heat map in the middle row and the leftmost column in FIG. 28 shows that the flash position in the most similar image g3 relating to the prototype vector p3 is located on the background (above the bird's head). That is, it is understood that the prototype vector p3 represents the image feature of part of the background in the most similar image g3. The heat map in the middle row and the middle and rightmost columns (in the right-left direction) shows that the flash position in the first image G1 and the flash position in the second image G2 are located in bright regions. It is, however, noted that similarity at the flash position in the first image G1 is high (e.g., "0.406"), and similarity at the flash position in the second image G2 is low (e.g., "0.168"). That is, the image feature of the prototype vector p3 relatively largely appears in the first image G1, but does not appear very much in the second image G2.

The heat map in the lowermost row and the leftmost column in FIG. 28 shows that the flash position in the most similar image g7 relating to the prototype vector p7 is located in the vicinity of the tip end of the bird's beak. That is, it is understood that the prototype vector p7 represents the image feature (e.g., a long and narrow shape) in the vicinity of the tip end of the bird's beak in the most similar image g7. The heat map in the lowermost row and the middle and rightmost columns (in the right-left direction) shows that the flash position in the first image G1 and the flash position in the second image G2 are located in bright regions. It is, however, noted that similarity at the flash position in the first image G1 is low (e.g., "0.147"), and similarity at the flash position in the second image G2 is high (e.g., "0.361"). That is, the image feature of the prototype vector p7 relatively largely appears in the second image G2, but does not appear very much in the first image G1.

The image processing apparatus 30 presents such explanatory information to the user.

In particular, the image processing apparatus 30 presents several (here, three) higher-order prototype vectors pk (concepts) to the user as the decision-making basis of the apparatus 30 that the two images G1 and G2 are dissimilar to each other. Upon receipt of this presentation, the user is able to understand that the two images are dissimilar to each other, on the basis of, for example, the concept expressed by the several higher-order prototype vectors pk such as the concept of the highest-order prototype vector p2 (image feature of the vicinity of the bird's legs in the most similar image g2).

While a case is assumed herein in which an image to be compared with the query image 215 (inference target image) (which belongs to an unclassified class) is any of a plurality of learning images, but the present disclosure is not limited thereto. The image to be compared may be an image other than the learning images. The image to be compared may also be an image that belongs to an unclassified class. In this way, when two images are compared with each other, each of the two images may be any of a plurality of learning images, or may be an image other than a plurality of learning images. The two images may also be images that belong to an unclassified class.

1-8. Advantageous Effects of Embodiment

In the above-described embodiment, the distance learning relating to the integrated similarity vectors 280 proceeds by the action of minimizing the evaluation term Ltask in the stage of training the learning model 400. Accordingly, a plurality of feature vectors that correspond to a plurality of input images including subjects of the same class (e.g., birds of the same type) are arranged at close positions to one another in the feature space relating to the integrated similarity vectors 280. On the other hand, a plurality of feature vectors that correspond to a plurality of input images relating to different classes (birds of different types) are arranged at distant positions from one another.

Moreover, each prototype vector pk is trained by the action of minimizing the evaluation term Lclst so as to become closer to, for example, the most similar pixel vector q. Accordingly, each prototype vector pk is trained so as to reflect the image feature of a specific partial region of a specific image. In other words, each prototype vector pk after learning is trained to represent the concept of each prototype PTk (the concept of the image feature).

In particular, each prototype vector pk is trained in accordance with the distributed prototype belongingness Tik for each image so as to become closer to any pixel vector in the feature map corresponding to each image (image-specific most similar pixel vector q in the image). Accordingly, each prototype is trained so as to represent a feature that is close to the image feature (pixel vector) of a specific region of a specific image. This makes it possible to improve explainability of the learning model about learning results (in particular, transparency: the ability to explain with concepts understandable by humans).

In particular, each prototype PT is capable of belonging to two or more classes. Thus, each prototype vector p may be trained so as to reflect similar image features among different images of different classes. Since there is no need to prepare a predetermined number of dedicated prototype vectors for each class, it is possible to efficiently construct the prototype vectors p.

For example, a case is assumed in which a given prototype vector pk belongs to both first and second classes. In this case, the prototype vector pk is trained so as to reflect an image feature that is similar to both of the pixel vector q1 corresponding to a first image feature of a given image that belongs to the first class and the pixel vector q2 corresponding to a second image feature of a given image that belongs to the second class. Moreover, by a multiplier effect with the distance learning relating to the integrated similarity vectors 280, the integrated similarity vectors 280 corresponding to an image that has an image feature similar to the pixel vector q1 and the integrated similarity vector 280 corresponding to an image that has an image feature similar to the pixel vector q2 are arranged at close positions to each other in the feature space.

Each prototype vector p is trained in accordance with the prototype belongingness for each image (belongingness that varies for each image) so as to become closer to a different image that belongs to the same class. To be more specific, each prototype vector p is trained so as to reflect an image feature in accordance with belongingness that also varies for each image of the same class (image-specific prototype belongingness). Accordingly, it is possible to efficiently construct the prototype vectors p.

According to this learning processing, it is possible to use an image other than images of known classes (i.e., an image of an unclassified classes) as an inference target image and to construct (generate) a learning model that is also usable in image retrieval processing for retrieving a similar image that is similar to the inference target image from among a plurality of images.

In step S22 (FIG. 9) described above, when one prototype belongs to two or more classes, belongingness of the one prototype to each of the two or more classes is reduced. Accordingly, it is possible to reduce importance of the belonged prototype that is common to a plurality of (in particular, a large number of) classes in consideration of the fact that such a belonged prototype highly possibly corresponds to a background or the like.

In step S28 (FIG. 10) described above, the trained model 420 is corrected by replacing each prototype vector with a pixel vector that corresponds to a specific region of a specific image. In the corrected trained model 420, similarity between each replaced prototype vector pk (i.e., the most similar pixel vector qmk) and the image feature of any partial region of each input image appears directly in the integrated similarity vector 280. To be specific, for example, the similarity map 270 and the integrated similarity vector 280 are formed to indicate similarity between each pixel vector q in the input image and the replaced prototype vector pk.

Accordingly, the feature of the input image can be explained more appropriately by using similarity to the most similar pixel vector qmk overwritten on the prototype vector pk (the image feature of a specific region of a specific image among a plurality of learning images). For example, as shown in FIG. 23, the image processing apparatus 30 is capable of explaining, as the decision-making basis by itself, similarity to the image feature of the most similar pixel vector qmax (the image feature of the specific partial region R1 of IMG1 such as a "blue head"; see FIG. 23). In other words, it is possible to adequately acquire very high transparency (the property of being able to explain inference results with concepts understandable by humans).

2. Second Embodiment

A second embodiment is a variation of the first embodiment. The following description is given focusing mainly on differences from the first embodiment.

In the first embodiment described above, for example, the basis of dissimilarity between a given image and the query image 215 is also explained. That is, the basis of dissimilarity between a given image pair is explained.

Figure 29:
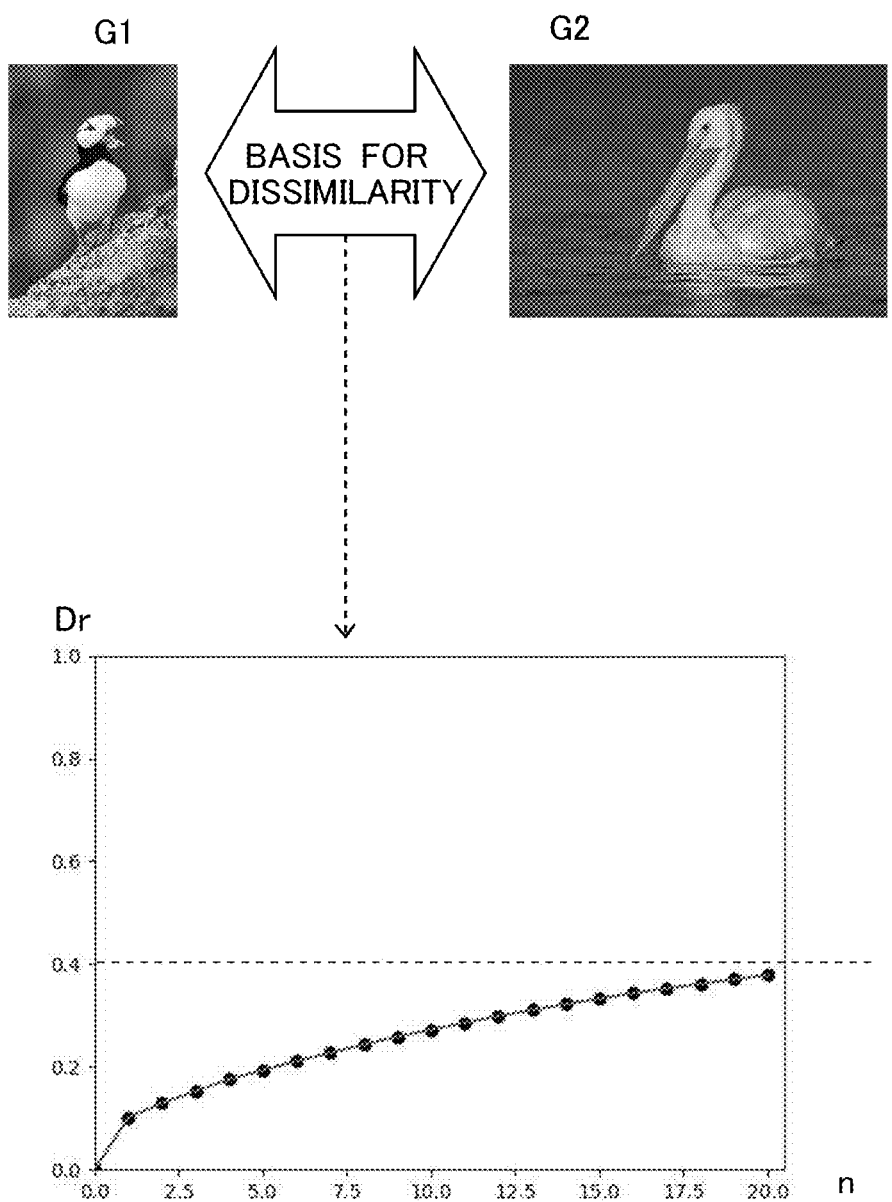
FIG. 29 shows the degree of explanation achieved by predetermined several higher-order prototypes (before improvement).

FIG. 29 is a graph showing evaluation results of evaluating to which extent the difference between a given image pair (images G1 and G2) can be explained, by using a predetermined number of (e.g., 20) higher-order prototype vectors p (concepts) among Nc prototype vectors p. Note that FIG. 29 and subsequent drawings show an image pair that is different from the image pair shown in FIGS. 25 and 26.

Expression (11) below expresses a distance Dn between two images represented by the components of n higher-order prototypes PT among the Nc prototype vectors p. The value Dn can also be expressed as the magnitude of a partial difference vector that is reconfigured by only n higher-order components $\Delta S_k$ of the n higher-order prototypes after a plurality of components $\Delta S_k$ (absolute values) of the difference vector $\Delta s$ ($=s1-s2$) are sorted in descending order.

Mathematical Expression 11

$$D_n = \sqrt{\sum_{k=1}^{n}(S_k^{(1)} - S_k^{(2)})^2} \tag{11}$$

Then, a ratio Dr of the distance Dn (Expression (10)) expressed by the components of the n higher-order prototypes PT to a total distance D between the image pair (Expression (10)) can be expressed by Expression (12) below.

Mathematical Expression 12

$$D_r = \frac{D_n}{D} \tag{12}$$

This value (distance ratio) Dr is an evaluation value for evaluating to which extent the difference between the given image pair (images G1 and G2) can be explained, by using the n higher-order prototypes vectors p (concepts). With this value Dr, it is possible to evaluate to which extent the distance Dn can be reached by the n higher-order prototypes vectors p with respect to the distance (100%) between the feature vectors of two images i and j.

The graph in FIG. 29 shows the value Dr for the two images G1 and G2 of different classes (the image pair in FIG. 29). This value Dr is calculated based on two integrated similarity vectors 280 (s1, S2) obtained by using the trained model 420 that is acquired through the learning processing according to the first embodiment described above. In the graph, the horizontal axis indicates the value n (the number of prototypes to be considered), and the vertical axis indicates the value Dr.

The graph in FIG. 29 shows each value Dr obtained by using one to 20 higher-order prototype vectors p before improvement. That is, the graph shows the value Dr, obtained by using one higher-order prototype vector p, the value Dr obtained by using two higher-order prototype vectors p, and so on up to the value Dr obtained by using 20 higher-order prototype vectors p.

The graph in FIG. 29 shows that about 10% of the value Dr can be obtained by using the highest-order prototype, and about 13% of the value Dr can be obtained by using the two higher-order two prototypes. The value Dr that can be obtained by using up to the 20 higher-order prototypes is less than 40%. This indicates that, even if the 20 higher-order concepts are used, only less than 40% of the entire difference (total distance D) can be explained. In other words, the generated prototypes may not always be appropriate prototypes. Accordingly, there is still room for improvement of "clarity" (the property of being able to explain the decision-making basis with a small number of concepts) out of explainability (interpretability) about decision-making basis.

In view of this, the second embodiment provides a technique for improving "clarity" of decision-making basis.

The second embodiment uses an evaluation function L expressed by Expression (13), instead of the evaluation function L expressed by Expression (2).

Mathematical Expression 13

$$L = L_{task} + \lambda_c * L_{cist} + \lambda_a * L_{aux} + L_{int} \tag{13}$$

The evaluation function L expressed by Expression (13) is the evaluation function to which a new evaluation term Lint is added.

This evaluation term Lint will be described hereinafter.

FIG. 30 shows graphs showing that the horizontal axis of the graph in FIG. 29 is extended up to all (Nc) of the prototypes PT. The graph in the upper section in FIG. 30 shows inferior "clarity," and the graph in the lower section in FIG. 30 shows improved "clarity" as compared to that in the graph shown in the upper section. As shown in FIG. 30, clarity can be improved by bringing up the graph and, more specifically, by minimizing the area of the diagonally shaded portion in the graph.

Thus, a value Lia expressed by Expression (14) is defined, and learning proceeds so as to minimize the value Lia.

Mathematical Expression 14

$$L_{ia} = \frac{1}{N_d} \sum_{n=1}^{N_d} \left(1 - \frac{D_n}{D}\right) \tag{14}$$

$$= \frac{1}{N_d}\left(N_d - \frac{\sum_{n=1}^{N_d} D_n}{D}\right)$$

Figure 31:
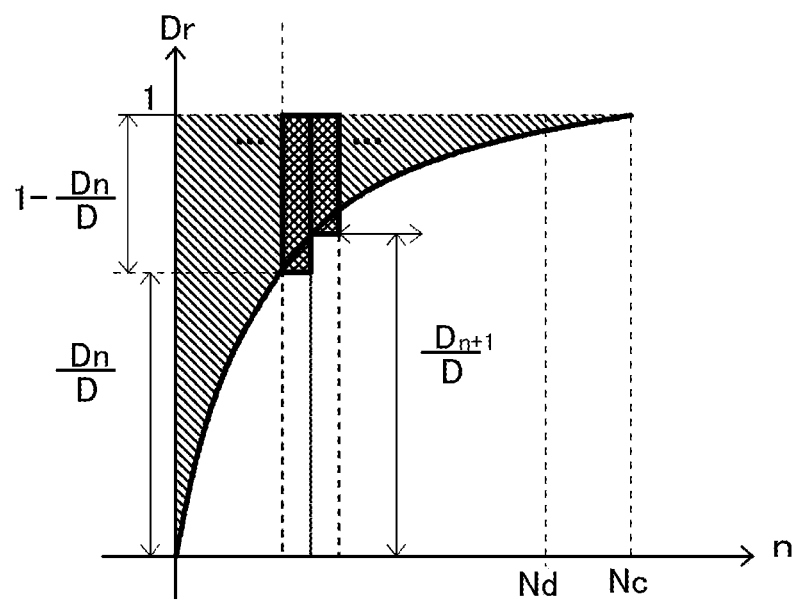
FIG. 31 is a diagram for explaining the evaluation term Lint for clarity improvement.

The value Lia expressed by Expression (14), where Nd=NC, corresponds to the area of the diagonally shaded portion (diagonally hatched region) of the graph in FIG. 30. Here, the area of the diagonally shaded portion is approximated to the area of an assembly of band-like regions as shown in FIG. 31. The area of each band-like region is indicated by the value obtained by multiplying the longitudinal length (1−Dn/D) by the width (e.g., "1"). The value Lia expressed by Expression (14) is equal to the value obtained by first adding all the lengths (1−Dn/D) while changing the value n from 1 to Nd and then dividing a resultant value by the value Nd. The value Nd as used herein is the value Nc (the total number of prototypes PT). This value Lia is determined for each image pair.

Then, the evaluation term Lint is calculated by first calculating and adding all the values Lia for all image pairs relating to a plurality of learning images and then dividing a resultant value by the number of pair Np (see Expression (15)).

Mathematical Expression 15

$$L_{int} = \frac{1}{N_p} \sum_{a \in B} L_{ia} \tag{15}$$

By training the learning model 400 so as to minimize the evaluation function including the evaluation term Lint described above, the learning model 400 (e.g., prototype vectors p) is optimized. In other words, the learning model 400 is optimized so as to minimize the evaluation value Lint expressed by Expression (15) (and the evaluation value Lia expressed by Expression (14)).

Minimizing (optimizing) the evaluation value Lint expressed by Expression (15) (and the evaluation value Lia expressed by Expression (14)) is equivalent to maximizing the value (see Expression (14)) normalized by dividing a sum total of a plurality of magnitudes Dn (see Expression (11)) that correspond respectively to a plurality of values n (see Expression (11)) by a vector distance D between the two vectors s1 and S2. Note that the plurality of magnitudes Dn are values of the distance Dn (see Expression (11)) obtained for each of a plurality of values n, where n is the value from 1 to Nd, and Nd is a predetermined integer less than or equal to the number of dimensions Nc of the integrated similarity vector. The distance Dn is also the magnitude of a partial difference vector that is reconfigured by only up to n higher-order components ΔSk after a plurality of components ΔSk (absolute values) of the difference vector Δs (=s1−s2) are sorted in descending order.

Figure 32:
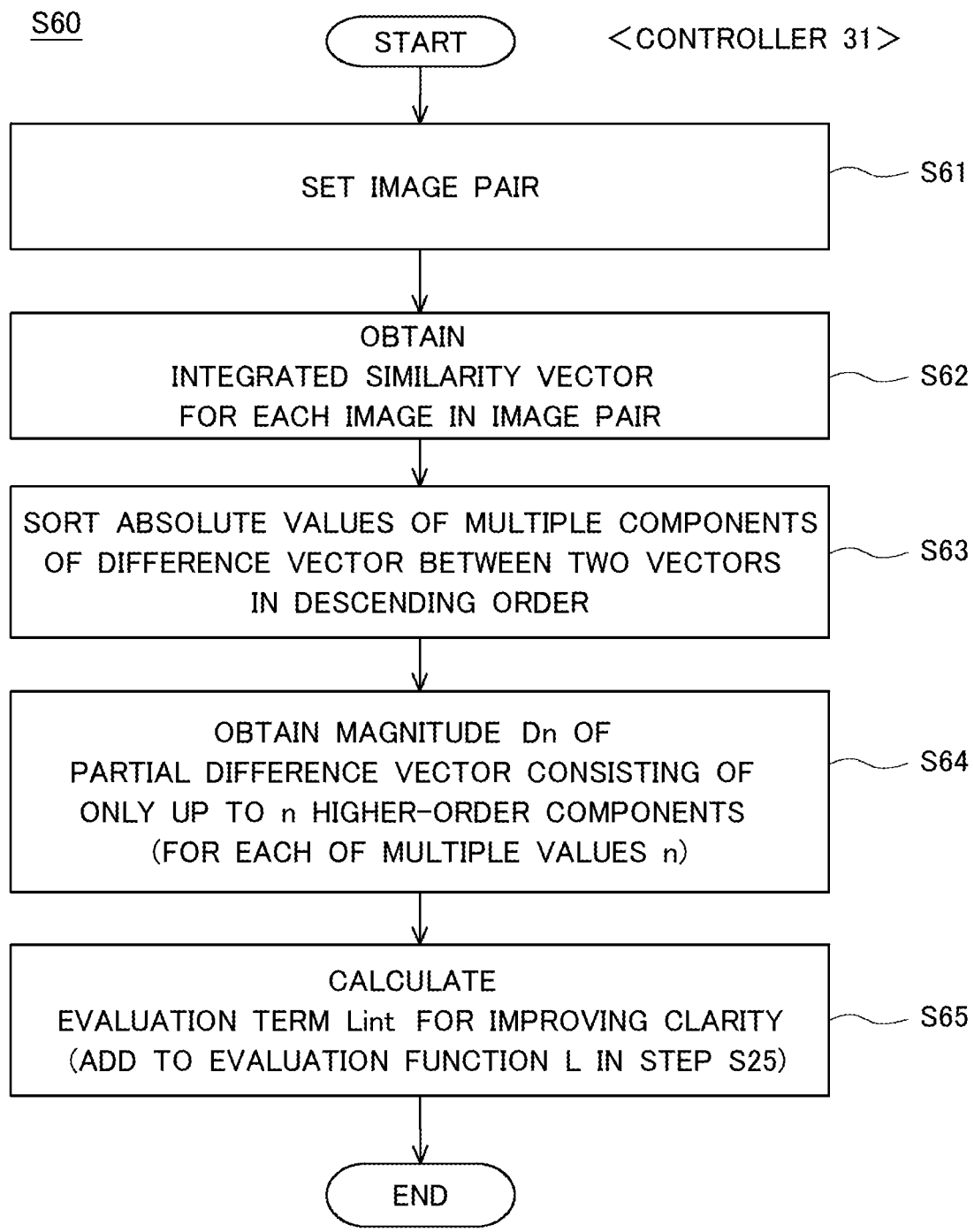
FIG. 32 shows learning processing or the like relating to the evaluation term Lint.

Next, details on this processing will be further described with reference to the flowchart in FIG. 32. FIG. 32 shows, for example, learning processing relating to the evaluation term Lint.

Processing in FIG. 32 (step S60) is executed during (or before) the processing performed in step S25 (FIG. 9). In step S25, the evaluation function Lint calculated in step S60 is also added to the evaluation function L, and machine learning proceeds in, for example, step S26.

Firstly, in step S61, the controller 31 focuses on any image pair among all image pairs relating to a plurality of learning images.

Then, the controller 31 obtains the integrated similarity vector 280 for each image of the image pair (also referred to as the image pair concerned) (step S62). Specifically, the controller 31 obtains two vectors, namely the integrated similarity vector 280 (first vector s1) obtained by inputting the first image G1 to the learning model 400 and the integrated similarity vector 280 (second vector s2) obtained by inputting the second image G2 to the learning model 400.

Next, the controller 31 sorts the absolute values of a plurality of components ΔSk of the difference vector Δs between the first vector s1 and the second vector s2 in descending order (step S63). The absolute value of each component ΔSk can also be expressed as the absolute value of a difference value (the magnitude of the difference for each prototype component) obtained as a difference between the two vectors s1 and s2 for each component (prototype component).

The controller 31 also obtains, for each of the values n where n is the value from 1 to Nd, the magnitude Dn of a partial difference vector that is reconfigured by only up to n higher-order components after the components ΔSk of the difference vector Δs are sorted in descending order (step S64). The value Nd is a predetermined integer less than or equal to the number of dimensions Nc of the integrated similarity vector described above. The value Nd as used herein is set to the value Nc (a value equal to the value Nc).

Then, the controller 31 calculates the value Lia in accordance with Expression (14) (step S65).

In step S64, the controller 31 further obtains the value Lia for all of the image pairs by repeatedly executing steps S61 to S64 while changing the image pair concerned. In other words, the controller 31 executes the processing in steps S61 to S64 for the arbitrary combination of the first and second images among the learning images. Then, the controller 31 calculates the value Lint in accordance with Expression (15) (step S65).

Thereafter, in step S25, the evaluation function L that also includes the evaluation term Lint is calculated in accordance with Expression (13).

Then, steps S21 to S25 and steps S61 to S65 are repeatedly executed so as to minimize (optimize) the evaluation function L. In this way, the learning processing (machine learning) using the learning model 400 proceeds (step S26). To be more specific, learning processing proceeds so as to minimize each of the evaluation term Lia expressed by Expression (14) and the evaluation term Lint expressed by Expression (15). Minimizing the evaluation term Lia expressed by Expression (14) is equivalent to maximizing the value (Dn/D) normalized by dividing a sum total of the magnitudes Dn that correspond respectively to the values n by the vector distance D between the two vectors.

FIG. 33 shows an example of improvement on the image pair shown in FIG. 29. Specifically, how clarity of the inference basis (the reason for dissimilarity) is improved is shown for the case where inference processing relating an inference target image (more specifically, the image pair shown in FIG. 29) executed based on the trained model 420 obtained by the learning processing according to the second embodiment.

The upper section in FIG. 33 shows each value Dr in the case of using one to up to 20 higher-order prototype vectors p before improvement. As described above, the graph in the upper section shows that only about less than 40% of the entire difference (total distance D) can be explained even by using 20 higher-order prototype vectors p (concepts).

On the other hand, the lower section in FIG. 33 shows each value Dr in the case of using one to up to 20 prototype vectors p after improvement (in the case where inference is made using the trained model 420 along with the evaluation term Lint as described above). The graph in the lower section shows that about 60% of the entire differences (total distance D) can be explained by using the 20 higher-order prototype vectors p (concepts). The degree of explainability (value Dr) is improved by about 20% as compared to the case before improvement.

After improvement, about 22% of the value Dr can be obtained by using the highest-order prototype, and about 28% of the value Dr can be obtained by using two higher-order prototypes. About 40% of the value Dr can be obtained by using approximately seven higher-order prototypes. In this way, the decision-making basis can be explained with a small number of concepts, and "clarity" is improved.

According to the second embodiment, it is possible to improve clarity (the ability to explain decision-making basis with a small number of concepts) out of explainability (interpretability).

Higher-order prototype vectors after improvement are changed to different vectors from those before improvement. In other words, higher-order prototype vectors are changed to prototype vectors for more adequately explaining the difference between the two images G1 and G2.

While the value Nd is set to the value Nc in Expression (14) in the above-described embodiment, the present disclosure is not limited to this example, and the value Nd may be smaller than the value Nc. In the case where the value Nd is smaller than the value Nc, the value Lia expressed by Expression (14) corresponds to the area on the left side of n=Nd among the area of the diagonally shaded portion in the graph shown in FIG. 31. Even in this case, it is possible to achieve a somewhat effect of minimizing the area of the diagonally shaded portion. However, in this case, the area of the diagonally shaded region on the right side of the value Nd is not always minimized. Accordingly, the value Nd may preferably be the value Nc.

Variation of Second Embodiment

Figure 34:
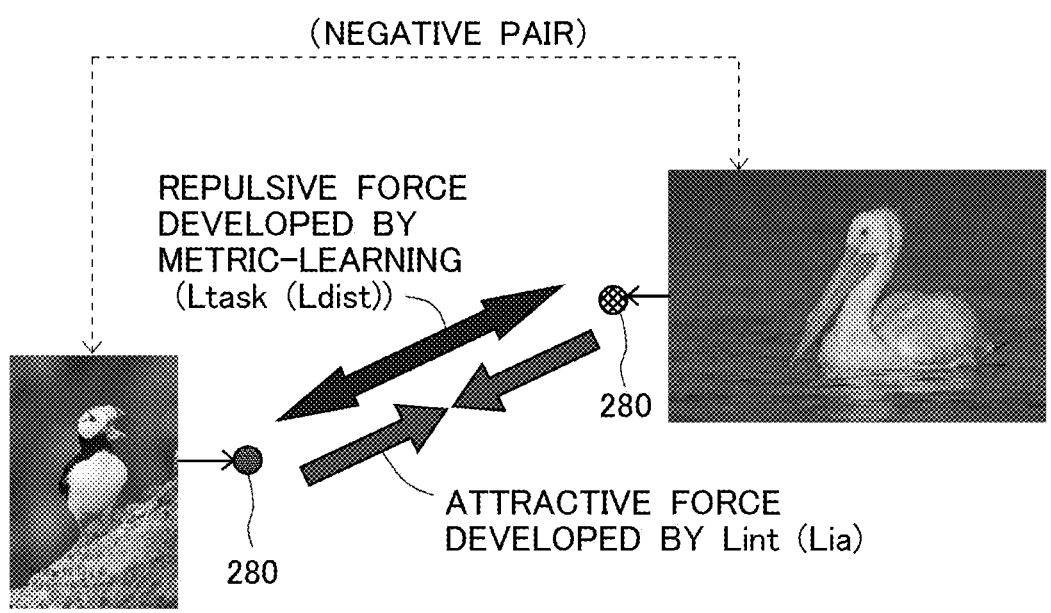
FIG. 34 shows a repulsive force and an attractive force that act on a negative pair.

In the learning processing for minimizing the evaluation term Ltask (see Expression (3)) relating to the distance learning, a force (repulsive force) acts to increase the distance D between a negative pair in the feature space (the distance between the integrated similarity vectors 280 relating to the negative pair) (see the both-way arrow in FIG. 34). The value ($\delta$Ldist/$\delta$D) obtained by partial differentiation of the evaluation term Ldist (described later) with respect to the distance D can also be expressed as the repulsive force acting between the negative pair (between the anchor and the negative) by the evaluation term Ltask. The value Ldist as used herein indicates the term regarding the distance dan between the anchor and the negative in Expression (3) (see Expression (20) described later). The absolute value of the value ($\delta$Ldist/$\delta$D) is one.

Meanwhile, it is derived based on, for example, Expression (14) that the value ($\delta$Lint/$\delta$D) obtained by partial differentiation of the evaluation term Lint (Expression (15)) relating to clarity with respect to the distance D is always positive. Optimization using the evaluation term Lint has the effect of reducing the distance D between the integrated similarity vectors 280 in the feature space. The value ($\delta$Lint/$\delta$D) can also be expressed as attractive force induced by the evaluation term Lint (see the inward arrows in FIG. 34). It is also derived based on, for example, Expression (14) that the value ($\delta$Lint/$\delta$D) obtained by partial differentiation of the evaluation term Lint expressed by Expression (15) with respect to the distance D is inversely proportional to the distance D (see Expression (16)). That is, the attractive force induced by the evaluation term Lint increases with a decrease in distance D.

Mathematical Expression 16

$$\frac{\delta L_{int}}{\delta D} \propto \frac{1}{D} \tag{16}$$

To improve clarity, the evaluation term Lint needs to be reduced. If the evaluation term Lint is reduced, the distance D decreases and the attractive force induced by the evaluation term Lint increases.

Accordingly, the evaluation term Lia expressed by Expression (14) (and the evaluation term Lint expressed by Expression (15)) are employed as-is, the attractive force induced by the evaluation term Lint will exceed the repulsive force induced by the evaluation term Ltask, and the negative pair come close to each other (the negative pair will move so as to reduce the distance D therebetween). In other words, although there is demand to increase the distance D between the negative pair during distance learning, the distance D between the negative pairs may be reduced on the contrary due to the attractive force acting too much by the evaluation term Lint. That is, the accuracy of the distance learning may degrade.

In view of this, according to this variation, the evaluation term Lint is changed as expressed by Expression (17). Expression (17) is a formula in which the value Lia in Expression (15) is the expression that replaces the value Lia expressed by Expression (15) with a new value Lia (hereinafter, also expressed as the value Lib).

Mathematical Expression 17

$$L_{int} = \frac{1}{N_p} \sum_{a \in B} L_{ib} \qquad (17)$$

The value Lib can be expressed by Expression (18) below. The value Lib is obtained by multiplying the value Lia expressed by Expression (14) by a coefficient w, where w is the value less than or equal to one. The value Lib can also be expressed as the value (value Lia after correction) obtained by correcting (e.g., reducing) the value Lia before correction with use of a coefficient w.

Mathematical Expression 18

$$L_{ib} = W * L_{ia} \qquad (18)$$

The coefficient w is expressed by Expression (19) below.

Mathematical Expression 19

$$w = \min(1, \delta \left| \frac{\delta L_{(1ist)}}{\delta D} \right| \cdot \frac{1}{\frac{\delta L_{ia}}{\delta D}}) \qquad (19)$$

The coefficient w is determined for each pair (in the same manner as the value Lia before correction). The coefficient w expressed by Expression (19) corresponds to the value obtained by dividing the repulsive force induced by the evaluation term Ltask by the attractive force induced by the evaluation term Lint. The attractive force induced by the evaluation term Lint is expressed by the value (δLia/δD) obtained by partial differentiation of the distance D with respect to the evaluation term Lia before correction, and the repulsive force induced by the evaluation term Ltask is expressed by the value (δLdist/δD) obtained by partial differentiation of the evaluation term Ltask (more specifically, the evaluation term Ldist relating to the negative pair) with respect to the distance D.

That is, the coefficient w is the value obtained by dividing the repulsive force (δLdist/δD) by the attractive force (δLia/δD) that are too large. In the case where the attractive force (δLia/δD) is larger than the repulsive force (δLdist/δD), the value Lia (Lib) after correction is calculated by making adjustment such that the value Lia is reduced by the value w (the value smaller than one). In other words, the value Lia is adjusted so that the attractive force (δLib/δD) after correction does not exceed the repulsive force.

The evaluation term Ldist is expressed by Expression (20).

Mathematical Expression 20

$$\delta L_{dist} = [m - d_{an} + \beta]_+ \qquad (20)$$

Here, the evaluation term Ltask (Expression (3)) is expressed as a sum total (more specifically, an averaged value of the sum total) obtained by adding all pair-specific evaluation terms Lta (described next) for a plurality of image pairs, the pair-specific evaluation term Lta being the evaluation term obtained for each image pair and relating to distance learning based on a plurality of integrated similarity vectors 280. The pair-specific evaluation term Lta is the value (additional value) of the inside of the sum total sign Σ in Expression (3).

The evaluation term Lint before correction (Expression (15)) is expressed as the sum total (more specifically, an averaged value of the sum total) of adding all the pair-specific evaluation terms Lia for a plurality of (Np) image pairs (more specifically, a value obtained by averaging the sum total). The pair-specific evaluation term Lia (Expression (14)) is the value of the evaluation term relating to the sum total of the magnitudes Dn and obtained for each image pair (more specifically, the normalized value obtained by dividing the sum total by the vector distance D between the two vectors).

The coefficient w is the value for making adjustment so as to prevent the pair-specific evaluation term Lia from becoming too large. Specifically, the magnitude of the pair-specific evaluation term Lia is adjusted using the coefficient w so that the absolute value of the value (attractive force based on the pair-specific evaluation term Lia) obtained by partial differentiation of the pair-specific evaluation term Lia with respect to the vector distance D relating to each pair (corresponding image pair) does not exceed the absolute value of the value (repulsive force based on the pair-specific evaluation term Lta) obtained by partial differentiation of the pair-specific evaluation term Lta with respect to the vector distance D relating to each image pair (in particular, negative pair). That is, the pair-specific evaluation term Lia is modified to a new pair-specific evaluation term Lia (i.e., the pair-specific evaluation term Lib).

The repulsive force (δLdist/δD) corresponds to the absolute value of the value (repulsive force based on the pair-specific evaluation term Lta) obtained by partial differentiation of the pair-specific evaluation term Lta with respect to the vector distance D relating to each image pair (negative pair).

Then, the value obtained by first calculating and adding the adjusted value Lia (Lib) for all image pairs relating to a plurality of learning images and then dividing a resultant value by the number of pairs Np is the evaluation term Lint (see Expression (17)).

The learning model 400 (e.g., prototype vector p) is optimized by training the learning model 400 so as to minimize the evaluation function including the evaluation term Lint described above.

Accordingly, it is possible to suppress a decrease (deterioration) in the accuracy of the learning model 400 and in the accuracy of inference.

3. Third Embodiment: No Replacement

A third embodiment is a variation of the first and second embodiments. The following description is given focusing mainly on differences from the first and other embodiments.

In each of the embodiments described above, retrieval processing (inference processing) is executed after the machine learning on the learning model 400 is completed and after each prototype vector pk is replaced by the most similar pixel vector qmk. That is, each prototype vector pk in the trained model 420 is replaced by the most similar pixel vector qmk (see FIG. 20 and step S28 in FIG. 10).

As described above, with the explanatory information (see FIG. 23 or the like) according to the first embodiment, similarity between comparison target images can be very appropriately explained by using similarity relating to the replaced prototype vectors pmax (i.e., the most similar pixel vectors qmax). For example, the image processing apparatus 30 is capable of explaining the basis of deciding similarity by itself, in accordance with similarity to the image features of the most similar pixel vectors qmax (the image feature of the specific partial region R1 of IMG1 such as a "blue head"; see FIG. 23). In other words, it is possible to adequately acquire very high transparency (the property of being able to explain inference results with concepts understandable by humans).

Moreover, several higher-order prototype vectors pk can be used as information for explaining the difference between two images. In either of the first and second embodiments, all prototype vectors pk including several higher-order prototype vectors pk are each replaced with the corresponding most similar pixel vector q. Thus, in inference processing using the replaced trained model 420, the inference processing is performed based on similarity to each replaced most similar pixel vector q. Accordingly, the difference between two images can be explained based on similarity (difference) to the image features of the most similar pixel vectors q. In other words, it is possible to adequately acquire very high transparency (the property of being able to explain inference results with concepts understandable by humans).

In the third embodiment, on the other hand, the processing for replacing each prototype vector with the most similar pixel vector q is not performed. After the machine learning on the learning model 400 is completed, retrieval processing (inference processing) is executed without replacing each prototype vector pk with the most similar pixel vector.

In this case, the prototype vectors pmax in the decision-making basis 1 (see, for example, FIG. 23) do not completely correspond to the image of a specific partial region of a specific image. The prototype vectors pmax are trained to become closer to given image features, but are not replaced with the most similar pixel vectors qmax. In other words, inference processing itself is performed by using the prototype vectors p before replacement with the most similar pixel vectors q, instead of using the prototype vectors p replaced with the most similar pixel vectors q. That is, complete consistency between the prototype vectors pmax and the most similar pixel vectors qmax is not ensured. Thus, it is difficult to acquire very high transparency.

However, even in this mode (mode of the third embodiment), it is possible to acquire a certain degree of transparency.

For example, in the processing for retrieving an image similar to the query image 215, the image processing apparatus 30 is capable of indicating that similarity to the prototype vectors pmax serves as decision-making basis for similarity and is also capable of indicating "image features of n higher-order pixel vectors (e.g., two higher-order pixel vectors q1 and q2) that are similar to the prototype vectors pmax.

For example, the image processing apparatus 30 is capable of indicating, as the image features of n higher-order pixel vectors that are similar to the prototype vectors pmax, the image feature that corresponds to the pixel vector q1 ("orange legs") and the image feature that corresponds to the pixel vector q2 ("red legs") in the field of "Decision-Making Basis 1" on the display screen shown in FIG. 24. In this case, the user is able to understand that the decision-making basis of similarity by the image processing apparatus 30 is similarity to the prototype vectors that reflect the above two types of image features (to be short, similarity to the common image features ("bright reddish legs") of the pixel vectors q1 and q2).

Accordingly, it is possible to acquire a certain degree of "transparency" (the property of being able to explain inference results with concepts understandable by humans).

Alternatively, the image processing apparatus 30 may be capable of presenting similar explanatory information similar to that shown in FIGS. 27 and 28 in order to explain the reason for dissimilarity between two images. That is, the apparatus is capable of presenting the fact that several (e.g., three) higher-order prototype vectors p serve as the decision-making basis for dissimilarity, and is also capable of presenting the image features of n higher-order pixel vectors (e.g., only one highest-order pixel vector) that are respectively similar to several higher-order prototype vectors p. However, in the third embodiment, each prototype vectors p is not replaced with the most similar pixel vector q, and similarity between each image and the prototype vectors p is not completely reflected on the integrated similarity vectors 280. Thus, it is not possible to acquire very high transparency as in the first and other embodiments. Specifically, it is not possible to explain that the image features of specific pixel vectors q that are in one-to-one correspondence with given prototype vectors p serves as the decision-making basis for dissimilarity. However, even in this case, it is possible to acquire a certain degree of "transparency" (the property of being able to explain inference results with concepts understandable by humans) by indicating the image features of n higher-order pixel vectors (e.g., only one highest-order pixel vector) that are respectively similar to several higher-order prototype vectors p.

Other Variations

While the above has been a description of embodiments, the present disclosure is not intended to be limited to the examples described above.

For example, while, in some embodiments described above, an image that is most similar to an inference target image is retrieved from among a plurality of images obtained by capturing images of target objects of a plurality of types (e.g., birds of a plurality of types), the present disclosure is not limited thereto. For example, an image that is most similar to an inference target image may be retrieved from among a plurality of images obtained by capturing images of a plurality of target objects (e.g., a plurality of persons). To be more specific, an image that includes a person (or the same person as a person to be compared) who is most similar to a given person (e.g., a lost child or a criminal such as a suspended person) in the inference target image may be retrieved from among the plurality of images, as an image that is most similar to the inference target image.

In other words, the same class may be configured by either "targets of the same type" or the "same targets."

Each of the above-described embodiments shows, by way of example, the image retrieval processing for retrieving an image that is similar to an inference target image (e.g., a given captured image) that may include (or may be) an image of classes (unclassified classes) other than known classes, from among a plurality of images (known images such as captured learning images). Further, for example, the idea of the present disclosure may be applied to class classification problems in which inference is made about to which of already classified classes a given inference target image belongs, the given inference target image belonging to any of the already classified classes (classification processing for classifying a given estimation target image to any of already known classes).

Specifically, in the same manner as described in each of the above-described embodiments, the controller 31 obtains the integrated similarity vectors 285 for the inference target image and the integrated similarity vectors 283 for a plurality of learning images. Then, a technique such as k-approximation may be used based on the positional relationship of these vectors in the feature space. More specifically, class classification processing is performed to estimate the class that the inference target image belongs, in accordance with several (k) higher-order images extracted in order of similarity to the inference target image (in descending order of the degree of similarly). To be more specific, the class to which a larger number of the k higher-order images (learning images) belong (e.g., where k may be the value from 1 to 5) is inferred as being the belonged class of the inference target image.

According to the variation described above, it is possible to efficiently represent a plurality of image features with a smaller number of concepts (prototypes) than in conventional techniques for executing class classification using ProtoPNet. In the conventional technique for executing class classification using ProtoPNet, a predetermined number of dedicated prototypes are prepared for each class. Thus, a very large number of prototypes (=predetermined number× the number of classes) become necessary. For example, 2000 (=10×200 classes) prototypes are necessary. In contract, the present embodiment eliminates the need to prepare dedicated prototypes for each lass and requires to prepare only prototypes common to a plurality of classes. Thus, it is possible to reduce the number of prototypes. For example, the same degree (or more) of inference accuracy can be achieved with about 512 prototypes.

The image retrieval processing (processing other than class classification) according to each of the above-described embodiments also does not require to prepare a predetermined number of dedicated prototypes for each class. Thus, it is possible to efficiently construct the prototype vectors p (with a relatively small number of prototype vectors p).

In this way, the above-described idea may be applied to processing other than image retrieval processing for retrieving images similar to inference target images (in particular, inference processing using distance learning). For example, learning processing based on the integrated similarity vectors 280 as described above may be class classification learning using distance information (e.g., class classification learning using a technique such as KNN approximation). Moreover, the above-described idea may also be applied to biometric identification using distance information, or anomaly detection processing.

What is claimed is:

1. An image processing apparatus comprising:
a controller that executes machine learning on a learning model that is configured to include a convolutional neural network,
wherein the learning model is a model that:
generates a feature map acquired from a predetermined layer in the convolutional neural network in response to input of an input image, the feature map indicating a feature of each partial region of the input image for a plurality of channels;
generates a plurality of prototype vectors, each being a parameter sequence that is trained as a prototype that indicates a candidate for a specific image feature concept configured by the plurality of channels; and
generates an integrated similarity vector that indicates similarity between the input image and each of a plurality of prototypes, in accordance with similarity between each pixel vector and one prototype vector, the pixel vector being a vector that represents an image feature spanning the plurality of channels at each planar position of each pixel in the feature map, and
the controller is configured to, at a stage of training the learning model in accordance with a plurality of images for learning:
obtain a belonged prototype and prototype belongingness for each of a plurality of classes that are labelled to the plurality of images for learning, the belonged prototype being a prototype that belongs to one class, the prototype belongingness indicating a degree of belongingness of the belonged prototype to the one class;
obtain distributed prototype belongingness that is prototype belongingness for each image, by distributing prototype belongingness of the belonged prototype of each class to two or more images of the class in accordance with a predetermined reference; and
subject the learning model to machine learning so that, when learning processing is executed based on a plurality of integrated similarity vectors corresponding to the plurality of images, each prototype vector is brought closer to any pixel vector in a feature map that corresponds to each image in accordance with the distributed prototype belongingness for the image.

2. The image processing apparatus according to claim 1, wherein
the controller is configured to:
execute prototype selection processing for selecting a belonged prototype of the one class in accordance with a comparison between a predetermined image that belongs to the one class among the plurality of images for learning and each of a plurality of comparison target images that belong to a different class other than the one class; and
obtain the prototype belongingness of each belonged prototype of the one class in accordance with the number of selections of the belonged prototype during the prototype selection processing, and
the prototype selection processing involves:
unit selection processing for obtaining a difference vector and selecting a prototype that corresponds to a largest component among a plurality of components of the difference vector as the belonged prototype that belongs to the class of the predetermined image, the difference vector being obtained by subtracting an integrated similarity vector acquired by inputting one comparison target image among the plurality of comparison target images to the learning model, from an integrated similarity vector acquired by inputting the predetermined image to the learning model; and number-of-selections calculation processing for selecting a belonged prototype that belongs to the one class and counting the number of selections for each belonged prototype by executing the unit selection processing on the plurality of comparison target images while changing the one comparison target image to another comparison target image.

3. The image processing apparatus according to claim 2, wherein when one prototype belongs to two or more classes, the controller reduces belongingness of the one prototype for each of the two or more classes.

4. The image processing apparatus according to claim 2, wherein the controller is configured to, when the distributed prototype belongingness for each of N images that belong to the one class is determined by distributing prototype belongingness of one belonged prototype that belongs to the one class to the N images:

obtain a first distance that is a distance between a prototype vector of the one belonged prototype and a pixel vector that is most similar to the prototype vector of the one belonged prototype among a plurality of pixel vectors in a feature map that corresponds to one image among the N images;

obtain a second distance that is a distance between the prototype vector of the one belonged prototype and a pixel vector that is most similar to the prototype vector of the one belonged prototype among a plurality of pixel vectors in a feature map that corresponds to another image among the N images; and when the first distance is larger than the second distance, determine the distributed prototype belongingness for the one image to take a smaller value than the distributed prototype belongingness for the another image.

5. The image processing apparatus according to claim 1, wherein after the machine learning on the learning model is completed, the controller corrects the learning model by replacing each prototype vector with a most similar pixel vector that is a pixel vector most similar to the prototype vector among a plurality of pixel vectors in a plurality of feature maps relating to the plurality of images.

6. The image processing apparatus according to claim 5, wherein after machine learning on the learning model is completed and after each prototype vector is replaced with the most similar pixel vector, the controller retrieves an image that is similar to an input image targeted for retrieval from among the plurality of images for learning in accordance with an integrated similarity vector that is output from the learning model in response to input of the input image targeted for retrieval to the learning model and a plurality of integrated similarity vectors that are output from the learning model in response to input of the plurality of images for learning to the learning model.

7. The image processing apparatus according to claim 1, wherein an evaluation function used in machine learning on the learning model includes a first evaluation term that is an evaluation term relating to clarity, and the controller is configured to, for a first image and a second image in an arbitrary combination of the plurality of images for learning:

obtain two vectors that include a first vector and a second vector, the first vector being an integrated similarity vector acquired by inputting the first image to the learning model, the second vector being an integrated similarity vector acquired by inputting the second image to the learning model;

sort absolute values of a plurality of components of a difference vector between the first vector and the second vector in descending order;

obtain a magnitude Dn of a partial difference vector for each of a plurality of values n, where n is a value from 1 to Nd and Nd is a predetermined integer less than or equal to the number of dimensions Nc of the integrated similarity vector, the partial difference vector being reconfigured by only up to n higher-order components obtained after the plurality of components of the difference vector are sorted in descending order; and subject the learning model to machine learning by optimizing the first evaluation term so as to maximize a value that is normalized by dividing a sum total of a plurality of magnitudes Dn corresponding respectively to the plurality of values n by a vector distance between the two vectors.

8. The image processing apparatus according to claim 7, wherein the evaluation function further includes:

a second evaluation term that is an evaluation term for metric learning based on the plurality of integrated similarity vectors corresponding respectively to the plurality of images, the first evaluation term is expressed as a sum total of adding a pair-specific first evaluation terms obtained for each of a plurality of image pairs, the pair-specific first evaluation term being an evaluation term relating to a sum total of the plurality of magnitudes Dn for each of the plurality of image pairs, the second evaluation term is expressed as a sum total of adding a pair-specific second evaluation term obtained for each of the plurality of image pairs, the pair-specific second evaluation term being an evaluation term relating to metric learning based on the plurality of integrated similarity vectors for each of the plurality of image pairs, and the controller adjusts a magnitude of the pair-specific first evaluation term so that an absolute value of a value obtained by partial differentiation of the pair-specific first evaluation term with respect to the vector distance relating to each image pair among the plurality of image pairs does not exceed an absolute value of a value obtained by partial differentiation of the pair-specific second evaluation term with respect to the vector distance relating to the image pair.

9. The image processing apparatus according to claim 1, wherein after machine learning on the learning model is completed, the controller retrieves an image that is similar to an input image targeted for retrieval from among the plurality of images for learning in accordance with an integrated similarity vector that is output from the learning model in response to input of the input image targeted for retrieval to the learning model and a plurality of integrated similarity vectors that are output from the learning model in response to input of the plurality of images for learning to the learning model.

10. A method of producing a learning model,
the learning model being a model that:
generates a feature map acquired from a predetermined layer in a convolutional neural network in the learning model in response to input of an input image, the feature map indicating a feature of each partial region of the input image for a plurality of channels;
generates a plurality of prototype vectors, each being a parameter sequence that is trained as a prototype that indicates a candidate for a specific image feature concept configured by the plurality of channels; and
generates an integrated similarity vector that indicates similarity between the input image and each of a plurality of prototypes, in accordance with similarity between each pixel vector and one prototype vector, the pixel vector being a vector that represents an image feature spanning the plurality of channels at each planar position of each pixel in the feature map,
the method of producing a learning model comprising:
a) obtaining a belonged prototype and prototype belongingness in accordance with a plurality of images for learning for each of a plurality of classes that are labelled to the plurality of images for learning, the belonged prototype being a prototype that belongs to one class, the prototype belongingness indicating a degree of belongingness of the belonged prototype to the one class;
b) obtaining distributed prototype belongingness that is prototype belongingness for each image, by distributing prototype belongingness of the belonged prototype of each class to two or more images of the class in accordance with a predetermined reference; and
c) when learning processing is executed based on a plurality of integrated similarity vectors corresponding to the plurality of images, subjecting the learning model to machine learning so that each prototype vector is brought closer to any pixel vector in a feature map that corresponds to each image in accordance with the distributed prototype belongingness for the image.

11. The method of producing a learning model according to claim 10, further comprising:
d) after machine learning on the learning model is completed, correcting the learning model by replacing each prototype vector with a most similar pixel vector that is a pixel vector most similar to the prototype vector among a plurality of pixel vectors in a plurality of feature maps relating to the plurality of images.

12. The method of producing a learning model according to claim 10, wherein
the operation c) involves, for a first image and a second image in an arbitrary combination of the plurality of images for learning:
c-1) obtaining two vectors that include a first vector and a second vector, the first vector being an integrated similarity vector acquired by inputting the first image to the learning model, the second vector being an integrated similarity vector acquired by inputting the second image to the learning model;
c-2) sorting absolute values of a plurality of components of a difference vector between the first vector and the second vector in descending order;
c-3) obtaining a magnitude $D_n$ of a partial difference vector for each of a plurality of values n, where n is a value from 1 to $N_d$ and $N_d$ is a predetermined integer less than or equal to the number of dimensions $N_c$ of the integrated similarity vector, the partial difference vector being reconfigured of only up to n higher-order components obtained after the plurality of components of the difference vector are sorted in descending order; and
c-4) subjecting the learning model to machine learning so as to maximize a value that is normalized by dividing a sum total of a plurality of magnitudes $D_n$ that correspond respectively to the plurality of values n by a vector distance between the two vectors.

13. An inference method for executing inference processing on a new input image by using a learning model produced by the method of producing a learning model according to claim 10.

* * * * *